(12) United States Patent
Levy et al.

(10) Patent No.: US 8,777,626 B2
(45) Date of Patent: Jul. 15, 2014

(54) INTERACTIVE SYSTEM AND METHOD FOR MULTI-SENSORY LEARNING

(71) Applicant: Maxscholar, LLC, Miami Beach, FL (US)

(72) Inventors: Daniel M. Levy, Miami Beach, FL (US); Deboarh L. Levy, Miami Beach, FL (US); Elliot G. Levy, Miami Beach, FL (US)

(73) Assignee: Maxscholar, LLC, Aventura, FL (US)

( * ) Notice: Subject to any disclaimer, the term of this patent is extended or adjusted under 35 U.S.C. 154(b) by 0 days.

(21) Appl. No.: 13/886,664

(22) Filed: May 3, 2013

(65) Prior Publication Data

US 2013/0295535 A1 Nov. 7, 2013

Related U.S. Application Data

(60) Provisional application No. 61/641,965, filed on May 3, 2012.

(51) Int. Cl.
*G09B 17/00* (2006.01)

(52) U.S. Cl.
USPC ............ 434/178; 434/156; 434/159; 434/167

(58) Field of Classification Search
CPC ............ G09B 1/00; G09B 5/00; G09B 19/00; G09B 17/00
USPC .......................... 434/156, 159, 167, 170, 178
See application file for complete search history.

(56) References Cited

U.S. PATENT DOCUMENTS

| | | | |
|---|---|---|---|
| 6,213,956 B1 * | 4/2001 | Lawton | 600/558 |
| 6,669,478 B2 | 12/2003 | Edwards et al. | |
| 6,726,486 B2 * | 4/2004 | Budra et al. | 434/169 |
| 6,755,657 B1 * | 6/2004 | Wasowicz | 434/167 |
| 7,062,220 B2 * | 6/2006 | Haynes et al. | 434/353 |
| 8,025,504 B2 * | 9/2011 | Freeman et al. | 434/155 |
| 8,092,223 B1 | 1/2012 | Sharp | |
| 2004/0023191 A1 * | 2/2004 | Brown et al. | 434/156 |
| 2004/0058304 A1 * | 3/2004 | Morsy et al. | 434/262 |
| 2007/0234209 A1 * | 10/2007 | Williams | 715/700 |
| 2013/0130212 A1 * | 5/2013 | Dohring et al. | 434/157 |

\* cited by examiner

*Primary Examiner* — Bruk Gebremichael
(74) *Attorney, Agent, or Firm* — Im IP Law PLLC; C. Andrew Im

(57) ABSTRACT

An interactive computer based system and method for multi-sensory learning to teach students to read, to write, to improve their fluency, and to improve their reading comprehension. The multi-sensory system combines phonics and reading comprehension to teach students how to decode the alphabet and understand what they read. The multi-sensory system can be individually customized and tailored to meet needs of an individual student.

18 Claims, 49 Drawing Sheets

Now I want you to listen to me reading words using the letters & sounds you have just learned. Some words are real, and some are not.

Sounds: p, f, n, t, a

| an | at | ap |
| pat | paff | nap |
| fat | tap | pan |
| fap | tan | nat |
| fan | fat | at |
| taff | pat | tan |
| nat | fan | tan |

FIG. 19

Exercise 1       Assessment a

1. Which of these words start with the sound /p/?   1. ○ pat   ○ nap   ○ tan

2. Which of these words start with the sound /f/?   2. ○ tap   ○ fat   ○ nat

3. Which of these words start with the sound /n/?   3. ○ fan   ○ ap    ○ nan

4. Which of these words start with the sound /t/?   4. ○ tap   ○ fat   ○ pat

5. Which of these words start with the sound /a/?   5. ○ fap   ○ at    ○ tan

Calculate Score

FIG. 26

Exercise 1

Assessment b

1. Which of these words end with the sound /n/?     1. ○ pat   ○ nap   ○ tan

2. Which of these words end with the sound /p/?     2. ○ tap   ○ fat   ○ nat

3. Which of these words end with the sound /f/?     3. ○ fan   ○ ap   ○ paff

4. Which of these words end with the sound /t/?     4. ○ tap   ○ fat   ○ pan

5. Which of these words end with the sound /p/?     5. ○ fap   ○ at   ○ tan

Calculate Score

FIG. 27

Exercise 2    | Assessment c |

1. Which of these words have the sound /a/ in the middle of the word?

1. ○ nes    ○ set    ○ fan

2. Which of these words have the sound /e/ in the middle of the word?

2. ○ pan    ○ fen    ○ far

3. Which of these words have the sound /a/ in the middle of the word?

3. ○ sec    ○ nat    ○ pen

4. Which of these words have the sound /e/ in the middle of the word?

4. ○ kes    ○ nat    ○ can

| Calculate Score |

6<sup>th</sup> Grade

6--Pre Test, part 1

There are many things that people wear to make statements about themselves. Accessories can be a great way to tell people about you. A watch, for example, can be the perfect accessory to express one's self.

Watches have many different looks. The face of a watch can be shiny or it can be covered in diamonds. It can be plain and unadorned. It can simply tell time or function as a wrist top computer.

The straps on a watch can be varied. They can be rubber, suited for daily use or for sports. They can be leather for dress. They can be made out of metal for good looks.

They can be inexpensive or very costly. They can be made in a factory in an Asian country or be made by hand in a Swiss watch company.

Watches can have quartz movements or mechanical movements. Some need to be wound; some are self-winding, and some need batteries. Some watches are collectible, valued more for their workmanship and beauty than for simple timekeeping. In addition to the time, modern watches often display the day, date, month and year, and electronic watches may have many other functions. Watches that provide additional time-related features such as timers, chronographs, and alarm functions are not uncommon. Some modern designs even go as far as using GPS technology or heart-rate monitoring capabilities.

So watches can be a statement about you, a functional part of your life, or even a sign of wealth.

FIG. 30

Question 1:
What is the Main Idea?
    a. Watches are good accessories.
    b. Accessories are important to status-seeking people.
    c. Watches are ugly.
    d. Watches are all the same.

Question 2:
What is not something a watch can tell you?
    a. Time
    b. Date
    c. Height
    d. Heart rate Question 3:
What is different about watch bands that are rubber or leather?
    a. Rubber straps are for daily use.
    b. Rubber straps look nice.
    c. Leather straps are for the water.
    d. Leather straps are for relaxing.

Question 4:
Why do some people use accessories?
    a. To look bad
    b. To show off
    c. To tell other people about themselves
    d. To be good Question 5:
What does the word "unadorned" mean?
    a. Plain
    b. Flashy
    c. Bejeweled
    d. Expensive Question 6:
Which design feature of watches has occurred last?
    a. Straps
    b. Quartz movements
    c. Chronographs
    d. GPS technology

INTERACTIVE SYSTEM AND METHOD FOR MULTI-SENSORY LEARNING

RELATED APPLICATION

This application claims the benefit of U.S. Provisional Application No. 61/641,965 filed May 3, 2012, which is incorporated herein by reference in its entirety.

BACKGROUND OF THE INVENTION

The claimed invention relates to an interactive system and method for multi-sensory learning, more particularly to an interactive online system for teaching students the alphabetic code with a visual, auditory, and tactile method (multi-sensory) and to read words. In addition, the claimed invention includes a research-based, multi-sensory program designed to improve the student's reading comprehension that is individually customized for each student The education system in the United States has not been working. Many children are not learning how to read. According to the Nation's Report Card: Reading, in 2011, 37% of $4^{th}$ graders and 27% of $8^{th}$ graders cannot read at the basic level. In low-income urban areas, up to 70% of all students read below grade level. In looking back over the past ten years, there has been no significant improvement in any of these scores. Children who are poor readers at the end of first grade almost never acquire an average level of reading skills by the end of elementary school. Those children who are not on track by third grade have little chance of ever being on grade level. So what is the solution?

Perhaps there needs to be an overhaul of the education system in the United States. Perhaps the traditional white board and textbook form of education needs to be re-examined and replaced, or at least supplemented, with electronic forms of instruction, geared to the struggling reader, the one at risk for dropping out of school.

There have been some efforts by the federal government, but none have been overwhelming successful. One governmental program, No Child Left Behind or Supplementary Educational Services, attempted to address these problems without much success. This program tried to improve the educational performance of students who attended failing schools As a district coordinator for a very successful learning center, overseeing over 600 students, the inventor saw firsthand exactly what were the major issues in trying to teach these students how to read.

Students were asked to work in groups of 5 to 10 students, without much individual attention and were forced to keep up with the group, despite not mastering one or more concepts being trained on. He saw teachers who were apparently taught the methods used by the learning center but were unable to provide the instruction, either because they did not master the program or because they modified the program to their needs, rather than those of the students. He observed many teachers who were "burned out" from years of teaching, in terrible conditions, in over populated classrooms, not following the methods they were trained on. He saw students being passed from one grade to the next because they could not be held back any longer. He saw other students who were held back two or three years, yet were not one bit better at reading than when the first started that grade.

Accordingly, the claimed invention proceeds upon the desirability of providing an interactive online system and method for multi-sensory learning to teach students to read, to write, to improve their fluency, and to improve their reading comprehension, that is individually customized for each student.

OBJECTS AND SUMMARY OF THE INVENTION

It is apparent that education is the only profession that has not used technology to its fullest, yet the students are being raised in the tech world where everything around them involves modern day technology. The claimed invention provides an on-line program of intervention for those students who have difficulty in learning to read words and to understand what they read. These materials supplement the printed materials used by the teachers. Not only did the claimed invention help the students to become better readers, but their scores on testing improved nearly across the board. In addition, the students preferred the on-line learning to group learning, and many students with attention disorders were "glued" to their computer monitors, who previously had problems staying focused in a class or group. This is consistent with findings reported in the *New York Times* in 2009, quoting a 93-page report on on-line education, conducted by SRI International for the Department of Education, concluded, "On average, students in online learning conditions performed better than those receiving face-to-face instruction."

Accordingly, it is an object of the claimed invention to provide an interactive system running on computers, laptops, and tablets directed to students who are struggling readers. These students are frequently not adequately taught with usual educational methods, often require after-school tutoring, or Supplemental Educational Services, yet despite receiving these extra sessions still are unable to read at grade level. Typically, these struggling readers do not respond or improve despite receiving extra sessions of tutoring before or after school.

It is another object of the claimed invention, to provide learning material in electronic format aimed at improving the reading of the words with understanding of the students, in a multi-sensory way, taking advantage of all the available technological methods in the field.

It is a further object of the claimed invention to utilize Phonics to teach children the letters and combination of letters used in the English language and the sounds they make, as the basis for teaching them how to read words, then sentences, then paragraphs, then passages.

In accordance with an exemplary embodiment of the claimed invention, the claimed interactive system utilizes the students' senses of sight, speech, hearing and touch to virtually replicate the one-on-one session between a teacher and a student. This enables each student to progress at his or her own pace. The claimed system and method interactively teaches the student how to improve his or her reading comprehension skills by using research-based methods called "highlighting" and "summarizing."

In accordance with an exemplary embodiment of the claimed invention, the claimed system comprises a series of on-line books for teaching the students how to understand better what they read by utilizing a novel educational strategy of electronic highlighting. The claimed system and method utilizes electronic highlighting to focus the brains of the students on the topic, the main idea, and the important details, using a specific sequence of steps.

In accordance with an exemplary embodiment of the claimed invention, the inventive system and method combines the Phonics and the Reading Comprehension Strategy to provide an interactive multi-sensory learning system to teach students how to read words (decoding) and to improve their reading comprehension, that can be individually customized and tailored to meet needs of an individual student.

In accordance with an exemplary embodiment of the claimed invention, a computer based interactive, multi-sensory method comprises a plurality of steps for teaching students how to read words and comprehend passages. A menu of teaching components is presented on a screen of a processor based client device associated with a student by a processor based server over a communications network. The server comprises at least a phonics component for teaching students to read through voice and handwriting recognition. The phonics component comprises a plurality of phonics modules for teaching the student an alphabetic code of the English language. Each phonics module comprises a different letter category of the alphabetic code and a plurality of exercises for teaching the student the letter category of each module with a series of multi-sensory interactions with the student. The phonics component determines and executes a current phonics module associated with the student. The letter category of the current phonics module comprises a plurality of letter groups, each letter group comprising at least one of the following letter symbol: a letter, a consonant, a vowel or a syllable. A current letter group of the current phonics module and a current letter symbol of the current letter group associated with the student is determined. An exercise for the current letter symbol of the current letter group associated with the student is retrieved from a database. The exercise comprises at least a visual and auditory drill of the current letter symbol, a handwriting drill of the current letter symbol and a phonological processing drill. The exercise for the current letter symbol of the current letter group associated with the student is presented on the student's client device to create multi-sensory interactions with the student for the current letter symbol. The student's responses to the multi-sensory interactions of the exercise from the client device by the phonics component over the communications network. The student's responses to the multi-sensory interactions is processed and scored to determine whether the student advances to the next letter symbol of the current letter group or repeats the current letter symbol of the current letter group. The student's responses to the multi-sensory interactions and the student's score on the current letter symbol is stored in the database. The student is advanced to the next letter symbol of the current letter group by the phonics component if the student's score is greater than or equal to a predetermined threshold and repeats the process for the next letter symbol of the current letter group. However, if the student's score is less than the predetermined threshold, the phonics component retrieves and repeats the process for another exercise for the current letter symbol of the current letter group.

In accordance with an exemplary embodiment of the claimed invention, the aforesaid method further comprises the phonics component presenting a letter group assessment test of the current letter group on the student's client device upon completion of a last letter symbol of the current letter group. The student's responses to the letter group assessment test is processed and scored by the phonics component to determine whether the student advances to the next letter group of the current phonics module or repeats the current letter group of the current phonics module. The student is advanced to the next letter group of the current phonics module and repeats the process for the next letter group of the current phonics module if the student's letter group assessment score is greater than or equal to a predetermined threshold. However, if the student's letter group assessment score is less than the predetermined threshold, the student repeats the process for the current letter group of the current phonics module.

In accordance with an exemplary embodiment of the claimed invention, the aforesaid method further comprises the phonics component presenting a module assessment test of the current phonics module on the student's client device upon completion of a last letter group of the current module. The student's responses to the module assessment test are process and scored by the phonics component to determine a module assessment score. The student's responses to the module assessment test and the student's module assessment score are in the database. The student is advanced to the next phonics module and repeats the process for the next phonics module if the student's module assessment score is greater than or equal to a predetermined module threshold. However, if the student's module assessment score is less than the predetermined module threshold, the student repeats the process for the current phonics module.

In accordance with an exemplary embodiment of the claimed invention, the aforesaid method further comprises the phonics component performing the visual and auditory drill of the current letter symbol on the student's client device. A video or animation is presented on the student's client device of a speaker or character at least pronouncing a name of the current letter symbol or a grapheme drill, pronouncing a name of a picture which is associated with the sound of the current letter symbol or a picture association drill, and pronouncing the sound the current letter symbol makes or a phoneme drill. The student is then prompted to perform the grapheme drill, the picture association drill and the phoneme drill as on the video, one at a time, by pronouncing the name of the current letter symbol, pronouncing the name of the picture associated with the current letter symbol and pronouncing the sound the current letter symbol makes. The phonics component receives a recording of the student's pronunciations during the grapheme drill, the picture association drill and the phoneme drill from the student's client device over the communications network. The recording is analyzed to determine a visual/auditory score, and the recording of the student's pronunciations and the student's visual/auditory score is stored in the database. Preferably, the phonics component calculates the visual/auditory score by utilizing the speech recognition of the server to compare the sounds spoken by the student to the stored correct sounds. The speech recognition engine comprises a library of correct sounds.

In accordance with an exemplary embodiment of the claimed invention, the aforesaid method further comprises the phonics component performing the handwriting drill of the current letter symbol on the student's client device. An animation of how the current letter symbol is formed and an audio instruction of how to write the current letter symbol is presented on the student's client device. The student is then prompted to write the current letter symbol on the student's computer screen with a mouse or using the student's finger on the student's touch screen. The student's writing of the current letter symbol is received from the student's client device over the communications network. The phonics component analyzes the student's writing to determine a handwriting score by comparing the student's writing of the current letter symbol to a correctly written current letter symbol as a template or silhouette. The student's writing of the current letter symbol and the student's handwriting score is stored in the database.

In accordance with an exemplary embodiment of the claimed invention, the aforesaid method further comprises the phonics component performing the phonological processing drill of the current letter symbol on the student's client device. At least two sets of pictures, one at a time, are presented on the student's client device. Each set comprises at least two pictures with one picture that starts with the sound of the current letter symbol. An audio of the sound that the current letter symbol makes is provided on the student's client device. For each set of pictures, the phonics component prompts the student to select or identify a picture from the set that starts with the sound the current letter symbol makes. The student's selection of the picture from each set of picture is received from the student's client device over the communications network. The phonics component processes the student's picture selections to determine a phonological score, and stores the student's picture selections and student's phonological score in the database.

In accordance with an exemplary embodiment of the claimed invention, the aforesaid method further comprises the phonics component performing an auditory sound drill of the current letter group on the student's client device upon completion of a last letter symbol of the current letter group. The phonics component provides a predetermined number of sounds of the letter symbols of the current letter group, one at a time, on the student's client device. After each sound is provided, the phonics component prompts the student to enter the letter symbol associated with the sound and receives the student's responses to the predetermined number of sounds from the student's client device over the communications network. The phonics component processes the student's responses to determine an auditory drill score, and stores the student's response and the student's auditory drill score in the database.

In accordance with an exemplary embodiment of the claimed invention, the aforesaid method further comprises the phonics component performing a decoding drill of the current letter group on the student's client device upon completion of a last letter symbol of the current letter group. The phonics component presents a predetermined number of slides on the student's client device, one at a time. Each slide contains at least two letter symbols of the current letter group. For each slide, the phonics component prompts the student to say the sound of each letter symbol on the screen and to blend the sounds together to form a word which can be a real or nonsense word. A recording of the student's pronunciation of the words formed from blending the sounds of at least two letter symbols is received from the client device over the communications network. The phonics component analyzes the recording to determine a decoding score by utilizing a speech recognition engine of the server to compare the sounds spoken by the student to the stored correct sounds. The speech recognition engine comprises a library of correct sounds. The student's writing of the current letter symbol and the student's decoding score are stored in the database.

In accordance with an exemplary embodiment of the claimed invention, the aforesaid method further comprises the phonics component performing a pronunciation drill of the current letter group on the student's client device upon completion of a last letter symbol of the current letter group. A predetermined number of electronic flash cards are presented on the student's client device, one at a time. Each flash card contains a real or nonsense word comprising at least two letter symbols of the current letter group. For each flash card, the phonics component prompts the student to read the word on the flash card. A recording of the student's pronunciation of the words on the flash cards is received from the client device over the communications network. The phonics component analyzes the recording to determine a pronunciation score by utilizing a speech recognition engine of the server to compare the student's pronunciation of the words to the stored correct sounds of the words on the flash cards. The speech recognition engine comprises a library of correct sounds. The recording of the student's pronunciations and the student's pronunciation score are stored in the database.

In accordance with an exemplary embodiment of the claimed invention, the aforesaid method further comprises the phonics component performing a word per minute timing drill of the current letter group on the student's client device upon completion of a last letter symbol of the current letter group. A predetermined set of a predetermined number of words are presented on the student's client device. Each word is a real or nonsense word comprising at least two letter symbols of the current letter group. For each set, the phonics component prompts the student to read the words displayed on the student's screen for a predetermined time, preferably one minute. A recording of the words read by the student is received from the client device over the communications network. The phonics component analyzes the recording to determine a wpm score based on a number of words in each set read correctly by student by utilizing a speech recognition engine of the server to compare the student's pronunciation of the words to stored correct sounds of the words. The recording of the words read by the student and the student's wpm score are stored in the database.

In accordance with an exemplary embodiment of the claimed invention, the aforesaid method further comprises the phonics component performing a controlled reading assessment of the student using a controlled reader upon completion of a last letter symbol of the current letter group. The controlled reader is a real or nonsense story comprising a predetermined number sentences composed of words consisting of at two letter symbols of the current letter group. A predetermined number of sight words are presented on the student's client device to be memorized by the student. For each sight word, providing an audio of the sound of said each sight word on the student's client device and prompting the student to read said each sight word. The phonics component transmits and presents the controlled reader on the student client device as a series of slides. Each slide displaying one or two sentences and images associated with one or more words of the displayed slide. For each slide, the phonics component provides an audio sound of a speaker reading the displayed sentences and prompts the student to read the sentences displayed on the student's screen. A recording of the sentences read by the student is received from the client device over the communications network. The phonics component analyzes the recording to determine a controlled reader score based on a number of sentences read correctly by student. Preferably, the phonics component utilizes a speech recognition engine of the server to compare the student's pronunciation of the words in each sentence to stored correct sounds of the words. The recording of the sentences read by the student and the student's controlled reader score are stored in the database.

In accordance with an exemplary embodiment of the claimed invention, the aforesaid method further comprises the phonics component performing the letter group assessment test which comprises at least four parts. In the first part of the letter group assessment test, the phonics component presents a first set of lists on the student's client device, one list at a time. Each list is associated with one different letter symbol of the current letter group and comprises at least two words. For each list on the first set, the phonics component provides an audio sound of the letter symbol associated with the presented list on the student's client device and prompts the student to select a word on said each list that begins with the audio sound. The student's selections for the first set are received from the student's client device over the communications network. The phonics component processes the student's selections for first set to determine a first assessment score, and stores the student's selections for the first set and student's first letter group assessment score in the database.

In the second part of the letter group assessment, in accordance with an exemplary embodiment of the claimed invention, the phonics component presents a second set of lists on the student's client device, one list at a time. For each list on the second set, the phonics component provides an audio sound of the letter symbol associated with the list on the student's client device and prompts the student to select a word on the list that ends with the audio sound. The student's selections for the second set are received from the student's client device over the communications network. The phonics component processes the student's selections for the second set to determine a second assessment score, and stores the student's selections for the second set and student's second letter group assessment score in the database.

In the third part of the letter group assessment test, in accordance with an exemplary embodiment of the claimed invention, the phonics component presents a third set of lists on the student's client device, one list at a time. For each list on the third set, the phonics component provides an audio sound of the letter symbol associated with the list on the student's client device and prompts the student to select a word on the list that contains the audio sound. The student's selections for the third set are received from the student's client device over the communications network. The phonics component process the student's selections for the third set to determine a third assessment score, and stores the student's selections for the third set and student's third letter group assessment score in the database.

In the fourth part of the letter group assessment test, in accordance with an exemplary embodiment of the claimed invention, the phonics component performs a word per minute timing drill by presenting a predetermined set of a predetermined number of words on the student's client device. Each word is a real or nonsense word comprising at least two letter symbols of the current letter group. For each set, the phonics component prompts the student to read the words displayed on the student's screen for a predetermined time, preferably one minute. A recording of the words read by the student is received from the client device over the communications network. The phonics component analyzes the recording to determine a fourth assessment score comprising three scores: a first score which is a total number of words read accurately by the student; a second score which is a total number of real words read accurately by the student; and a third score which is the total number of nonsense words read accurately. The phonics component determines each score of the fourth assessment by utilizing a speech recognition engine of the server to compare the student's pronunciation of the words to stored correct sounds of the words. The recording of the words read by the student and the student's fourth assessment score comprising the three scores are stored in the database.

In accordance with an exemplary embodiment of the claimed invention, a computer based interactive, multi-sensory method comprises a plurality of steps for teaching students how to read words and comprehend passages. A menu of teaching components is presented on a screen of a processor based client device associated with a student by a processor based server over a communications network. The server comprises at least a reading comprehension component for teaching students to improve their reading comprehension skills through highlighting and summarizing passages. The reading comprehension component retrieves a current book from a database comprising a plurality of books at each reading comprehension level. The current book is selected from the student's current reading level. The reading comprehension component presents a current chapter of the current book on the student's client device, and prompts the student to read and highlight the current chapter with colored electronic highlighters. A first color, e.g., green, for main idea; a second color, e.g., blue, for topic; and a third color, e.g., yellow, for detail. The student's highlighted chapter is received from the client device over the communications network. The reading comprehension component processes the student's highlighted chapter to determine a chapter highlighting score based at least on the words correctly highlighted in the current chapter, the words incorrectly highlighted in the current chapter and a total time spent on the current chapter by the student. A predetermined number of questions about the current chapter, one a time, are presented on the student's client device. The student's answers to the questions are received from the student's client device over the communications network. The reading comprehension component processes the student's answers to determine a chapter question score and an overall chapter score based on the student's chapter highlighting score and the student's chapter question score. The student's highlighted chapter, the student's chapter highlighting score, the student's question score and the student's overall chapter score are stored in the database. Upon the completion of the current chapter of the current book by the student, the reading comprehension component retrieves the next chapter of the current book from the database and repeats the process for the next chapter. Upon the completion of the current book by the student, the reading comprehension component retrieves another or next book from the database and repeats the process for the next book until a predetermined number of books, preferably four to five books, from the student's current reading level is completed.

In accordance with an exemplary embodiment of the claimed invention, the aforesaid method further comprises the reading comprehension component performing a pre-test to determine the student's current reading level. The reading comprehension component retrieves the pre-test based on the student's current grade level from the database and presents the pre-test on the student's client device. The pre-test comprises a predetermined number of passages for the student read. After each passage, the reading comprehension component prompts the student to answer a predetermined number of questions about the passage. Each question preferably relates to one of the following about the passage: main idea, important detail, compare and contrast, cause and effect, vocabulary, sequence, predictions, conclusions, inferences, fact vs. opinion, author's purpose, figurative language or summarization. The student's answers to the questions are received from the student's client device over the communications network. The reading comprehension component processes the student's answers to the question to determine an overall pre-test score and individual passage scores. The reading comprehension component assigns the student to a reading level associated with the student's current grade level if the student's overall pre-test score is greater than a predetermined high threshold, preferably 80%. The reading comprehension component assigns the student to a reading level associated with two grade levels below the student's current grade level if the student's overall pre-test score is less than a predetermined low threshold, preferably 40%. Otherwise, the reading comprehension component assigns the student to a reading level associated with one grade level below the student's current grade level. The student's answers to the questions, the student's overall pre-test score and the student's assigned reading level are stored in the database.

In accordance with an exemplary embodiment of the claimed invention, the aforesaid method further comprises the reading comprehension component highlighting the words in the current chapter for which definitions are available from the vocabulary component of the server.

In accordance with an exemplary embodiment of the claimed invention, the aforesaid method further comprises the reading comprehension component displaying the student's highlighted chapter and the student's highlighting score on the student's client device. The student's correctly highlighted words relating to the main idea are displayed in the first color, e.g., green. The student's correctly highlighted words relating to the topic are displayed in the second color, e.g., blue. The student's correctly highlighted words relating to the detail are displayed in the third color, e.g., yellow. The student's incorrectly highlighted words are displayed in a fourth color, e.g., red.

In accordance with an exemplary embodiment of the claimed invention, after completing a predetermined number of chapters, preferably five chapters, the aforesaid method further comprises the reading comprehension component prompting the student to write a summary of the current chapter. The student's summary of the current chapter is received from the student's client device over the communications network. The reading comprehension component analyzes the student's summary to determine whether the summary contains at least one main idea, at least three sentences relating to details of the current chapter and at least one concluding sentence, and determines a summary score based on that determination. The student's summary and the student's summary score are stored in the database.

In accordance with an exemplary embodiment of the claimed invention, the aforesaid method further comprises the reading comprehension component performing an interim progress assessment (IPA) at a predetermined time before the completion of the current reading level, preferably halfway through the current reading level, to assess the student's reading fluency. A predetermined number of passages, preferably two passage, based on the student's current reading level is retrieved from the database. The reading comprehension component presents the predetermined passages, one at a time, on the student's client device passages. For each passage, the reading comprehension component prompts the student to read and highlight the passage with colored electronic highlighters, the first color for main idea, the second color for topic and the third color for detail, and receives the student's highlighted passage from the client device over the communications network. After each passage, the reading comprehension component the student to answer a predetermined number of questions about the passage, preferably five questions. Each question relates to one of the following about the passage: main idea, important detail, compare and contrast, cause and effect, vocabulary, sequence, predictions, conclusions, inferences, fact vs. opinion, author's purpose, figurative language or summarization. The student's answers to the questions after each passage are received from the student's client device over the communications network. The reading comprehension component processes the student's highlighted passages to determine an IPA highlighting score based at least on correctly highlighted topic, correctly highlighted main idea, and correctly highlighted details in the passage. The reading comprehension component processes the student's answers to the questions to determine an IPA question score and an overall IPA score based on the student's IPA highlighting score and the student's IPA question score. The reading comprehension component advances the student to the next reading level if the overall IPA score is greater than a predetermined high threshold, preferably 70%; and demotes the student to a previous reading level if the overall IPA score is less than a predetermined low threshold, preferably 50%. The reading comprehension component maintains the student at the student's current reading level if the overall IPA score is between the predetermined low and high thresholds. The student's IPA highlighting score, the student's IPA question score and the student's overall IPA score are stored in the database.

In accordance with an exemplary embodiment of the claimed invention, the aforesaid method further comprises the reading comprehension component performing a post-test assessment to assess the student's reading fluency upon completion of the current reading level. A predetermined number of passages, preferably two passage, based on the student's current reading level is retrieved from the database. The reading comprehension component presents the predetermined passages, one at a time, on the student's client device passages. For each passage, the reading comprehension component prompts the student to read and highlight the passage with colored electronic highlighters, the first color for main idea, the second color for topic and the third color for detail, and receives the student's highlighted passage from the client device over the communications network. After each passage, the reading comprehension component the student to answer a predetermined number of questions about the passage, preferably five questions. Each question relates to one of the following about the passage: main idea, important detail, compare and contrast, cause and effect, vocabulary, sequence, predictions, conclusions, inferences, fact vs. opinion, author's purpose, figurative language or summarization. The student's answers to the questions after each passage are received from the student's client device over the communications network. The reading comprehension component processes the student's highlighted passages to determine a post-test highlighting score based at least on correctly highlighted topic, correctly highlighted main idea, and correctly highlighted details in the passage. The reading comprehension component processes the student's answers to the questions to determine a post-test question score and an overall post-test score based on the student's post-test highlighting score and the student's post-test question score. The reading comprehension component advances the student to the next reading level if the overall post-test score is greater than a predetermined high threshold, preferably 70%; and demotes the student to a previous reading level if the overall post-test score is less than a predetermined low threshold, preferably 50%. The reading comprehension component maintains the student at the student's current reading level if the overall post-test score is between the predetermined low and high thresholds. The student's post-test highlighting score, the student's post-test question score and the student's overall post-test score are stored in the database.

In accordance with an exemplary embodiment of the claimed invention, a non-transitory computer readable medium comprises computer executable code for interactive, multi-sensory method for teaching students to read words and comprehend passages. The computer executable code comprising instructions for presenting a menu of teaching components on a screen of a processor based client device associated with a student by a processor based server over a communications network. The server comprises at least a phonics component for teaching students to read through voice and handwriting recognition and a reading comprehension component for teaching students to improve their reading comprehension skills through highlighting and summarizing passages. The phonics component comprises a plurality of phonics modules for teaching the student an alphabetic code of the English language. Each phonics module comprises a different letter category of the alphabetic code and a plurality of exercises for teaching the student the letter category of each module with a series of multi-sensory interactions with the student. The student's selection of the teaching component is received from the student's client device by the server over the communications network.

In accordance with an exemplary embodiment of the claimed invention, the server is operable to execute the phonics component if the phonics component is selected by the student. The phonics component determines and executes a current phonics module associated with the student. The letter category of the current phonics module comprises a plurality of letter groups, each letter group comprising at least one of the following letter symbol: a letter, a consonant, a vowel or a syllable. A current letter group of the current phonics module and a current letter symbol of the current letter group associated with the student is determined. An exercise for the current letter symbol of the current letter group associated with the student is retrieved from a database. The exercise comprises at least a visual and auditory drill of the current letter symbol, a handwriting drill of the current letter symbol and a phonological processing drill. The exercise for the current letter symbol of the current letter group associated with the student is presented on the student's client device to create multi-sensory interactions with the student for the current letter symbol. The student's responses to the multi-sensory interactions of the exercise from the client device by the phonics component over the communications network. The student's responses to the multi-sensory interactions is processed and scored to determine whether the student advances to the next letter symbol of the current letter group or repeats the current letter symbol of the current letter group. The student's responses to the multi-sensory interactions and the student's score on the current letter symbol is stored in the database. The student is advanced to the next letter symbol of the current letter group by the phonics component if the student's score is greater than or equal to a predetermined threshold and repeats the process for the next letter symbol of the current letter group. However, if the student's score is less than the predetermined threshold, the phonics component retrieves and repeats the process for another exercise for the current letter symbol of the current letter group.

In accordance with an exemplary embodiment of the claim invention, the server is operable to execute the reading comprehension component if the reading comprehension component is selected by the student. The reading comprehension component retrieves a current book from a database comprising a plurality of books at each reading comprehension level. The current book is selected from the student's current reading level. The reading comprehension component presents a current chapter of the current book on the student's client device, and prompts the student to read and highlight the current chapter with colored electronic highlighters. A first color, e.g., green, for main idea; a second color, e.g., blue, for topic; and a third color, e.g., yellow, for detail. The student's highlighted chapter is received from the client device over the communications network. The reading comprehension component processes the student's highlighted chapter to determine a chapter highlighting score based at least on the words correctly highlighted in the current chapter, the words incorrectly highlighted in the current chapter and a total time spent on the current chapter by the student. A predetermined number of questions about the current chapter, one a time, are presented on the student's client device. The student's answers to the questions are received from the student's client device over the communications network. The reading comprehension component processes the student's answers to determine a chapter question score and an overall chapter score based on the student's chapter highlighting score and the student's chapter question score. The student's highlighted chapter, the student's chapter highlighting score, the student's question score and the student's overall chapter score are stored in the database. Upon the completion of the current chapter of the current book by the student, the reading comprehension component retrieves the next chapter of the current book from the database and repeats the process for the next chapter. Upon the completion of the current book by the student, the reading comprehension component retrieves another or next book from the database and repeats the process for the next book until a predetermined number of books, preferably four to five books, from the student's current reading level is completed.

Various other objects, advantages and features of the present invention will become readily apparent from the ensuing detailed description, and the novel features will be particularly pointed out in the appended claims.

BRIEF DESCRIPTION OF THE DRAWINGS

The following detailed description, given by way of example, and not intended to limit the present invention solely thereto, will best be understood in conjunction with the accompanying drawings in which:

FIG. 19 is an exemplary screenshot of the phonics component displaying and reading each of the twenty-one words one at time to the student in a predetermined order in accordance with an exemplary embodiment of the claimed invention;

FIG. 26 is an exemplary screenshot of the phonics component providing a sound of each letter of the completed letter group "pfnta," and prompting the student to listen and choose a word that begins with that sound from a list of three words as part of the end of the letter group assessment in accordance with an exemplary embodiment of the claimed invention;

FIG. 27 is an exemplary screenshot of the phonics component providing a sound of each letter of the completed letter group "pfnta," and prompting the student to listen and choose a word that ends with that sound from a list of three words as part of the end of the letter group assessment in accordance with an exemplary embodiment of the claimed invention;

FIGS. 30-31 are exemplary reading comprehension pre-test for sixth grade in accordance and exemplary embodiment of the claimed invention;

FIGS. 44-49 are exemplary screenshot of the reading comprehension component displaying a series of questions as part of the Interim Progress Assessment in accordance with an exemplary embodiment of the claimed invention.

DETAILED DESCRIPTION OF THE EMBODIMENTS

Figure 1:
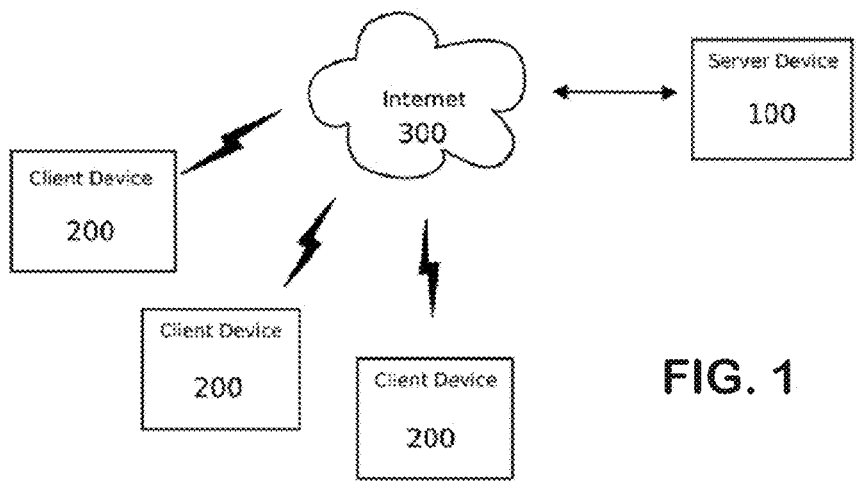
FIG. 1 is a block diagram of the system in accordance with an exemplary embodiment of the claimed invention.
Figure 2:
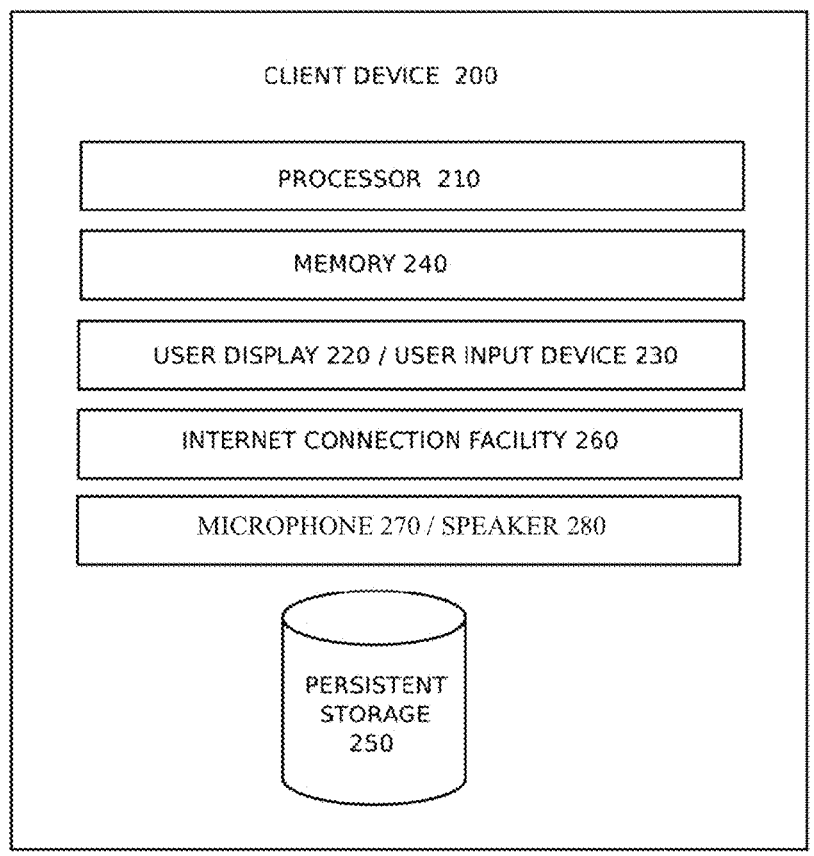
FIG. 2 is a block diagram of a client device in accordance with an exemplary embodiment of the claimed invention.
Figure 3A:
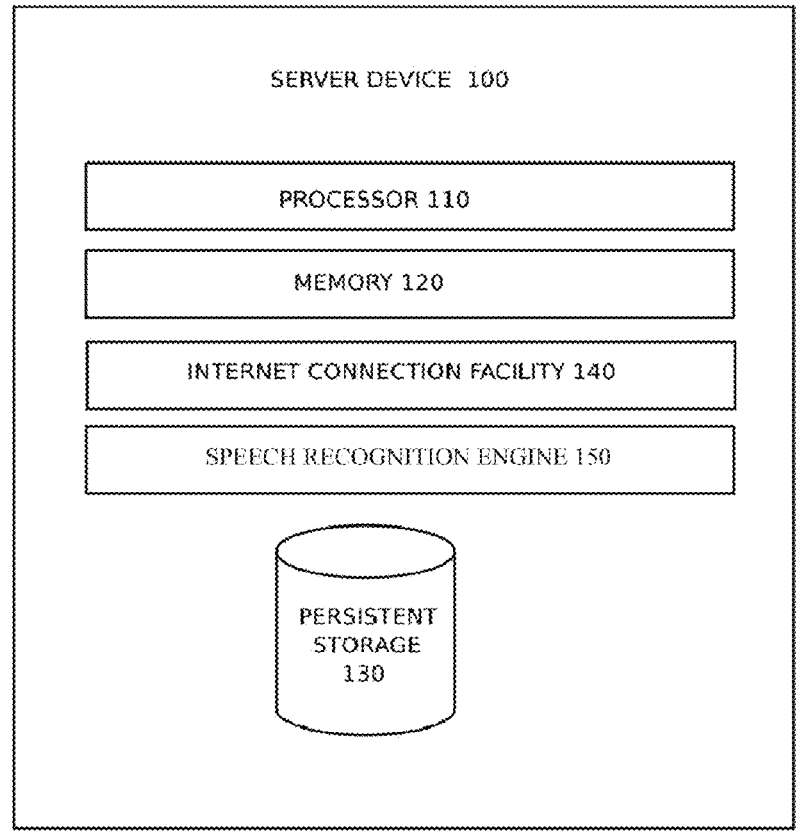
FIG. 3A-B are block diagrams of a server in accordance with an exemplary embodiment of the claimed invention.

As shown in FIG. 1, at the system level, the claimed invention comprises one or more web-enabled processor based client devices 200, one or more processor based servers 100, and a communications network 300 (e.g., Internet). In accordance with an exemplary embodiment of the claimed invention, as shown in FIG. 2, each client device 200 comprises a processor or client processor 210, a display or screen 220, an input device 230 (which can be the same as the display 220 in the case of touch screens), a memory 240, a microphone 270, a speaker 280, an optional storage device 250 (preferably, a persistent storage, e.g., hard drive), and an Internet connection facility 260 to connect to the communications network 300, which can be wired and/or wireless connection device, In accordance with an exemplary embodiment of the claimed invention, as shown in FIG. 3A, the server 100 comprise a processor or server processor 110, a memory 120, a storage device 130 (preferably a persistent storage, e.g., hard disk, database, etc.), and an Internet connection facility 140 to connect to the communications network 300.

The network enabled client device 200 includes but is not limited to a computer system, a personal computer, a laptop, a notebook, a netbook, a tablet or tablet like device, an iPad® (iPad is a registered trademark of Apple Inc.) or iPad like device, a cell phone, a smart phone, a personal digital assistant (PDA), a mobile device, or a television, or any such device having a screen connected to the communications network 300 and the like.

The communications network 300 can be any type of electronic transmission medium, for example, including but not limited to the following networks: a telecommunications network, a wireless network, a virtual private network, a public internet, a private internet, a secure internet, a private network, a public network, a value-added network, an intranet, a wireless gateway, or the like. In addition, the connectivity to the communications network 300 may be via, for example, by cellular transmission, Ethernet, Token Ring, Fiber Distributed Datalink Interface, Asynchronous Transfer Mode, Wireless Application Protocol, or any other form of network connectivity.

Moreover, in accordance with an embodiment of the claimed invention, the computer-based methods for implementing the claimed invention are implemented using processor-executable instructions for directing operation of a device or devices under processor control, the processor-executable instructions can be stored on a tangible computer-readable medium, such as but not limited to a disk, CD, DVD, flash memory, portable storage or the like. The processor-executable instructions can be accessed from a service provider's website or stored as a set of downloadable processor-executable instructions, for example or downloading and installation from an Internet location, e.g. the server 100 or another web server (not shown).

The claimed interactive system and method utilizes the students' senses of sight, speech, hearing and touch to virtually replicate the one-on-one session between a teacher and a student. This enables each student to progress at her own pace. The claimed system and method interactively teaches the student how to read, write and blend letters into words by assessing her performance and focusing on the student's area of weakness. In accordance with an exemplary embodiment of the claimed invention, the system and method comprises a phonics component and a reading comprehension component. The phonics component utilizes electronic flash cards to teach the student to recognize and correctly pronounce the letter or combination of letters. As the student progresses, the phonics component combines individual letters and sounds with other letters and sounds to compose words to enhance the student's word recognition. The phonics components utilize pictorial illustrations of commonly associated words with the selected letter (or combination of letters) to teach the student to properly voice the letter and sound by repeating the sounds of the letter and/or words beginning with that letter.

In accordance with an exemplary embodiment of the claimed invention, the claimed system interactively engages the student to teach the student how to read, write and blend letters into word by engaging the student to perform one of more of the following activities or interactions: 1) seeing a letter; 2) seeing the word (illustrated with a picture) associated or beginning with the letter; 3) hearing the proper pronunciation of the letter and sounds made by the letter; 4) pronouncing the sound of the letter; 5) making tactile impressions of the letter through skywriting and/or sand writing of the letter using a mouse on the screen or with their finger using a touch screen; 6) identifying a picture that starts with the sound the letter makes; 7) typing the letter that makes the sound of the letter being learned; 8) blending the sounds of a consonant and a vowel learned into words; 9) listening to the claimed system reading two or three letter words and reading the same words himself; 10) listening to the claimed system reading a predetermined number of words, e.g., twenty-one item word list, and then the student reading the same word list; 11) reading the same twenty-one item word list three times, and being timed for each effort by the claimed system; 12) seeing the word per minute results charted by the claimed system; 13) listening to the claimed system pronounce sight words written on electronic flash cards and then pronouncing the same words to memorize them; and 14) listening to the claimed system read a series of sentences comprising a nonsense story and then reads the same sentences made up of letters and sound the student just learned, along with sight words.

The claimed system and method is now described using online version of the claimed invention. It is appreciated that the claimed system can be downloaded from the provider's server 100 or loaded from computer readable media to the client device 200, thereby running the various components of the claimed system locally within the client device 200. A student using a client device 200 logs on to the web server 100 over a communications network, such as the Internet 300. If the student is a first time user, then the student will go through the registration process to obtain a username and password. If the student has a username, then the server processor 110 will not allow the student to access the various components of the claimed system until the student is authenticated as an authorized user via the username/password combination.

Figure 3B:
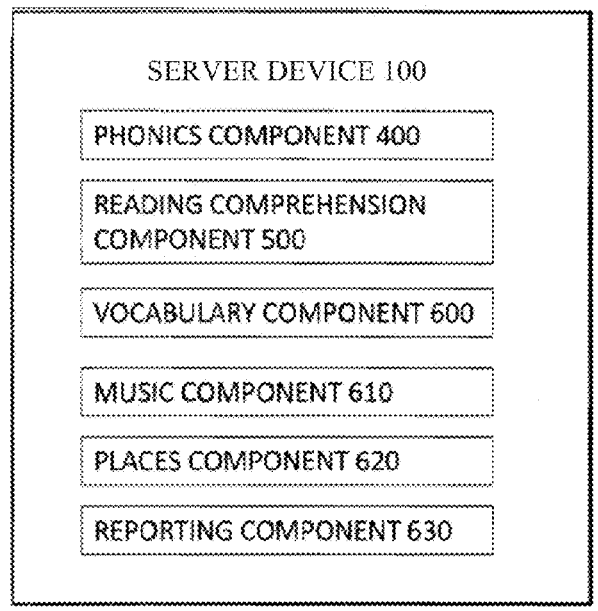

Once the student logs into the server 100 with a valid username/password combination, as exemplary shown in FIG. 3B, the student is provided with a menu of various learning tools to teach the student how to read, write and spell, e.g., a multi-sensory phonics application or component 400, a reading comprehension application or component 500, a vocabulary application/component 600, a music application/component 610, a places application/component 620 and a reporting component 630. The phonics component 400 teaches the student to pronounce and spell letters and words correctly. The reading comprehension component 500 teaches student vocabulary, to read and comprehend passages through an inventive highlighting process. The vocabulary component 600 allows the student to search for words, provides definition for the selected word and provides a plurality of games, such as hangman, to associate a word to a definition. The student can select a word in the passage displayed by the reading comprehension component 500 to learn more about the selected word, such as its definition, synonyms, antonyms, and its use in a sentence. The reading comprehension component 500 activates and routes the student to the vocabulary component 600 when a word in the passage is selected by the student. The music component 610 is similar to the reading comprehension component 500 except that the music component 610 uses songs and lyrics instead of passages to hold the attention of the student while teaching the student vocabulary, grammar and reading comprehension. Similarly, the places component 620 uses geographic places, e.g., Paris, France, to teach the student vocabulary, grammar and reading comprehension. Accordingly, a detailed description of the phonics component 400 and reading comprehension component 400 will be provided herein.

When a selected component is used for the first time by the student, in accordance with an exemplary embodiment of the claimed invention, the selected component instructs the server processor 110 to determine the appropriate level (e.g., grade level) of the student. For example, if the selected component is the reading comprehension component 500, then the reading comprehension component 500 instructs the server processor 110 to retrieve a pre-test questionnaire appropriate for the student's current grade level from the database 130. Each question of the pre-test questionnaire is transmitted to the client device 200 over the communications network 300 and displayed one at a time on the screen or display 220. The student enters the answers to each question using the input device 230. The server processor 110 computes the student's score and determines the reading comprehension level of the student. For example, if the server processor 110 executing the reading comprehension application 500 determines that the reading comprehension level of a 5th grade student is at 3rd grade level, then the reading comprehension application 500 provides reading comprehension material appropriate for a 3rd grade student. After placement of the student at the appropriate grade level based on the pre-test assessment, the student is provided with a tutorial as to how to use the particular component of the claimed system.

Turning now to the phonics component, in accordance with an exemplary embodiment of the claimed invention, the phonics component 400 comprises a plurality of phonics modules for teaching students the alphabetic ode of the English language and to read through voice and handwriting recognition. Each phonics module comprises a different letter category of the alphabetic code and plurality of exercises for teach the student the letter category of each phonics module with a series of multi-sensory interactions with the student. The claimed phonics component 400 will now be described herein using an exemplary CVC (consonant-short vowel-consonant) phonics module comprising the CVC letter category. The CVC phonics module divides the English language alphabetic code into five CVC (consonant-short vowel-consonant) groups or exercises, each with consonants and short vowels: a) pfnta; b) srcke; c) bgmli; d) dvjho; and e) qwxyzu. After the student logs in and selects the phonics component 400 (or MaxPhonics, the name of the component established by the assignee of this claimed invention), the server processor 110 executes the phonics application 400 and displays a series of screens on the computer display 220 of the client device 200 associated with the student. The server processor 110 runs the phonics application 400 on auto-play mode to display a series of screens, one screen after another screen. The student can advance to the next screen faster by clicking the right arrow button on the bottom of the screen or move back to the previous screen by clicking the left arrow button on the bottom of the screen. The student can pause the screen at any time by pressing the pause button. If video is playing in the screen, then it will continue until it is finished, and the screen will not advance to the next screen.

Figure 4:
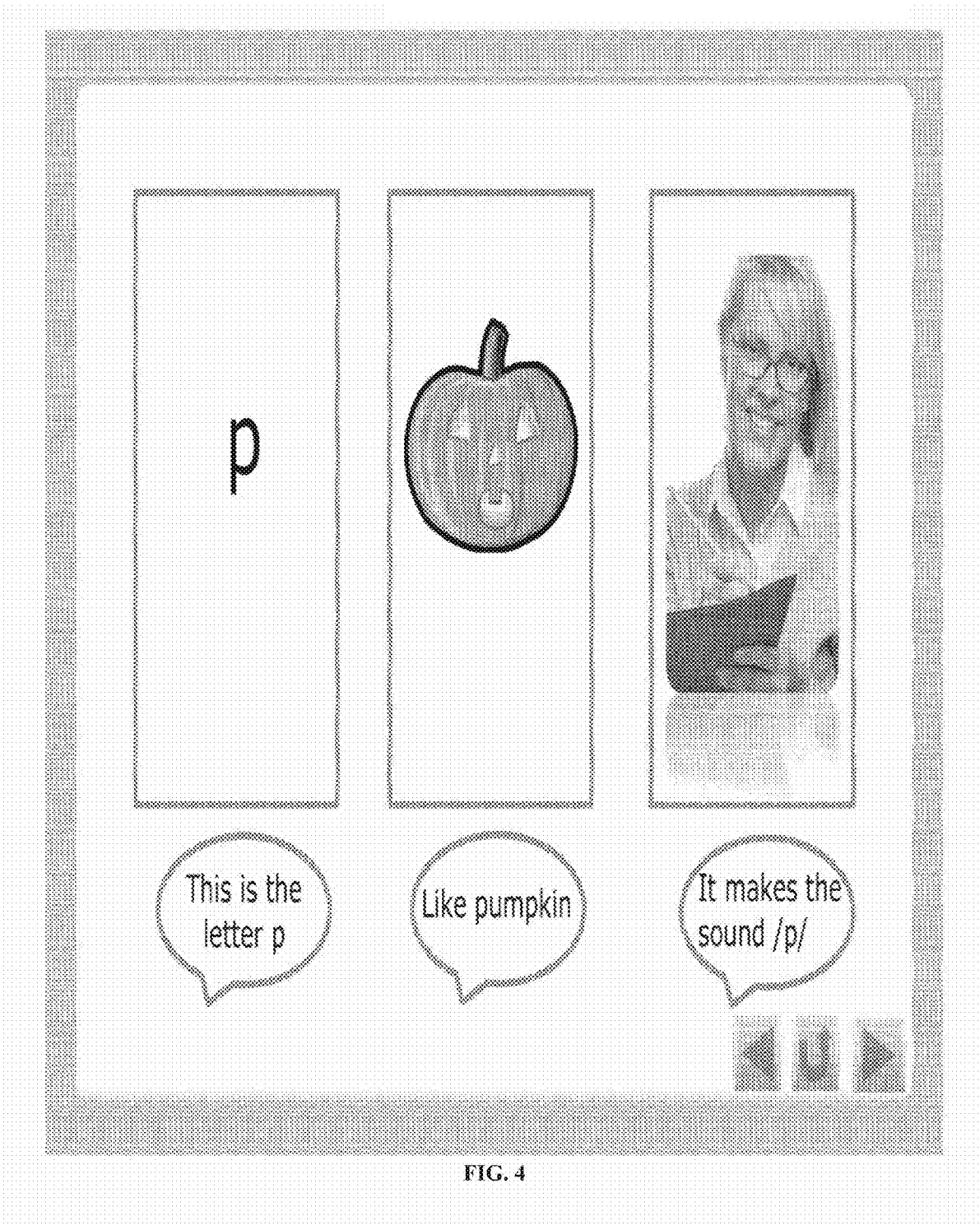
FIG. 4 is an exemplary screenshot of a visual drill of letter p by the phonics component in accordance with an exemplary embodiment of the claimed invention.
Figure 5:
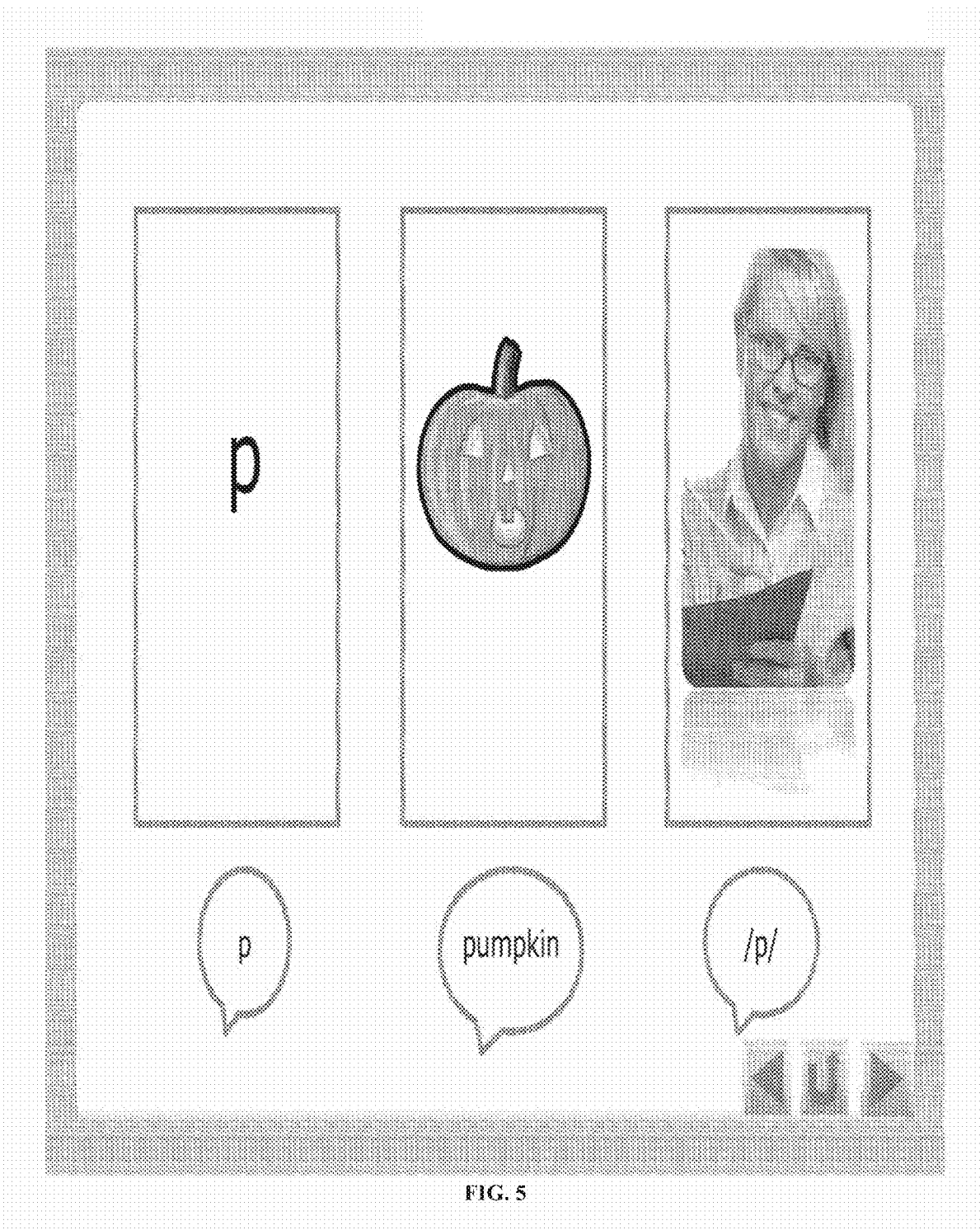
FIG. 5 is an exemplary screenshot of a video played by the phonics component wherein a speaker pronounces the letter p and the word pumpkin, and the sound the letter p makes in accordance with an exemplary embodiment of the claimed invention.
Figure 6:
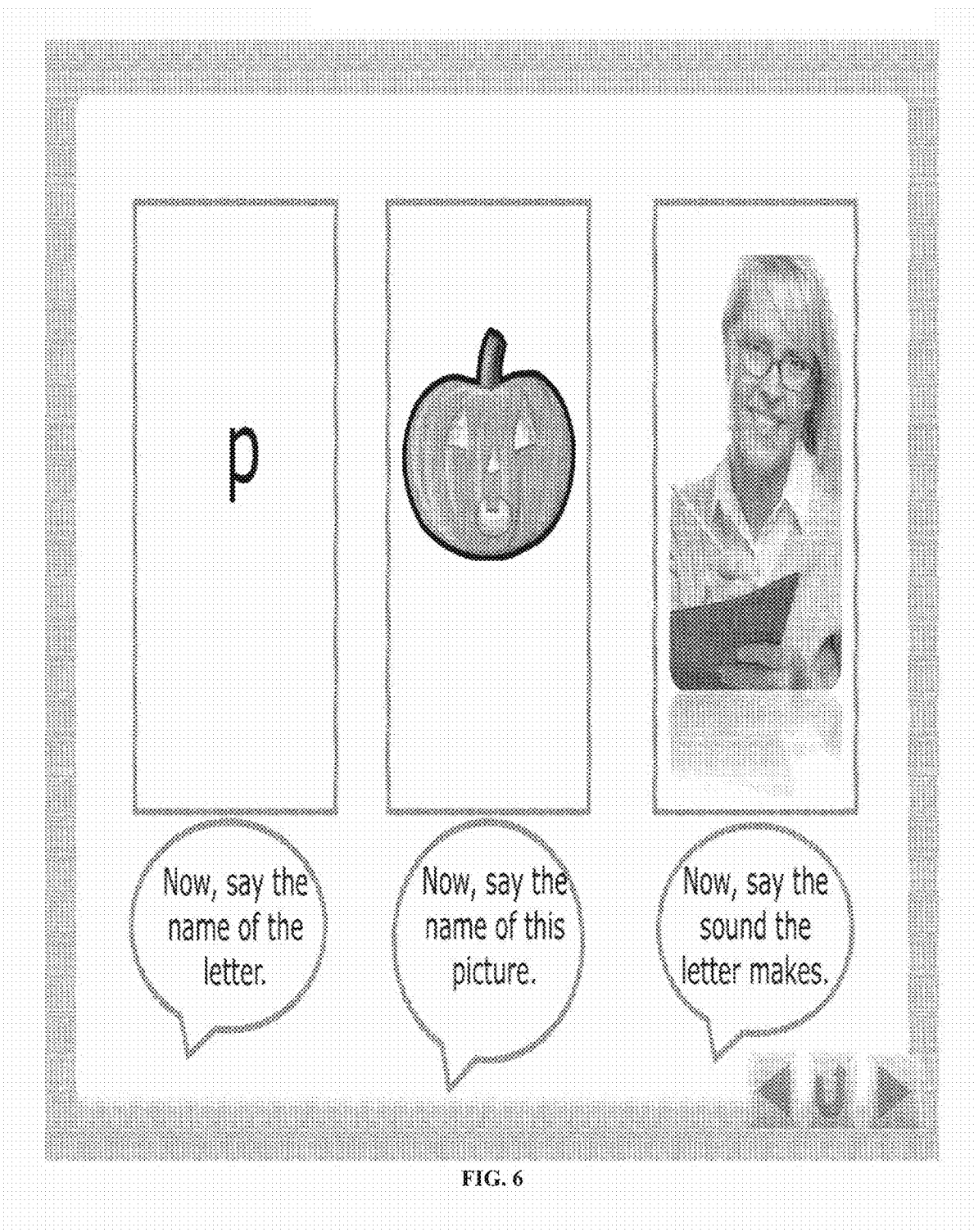
FIG. 6 is an exemplary screenshot of a video played by the phonics component wherein a speaker encourages the student to pronounces the letter on the screen and the name of the picture, and the sound this letter makes in accordance with an exemplary embodiment of the claimed invention.

In accordance with an exemplary embodiment of the claimed invention, the phonics component presents on the screen 220 of the client device 200, a visual drill of a specific letter (letter-picture-sound). As exemplary shown in FIG. 4, there is illustrated a screenshot of the phonics component 400 conducting a visual drill of letters "pfnta," starting with letter p: "This is the letter p"; "Like pumpkin"; and "It makes the sound /p/". As exemplary shown in FIG. 5, the phonics component 400 plays one or more video of a person pronouncing the letter p, pronouncing the word pumpkin, the name of the item in the picture, and the sound the letter p makes. Preferably, the phonics component 400 plays the video as exemplary shown in FIG. 5 multiple times, e.g., two or three times, encouraging the student to say the sound the letter and the word makes together with the speaker and by himself as exemplary shown in FIG. 6. Although the three tasks/interactions are shown together in FIG. 6, the phonics component 400 display these three tasks/interactions on separate screens. That is, for example, the phonics component 400 can display a letter on the student's computer screen 220 and encourage the student to pronounce the letter on the screen 220. The phonics component 400 then displays a picture/image of an item (e.g., animal, structure, etc.) beginning with the letter shown in the previous screen and encourages the student to pronounce the name of the picture on the student's computer screen 220. Thereafter, the phonics component 400 encourages the student to say the sound that the letter makes on the student's computer screen 220. In accordance with an exemplary embodiment of the claimed invention, the client processor 210 records the student's pronunciation of the letter p and the word pumpkin and the sound made by the letter p using the microphone 270. The client processor 210 transmits the recording of the student's pronunciation to the server processor 110. The server processor stores the recording of the student's pronunciation in the database 130 and analyzes the recording to calculate a score. The server processor 110 calculates the score using the speech recognition engine 150. The speech recognition engine 150 comprises a library of correct sounds and compares the sounds spoken by the student to the correct sounds in the library. Based on how close the correct sounds compare to the student's sounds, the server processor 110 assigns a score between 0% and 100%.

Figure 7:
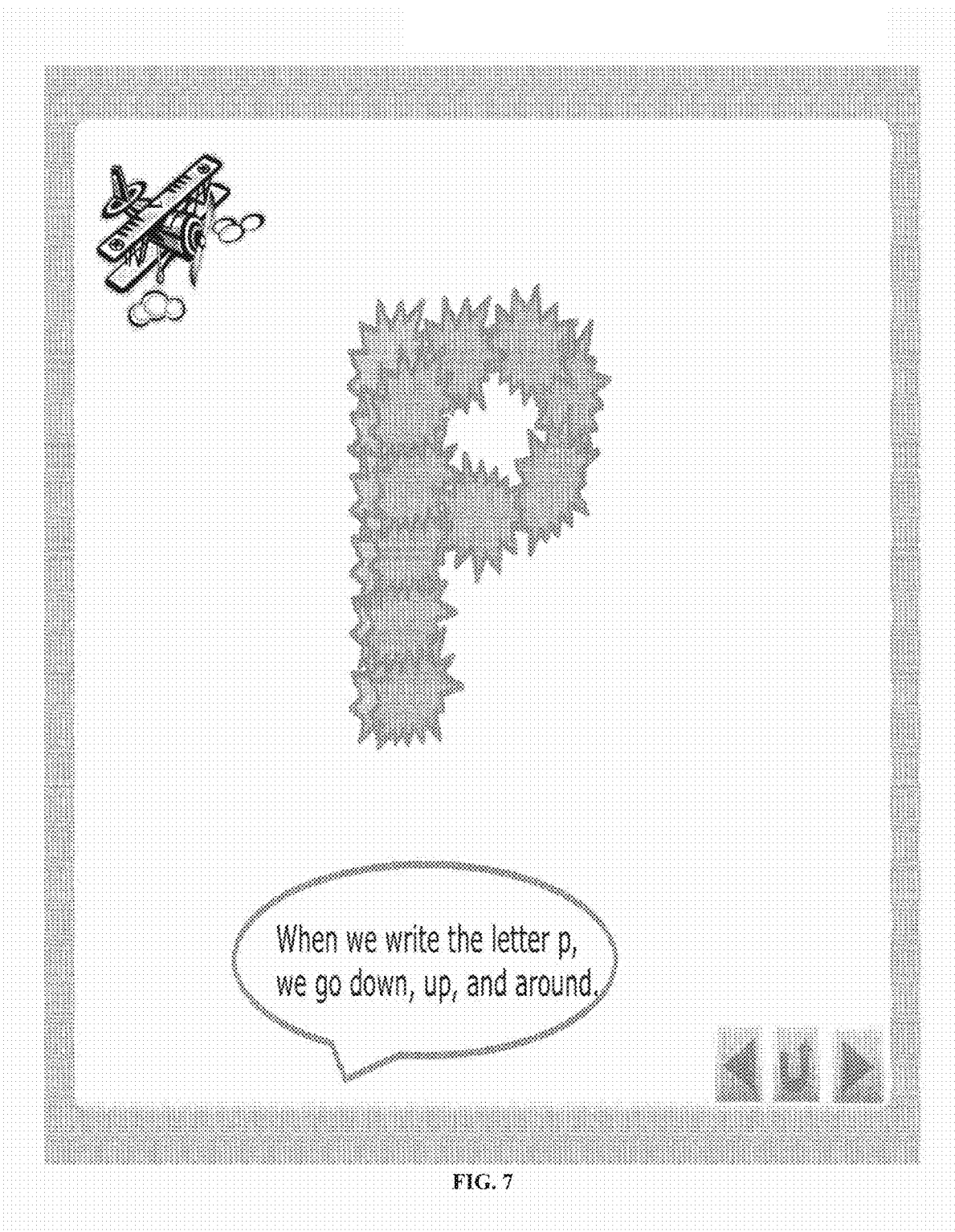
FIG. 7 is an exemplary screenshot of the phonics component playing an animation of sky writing of the letter p in accordance with an exemplary embodiment of the claimed invention.
Figure 8:
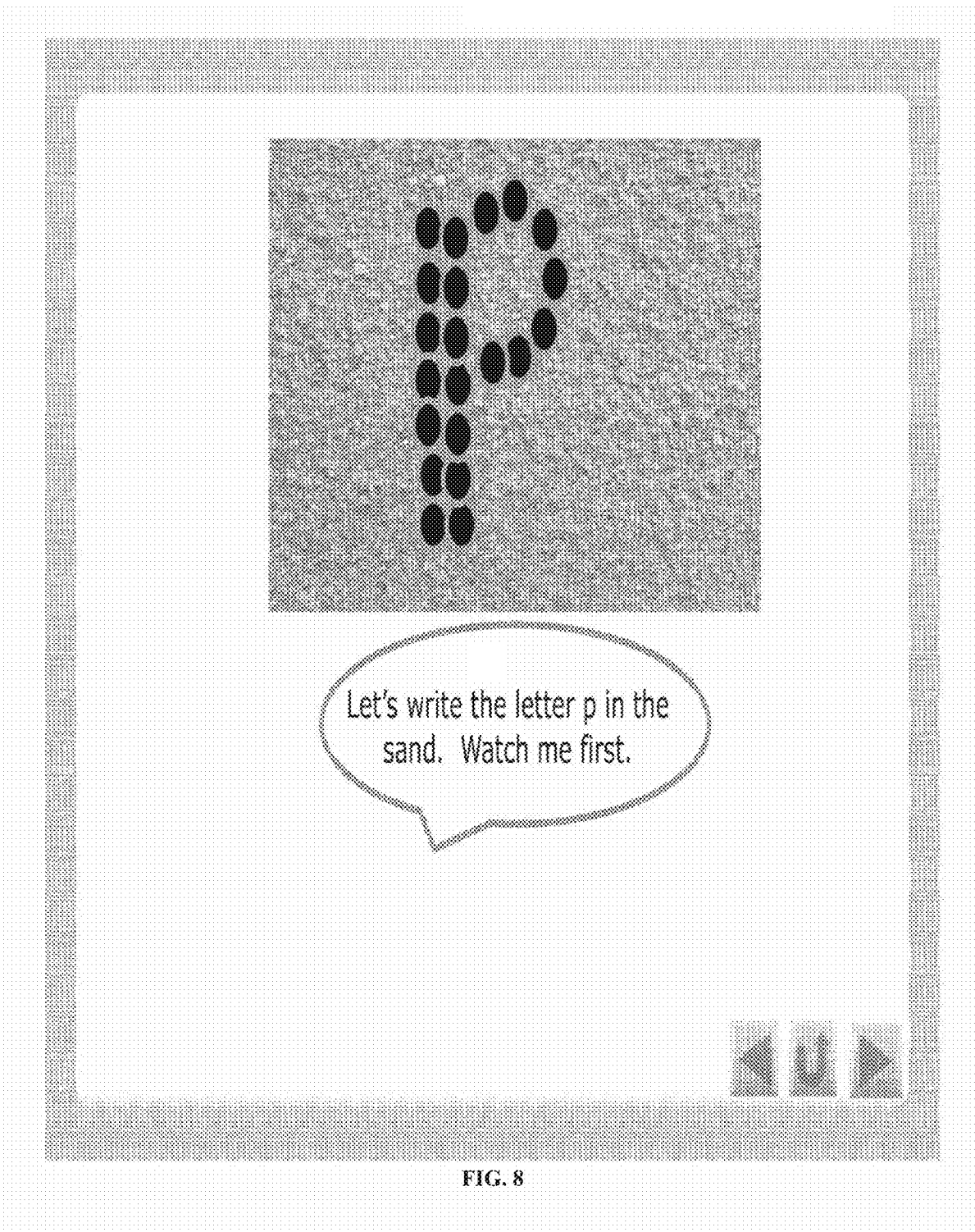
FIG. 8 is an exemplary screenshot of the phonics component playing an animation of sand writing of the letter p in accordance with an exemplary embodiment of the claimed invention.
Figure 9:
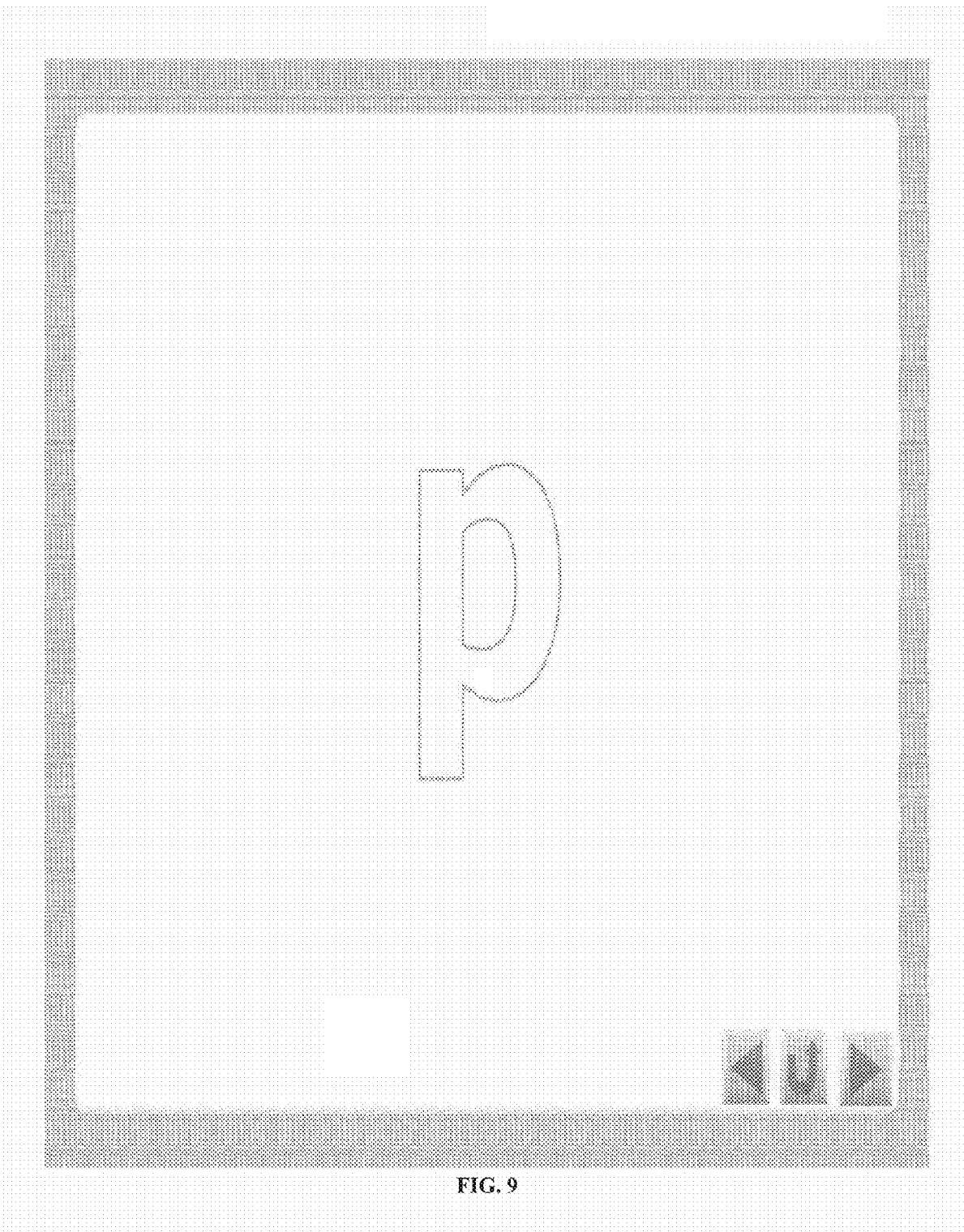
FIG. 9 is an exemplary screenshot of the phonics component displaying letter p to assess student's writing skill in accordance with an exemplary embodiment of the claimed invention.
Figure 10:
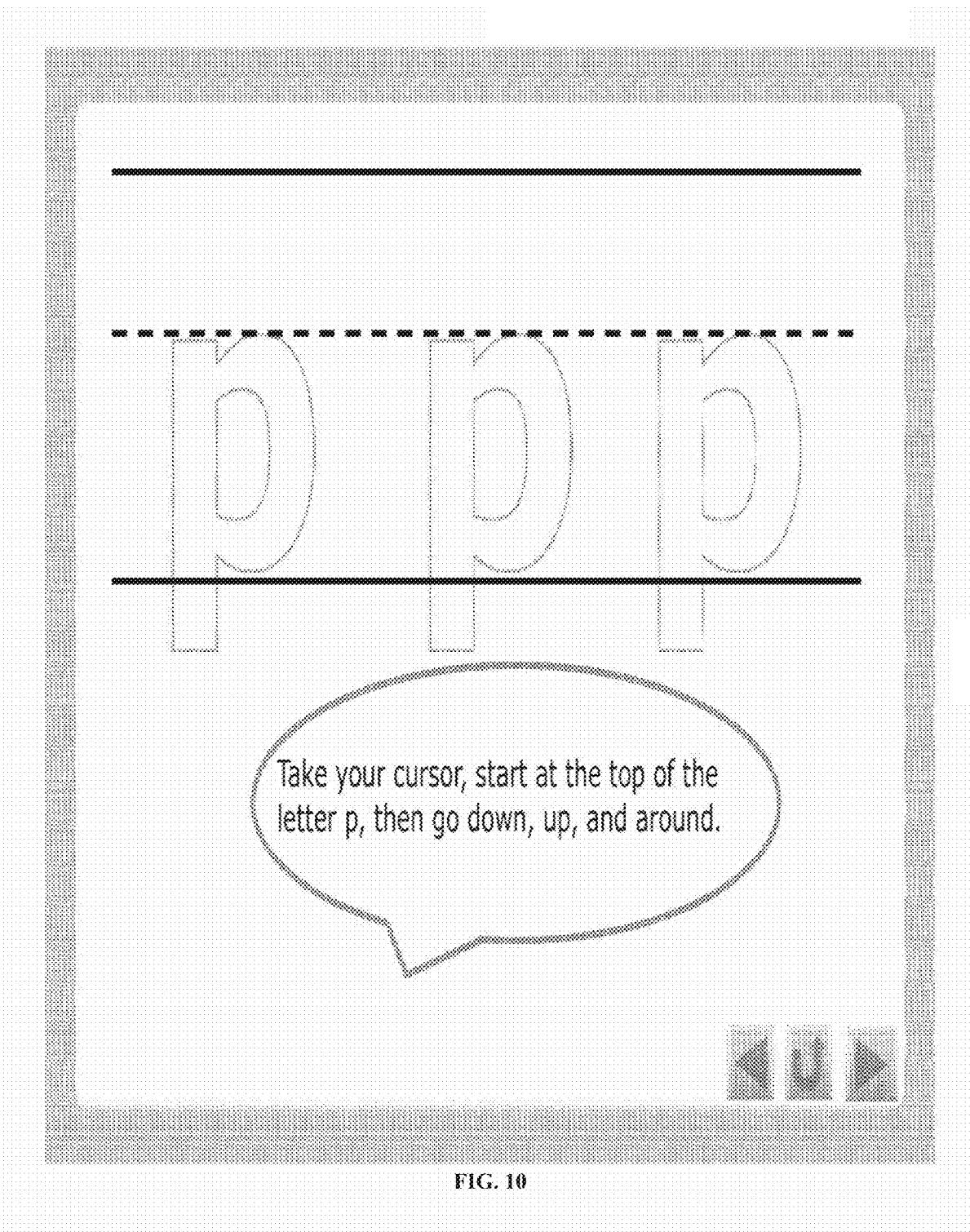
FIG. 10 is an exemplary screenshot of the phonics component displaying and instructing the student to write the letter p three times in accordance with an exemplary embodiment of the claimed invention.

The phonics component 400 then shows the student how to write the letter p using sky writing and sand writing. The phonics component 400 shows an animation of sky writing of letter p using an airplane, as exemplary shown in FIG. 7, and an animation of sand writing of letter p using a stick in the sand, as exemplary shown in FIG. 8. After each animation, the phonics component 400 encourages the student to practice writing the letter p on the computer screen 220 with mouse 230 or using her finger on the touchpad or touch screen 220. As part of the assessment, the student is prompted to write the letter p. The phonics component 400 compares the student's writing of letter p to a correctly written letter p as a template or silhouette, as exemplary shown in FIG. 9. The phonics component 400 will then grade the student's writing of letter p based on a predetermined accuracy score, e.g., the phonics component 400 may assign a grade of pass or fail. In accordance with an exemplary embodiment of the claimed invention, the phonics component calculates the score by comparing the student's handwriting with the template silhouette which is the "correct" answer. A student can score between 0 and 100% on letter writing based on how closely their handwriting matches that of the template. To reinforce the student's writing skill, as exemplary shown in FIG. 10, the phonics component 400 prompts the student to write the letter p on the computer screen 220 with the mouse 230 until she writes the letter p correctly three consecutive times. Each time, the phonics component 400 provides verbal directions or instructions for writing the letter p.

Figure 11:
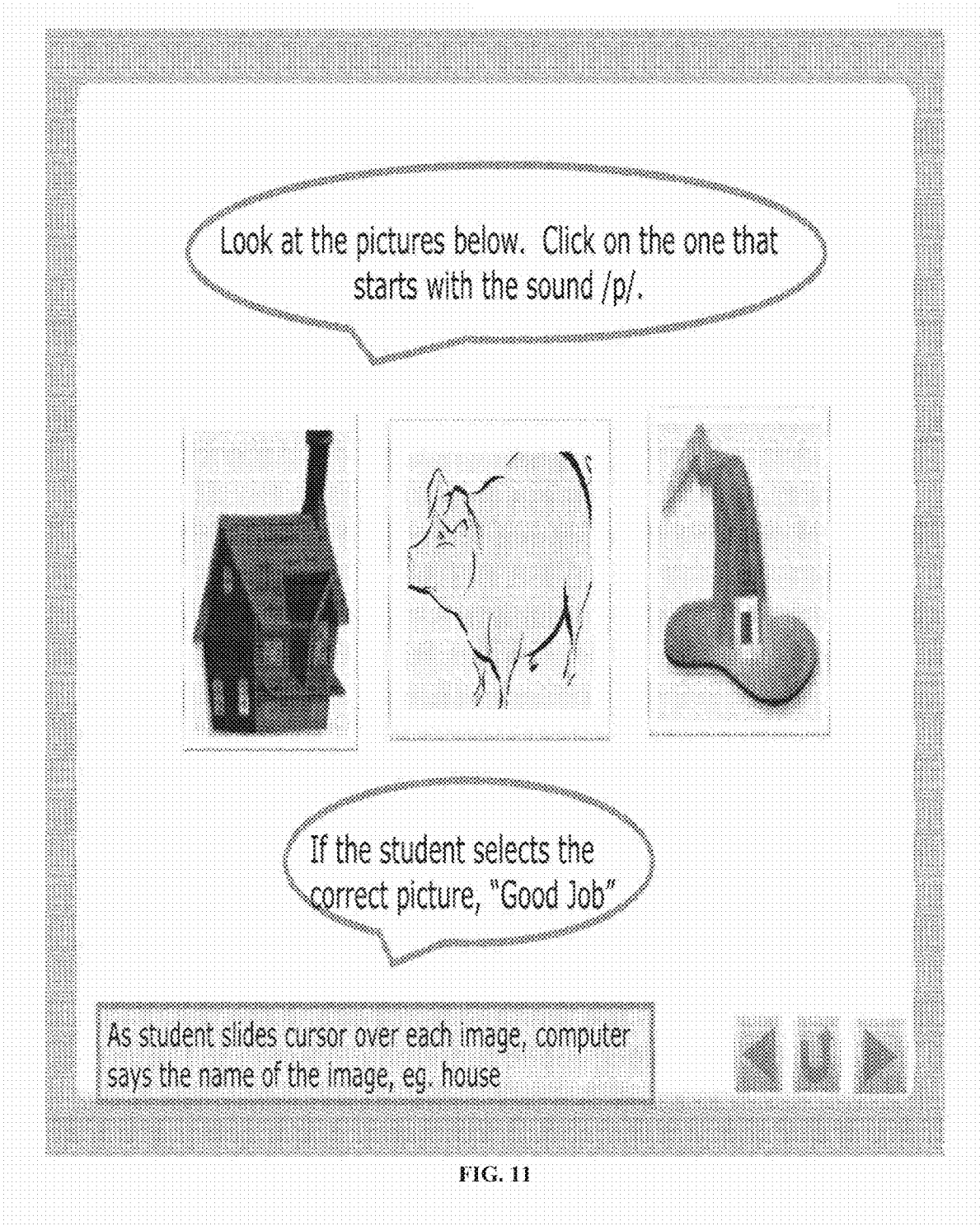
FIGS. 11-12 are exemplary screenshots of the phonics component displaying three pictures and prompting student to identify the picture that starts with the sound /p/ in accordance with an exemplary embodiment of the claimed invention.
Figure 12:
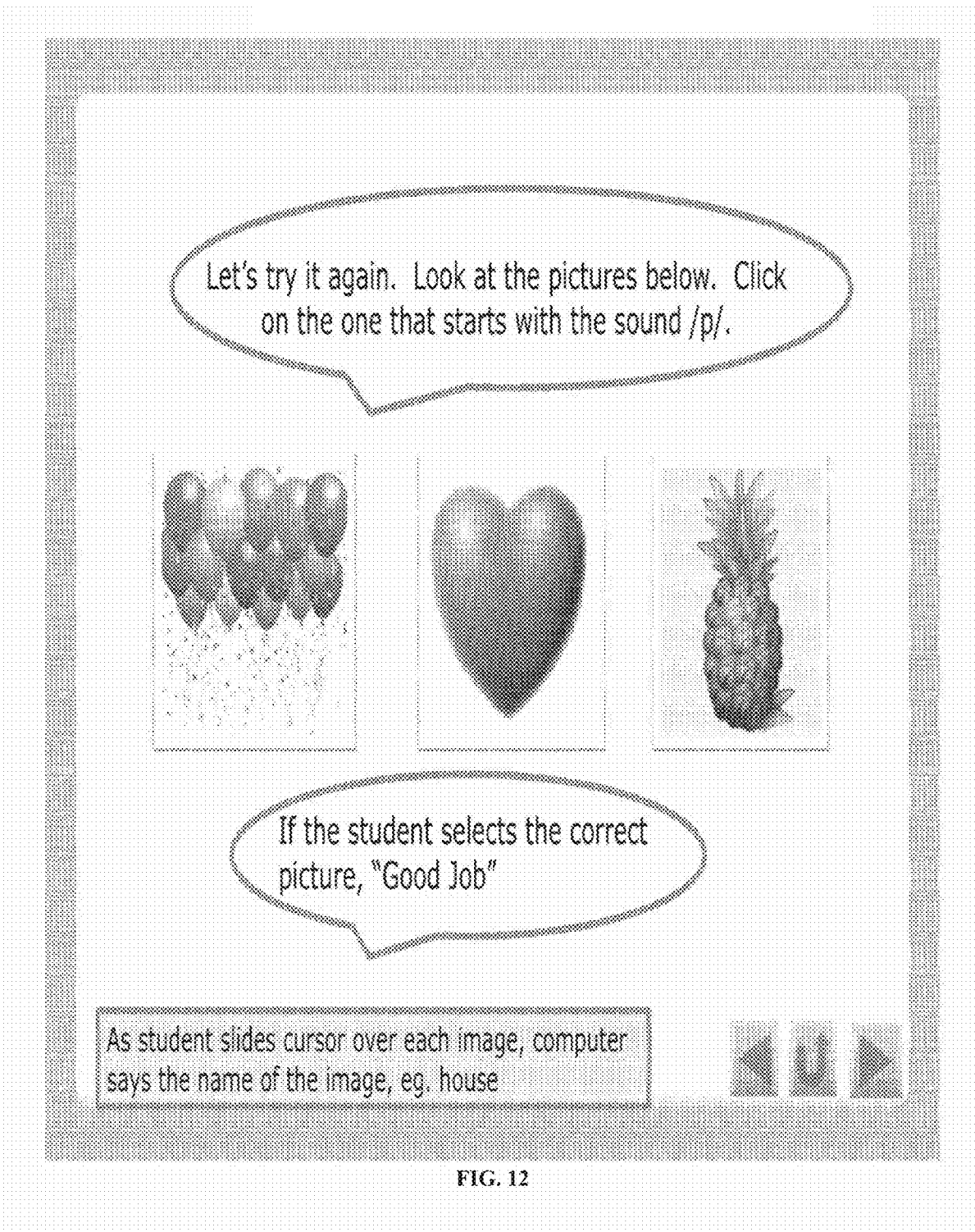

The phonics component 400 now teaches the student to associate words (in pictorial form) to the letter p that she just learned. As exemplary shown in FIGS. 11-12, the phonics component 400 provides two consecutive screens, each with three images, and prompts the student to identify the image that starts with the sound /p/. The phonics component 400 assigns a score if the student answered the questions correctly on the first try. In accordance with an exemplary embodiment of the claimed invention, the student can score either 0%, 50% or 100% based on their interactions on the two screens where they must choose the correct image. If the student chooses incorrectly on both screens, then the phonics component 400 assigns a score of 0%. If the student chooses the correct image on only one of the two screens, then the phonics component 400 assigns a score of 50%. If the student chooses the correct image both times, then the phonics component 400 assigns a score of 100%.

In accordance with an exemplary embodiment of the claimed invention, after completing the interactions of saying the letter p, saying the image that starts with the letter p, saying the sound /p/, writing with the letter p and recognizing the images, the phonics component 400 averages the student's interactions to provide an assessment of the student's interactions. All of the scores and interactions between the student and the phonics component 400 are stored in the database or persistent storage 130 by the server processor 110. Preferably, the database 130 only saves the student's first response in each interactions (i.e., first response to each question), or alternatively, the database 130 saves all responses but the phonics component 400 only considers the student's first response in computing the aggregate score. The phonics component 400 determines system an average score of each of these interactions, using an aggregate score where each is weighted equally.

If the student's score is less than a predetermined threshold (e.g., 70%), then the student must repeat the process for the letter p. If the student's score is greater than equal to the predetermined threshold, then the phonics component 400 advances the student to the next letter in the group or the letter f in the group of "pfnta" and repeats the process for letter f instead of letter p. For example, if the student scored 50% on the writing the letter and recognizing the image and 90% on saying the sound and saying the image, the average score is 70% and the student is advanced to the next exercise (or next letter in the group) since the student achieved a passing grade. For saying the sound and saying the image, the server processor 110 receives the student's recording from the client processor 210 and then calculates the score using a speech recognition engine 150. The speech recognition engine 150 comprises a library of correct sounds and compares the sounds spoken by the student to the correct sounds in the library. Based on how close the correct sounds compare to the student's sounds, the server processor 110 assigns a score between 0% and 100%.

It is appreciated that the student may not complete all of these steps or interactions in one session. The student can exit the phonics component 400 and logoff the client device 200 at any time, preferably at the conclusion of a particular interaction. The server processor 110 stores all of the interactions between the student and phonics component 400 during the session. When the student logs into the server 100 to start another session, the phonics component 400 returns the student to the point where she left off during her last session.

Figure 13:
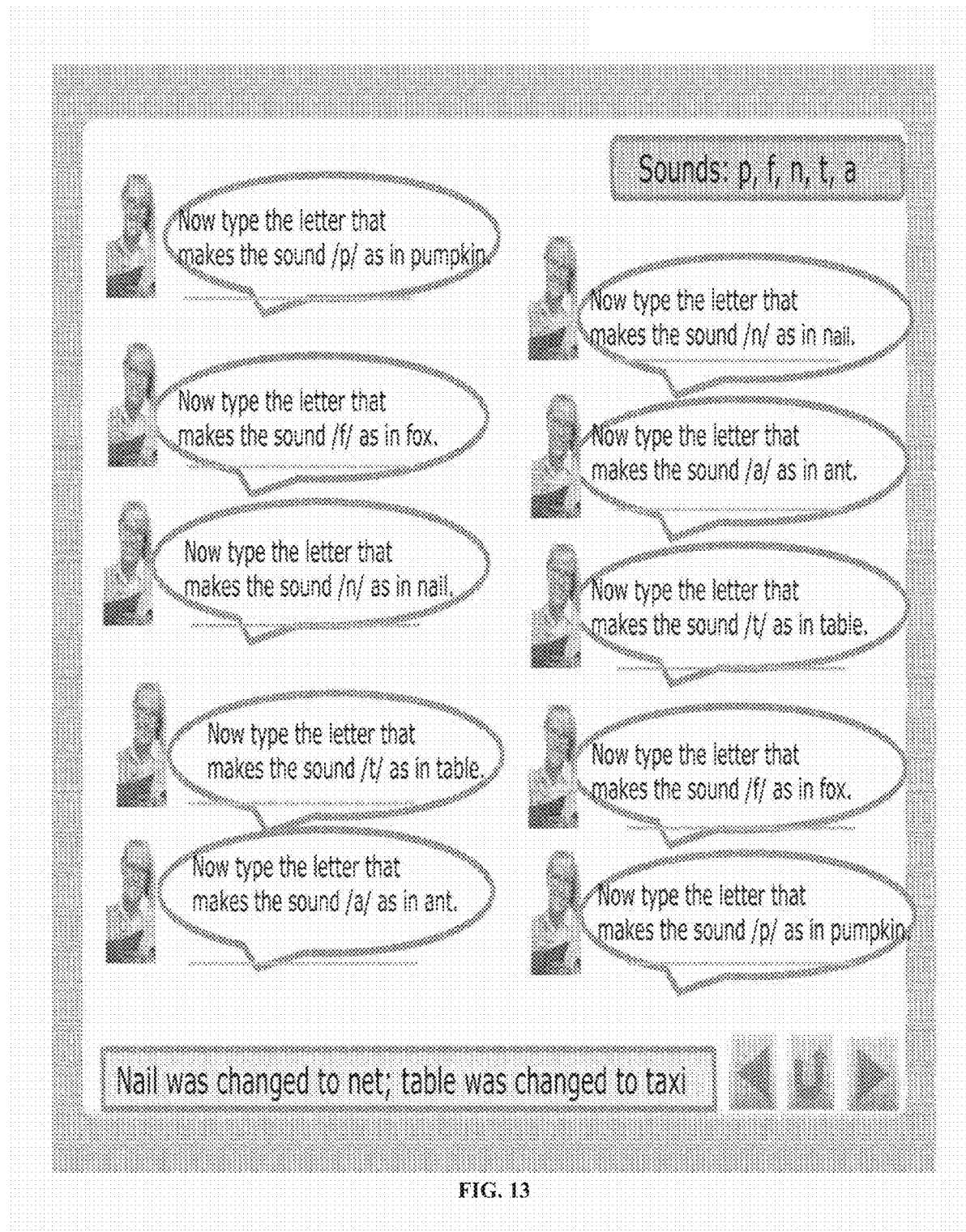
FIG. 13 is an exemplary screenshot of the phonics component prompting the student to type the letters that makes particular sounds in accordance with an exemplary embodiment of the claimed invention.

Upon completion of the last letter in the letter group, the phonics component 400 assesses the student's understanding of these letters in the group using one or more drills, and then conducts an assessment of the student's ability to recognize beginning sounds, middle sounds and ending sounds. In accordance with an exemplary embodiment of the claimed invention, the phonics component 400 provides an auditory sound drill incorporating all the letters that the student learned in a particular group, e.g., letters pfnta. As exemplary shown in FIG. 13, the phonics component 400 plays sounds that various letters make (one at a time) and prompts the student to type the letter associated with each sound, e.g., "type the letter that makes the sound /p/ as in pumpkin." The phonics component 400 plays sounds of a predetermined number of the letters, preferably 10 or 12 sounds, to judge a student's ability to identify a letter when only given the sound it makes. The phonics component 400 assigns points to the student points for entering the proper letter on the first try and stores any assigned points in the database 130.

Figure 14:
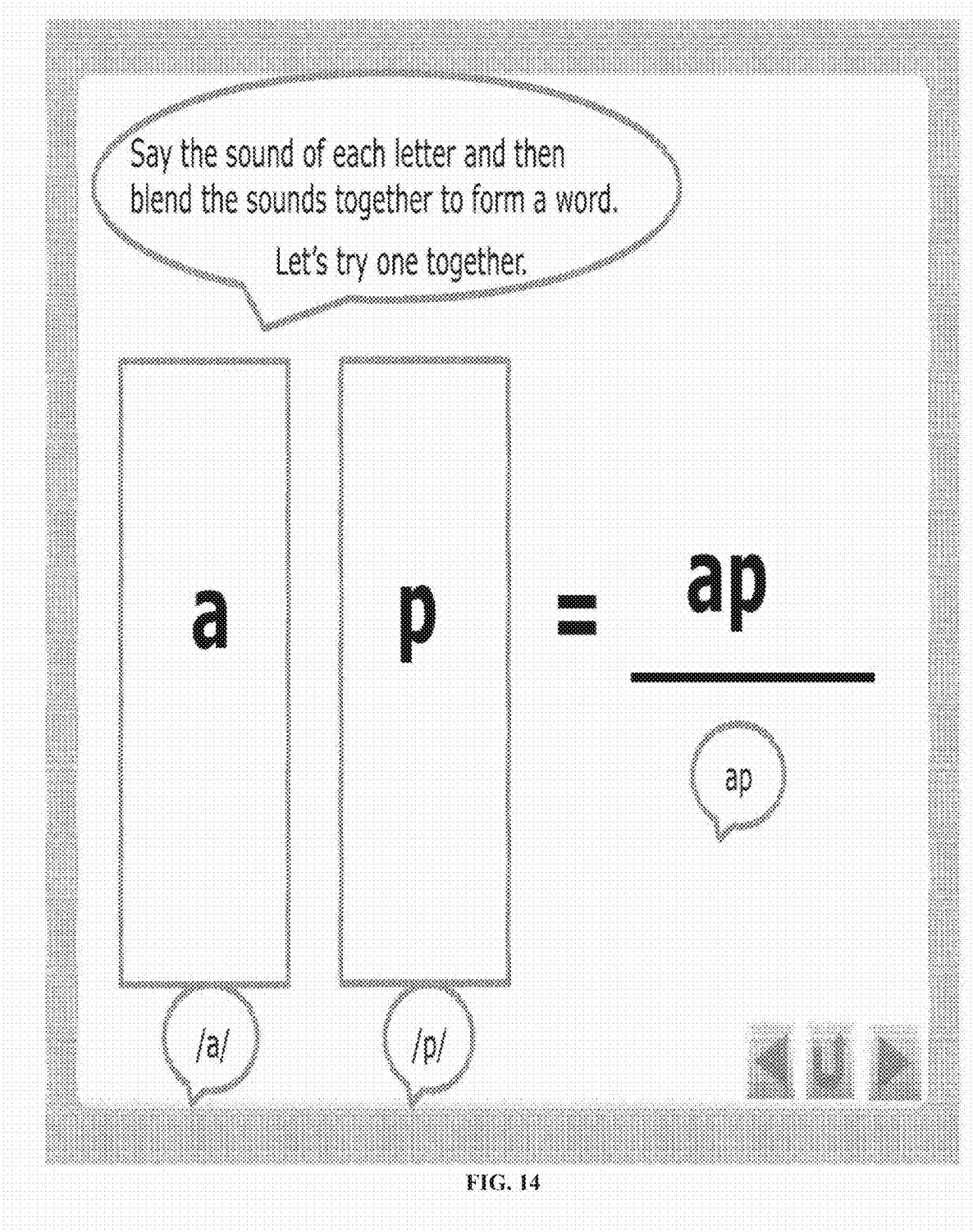
FIG. 14-16 are exemplary screenshots of the phonics component demonstrating and prompting the student to blend two or three letters into a word or nonsense word in accordance with an exemplary embodiment of the claimed invention.
Figure 15:
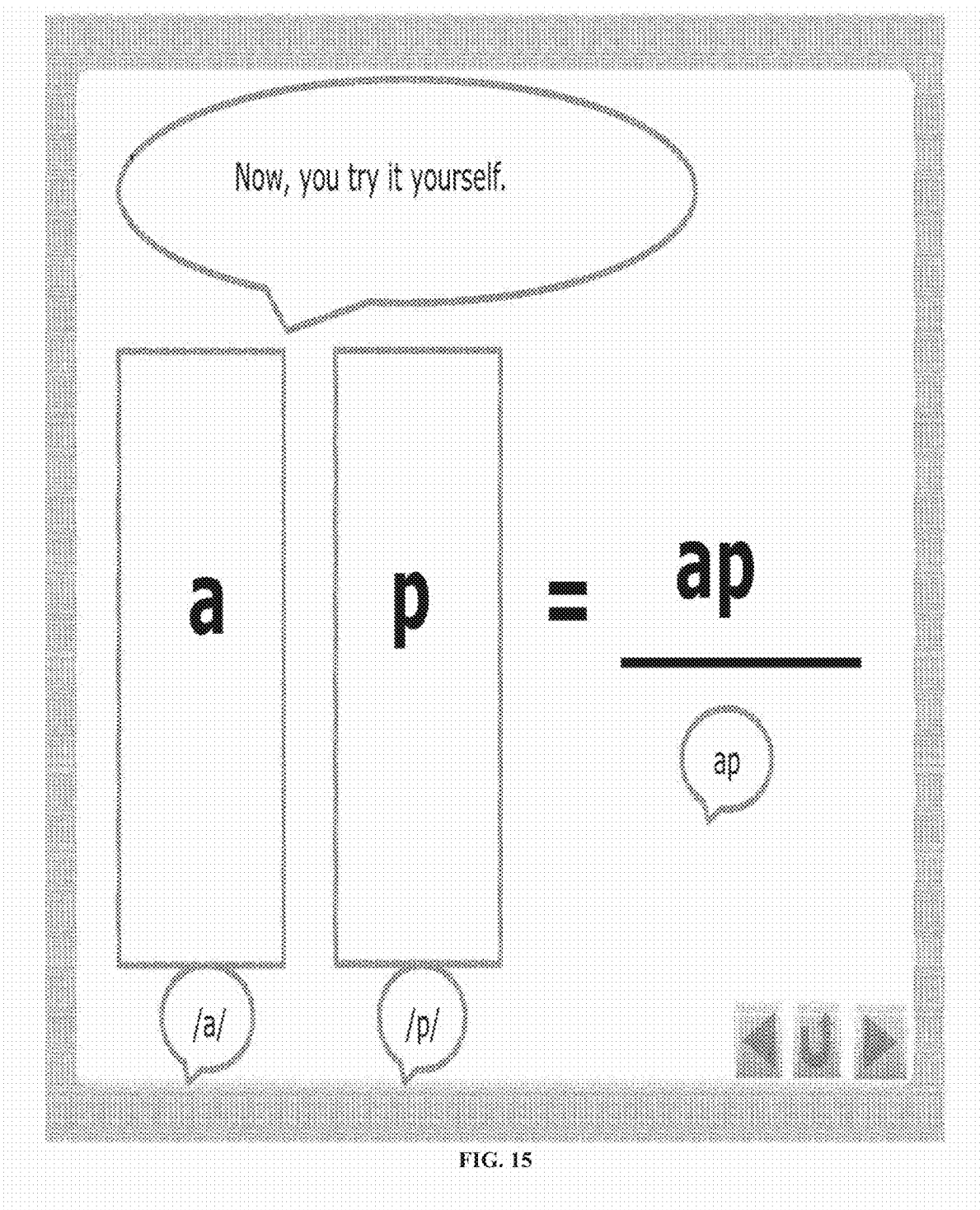
Figure 16:
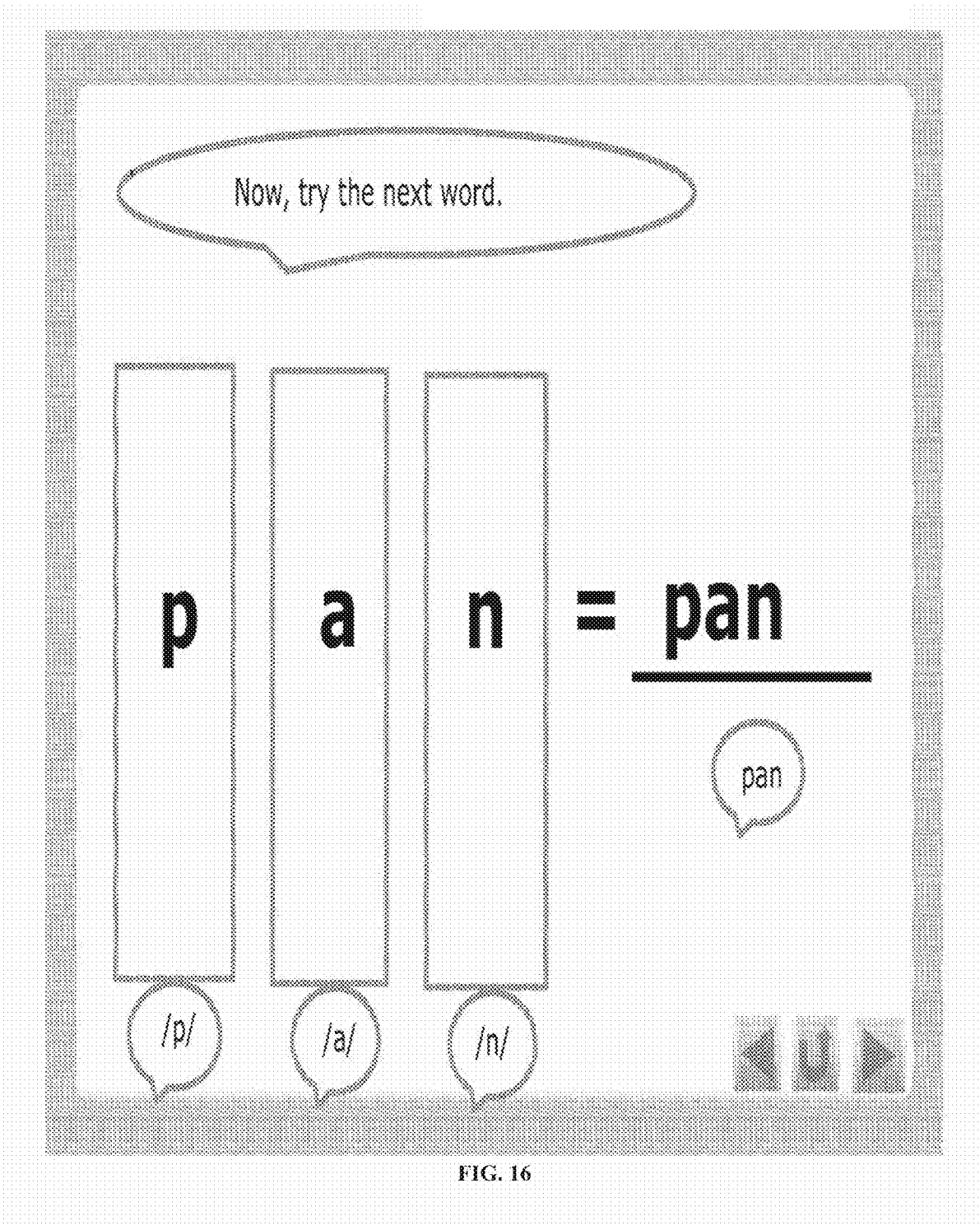

In accordance with an exemplary embodiment of the claimed invention, the phonics component 400 provides a decoding drill to assess the student's capability of blending the sounds of the learned letters into words and pronouncing the words correctly. As exemplary shown in FIG. 14, the phonics component 400 demonstrates and student follows blending first two letters, then three letters into a word. As the student progresses in learning the alphabetic code, the words presented by the phonics component 400 will get longer. The phonics component 400 then displays a series of screens prompting the student to say the sound of each letter on the screen and then blend the sounds together to form a word, as exemplary shown in FIGS. 15-16. The client processor 210 records the student pronouncing the blends using the microphone 270 and transmits the recorded pronunciation to the server 100 for processing. The server processor 110 stores the student's recorded pronunciation in the database 130 and analyzes the student's recorded pronunciation using the speech recognition engine 150. The server processor 110 assigns a score from 0% to 100% based on the comparison of the student's pronunciation to the correct pronunciation by the speech recognition engine 150 and stores the score in the database 130. For example, for the sound "ap", if the student's pronunciation is more similar to "ape" than "ap", then the server processor 110 will assign a lower score to the student.

Figure 17:
FIGS. 17-18 are exemplary screenshots of the phonics component displaying a series of flash card containing words (real and nonsense) of two, three and/or four letters to assess student's ability to blend the letters into a word in accordance with an exemplary embodiment of the claimed invention.
Figure 18:

In accordance with an exemplary embodiment of the claimed invention, the phonics component 400 displays a series of flash cards containing words (real and nonsense) of two, three and/or four letters on the computer screen 220, as exemplary shown in FIGS. 17-18, to assess student's pronunciation of words. The client processor 210 records the student pronouncing the blends/words using the microphone 270 and transmits the recorded pronunciation to the server 100 for processing. The server processor 110 stores the student's recorded pronunciation in the database 130 and analyzes the student's recorded pronunciation using the speech recognition engine 150. The server processor 110 assigns a score from 0% to 100% based on the comparison of the student's pronunciation to the correct pronunciation by the speech recognition engine 150 and stores the score in the database 130. For example, for the phrase "fan has a cap", if the student pronounces the words as more similar to "fan has cape", then the server processor 110 will assign a lower score to the student.

Figure 20:
FIG. 20 is an exemplary screenshot of the phonics component displaying the same or similar twenty-one words as in FIG. 19 to assess the student's reading fluency by timing the number of words read correctly in one minute by the student in accordance with an exemplary embodiment of the claimed invention.
Figure 21:
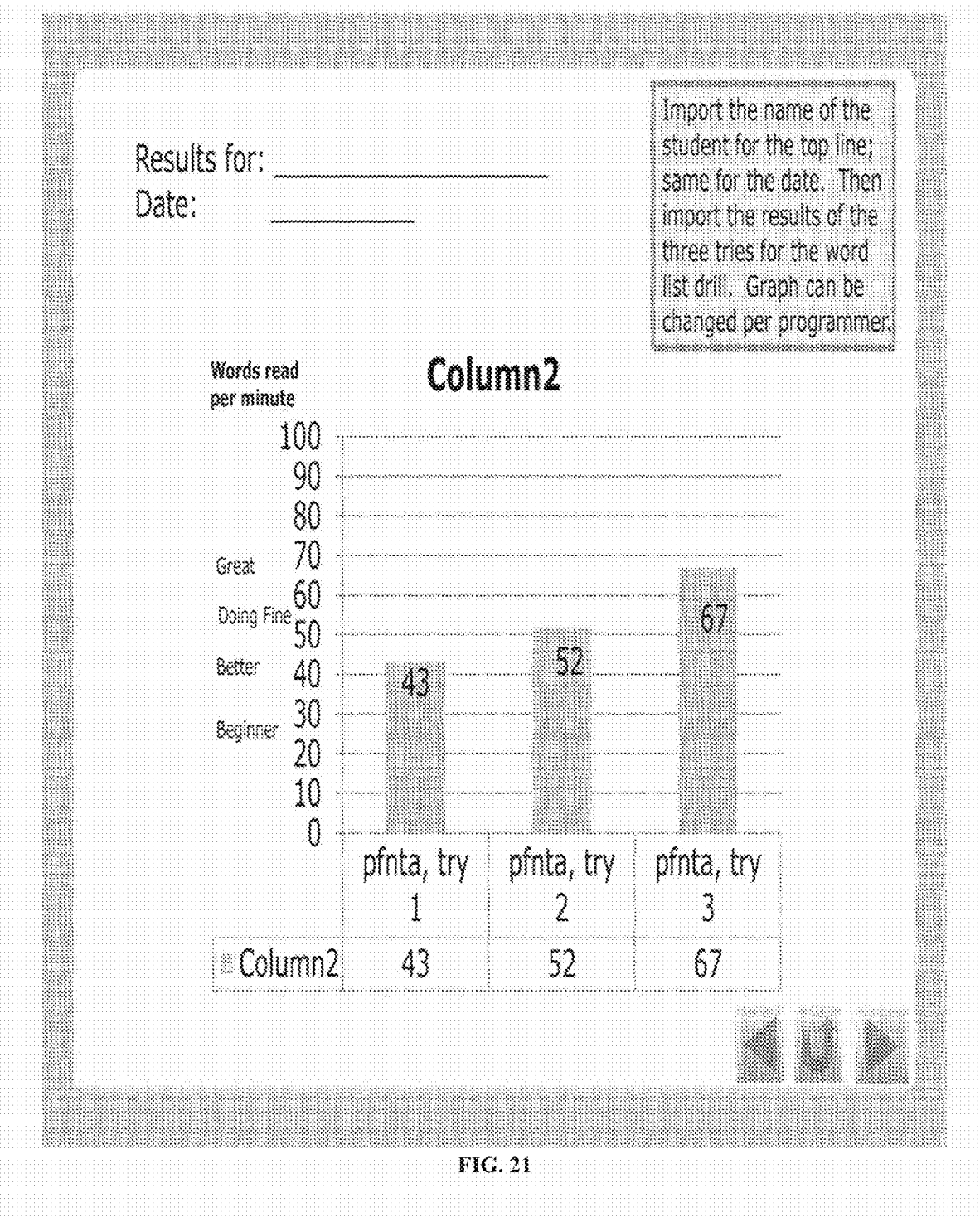
FIG. 21 is an exemplary screenshot of the phonics component displaying the results of the three one-minute word per minute drills in a graph in accordance with an exemplary embodiment of the claimed invention.

In accordance with an exemplary embodiment of the claimed invention, the phonics component 400 assess the student's reading capability by timing how fast the student can read a predetermined number of words, preferably twenty-one words. That is, the phonics component 400 assess the student's reading capability based words read per minute. As exemplary shown in FIG. 19, the phonics component 400 displays and reads each of the twenty-one words on the computer screen 220 one at a time to the student in a predetermined order. The phonics component 400 lights up (or highlights) the word on the computer screen 220 read to the student. As exemplary shown in FIG. 20, the phonics component 400 then displays the same or similar twenty-one words on the computer screen 220 to assess the student's reading capability by timing the number of words read correctly in one minute. When the student is ready for the one-minute reading drill (reading twenty-one words on the computer screen 220), the student clicks the stopwatch on the computer screen 220 to start the one-minute timer. The phonics component 400 instructs the client processor 210 to record the words read by the student in one minute. That is, the phonics component 400 instructs the client processor 210 to initiate the one-minute countdown timer and begin recording when the student clicks on the stopwatch. The client processor 210 terminates the recording when the one-minute countdown timer expires and transmits the recording of the words read in one minute by the student to the server 100 for processing. The phonics component 400 repeats the one-minute reading drill multiple times, preferably three times. The client processor 110 can transmit three separate one-minute recordings or one combined recording of the three one-minute drill to the server 100 for processing. The server processor 110 analyzes the recording of the words read by the student to determine how many words were read correctly in one minute. Preferably, after each one-minute reading drill, the score of how many words were read correctly is displayed on the computer screen 220. The phonics component 400 can display the results of the three one-minute drill in a graph on the computer screen 220, as exemplary shown in FIG. 21. The server processor 110 stores the results of the one-minute reading drills in the database 130 for future comparison.

Figure 22:
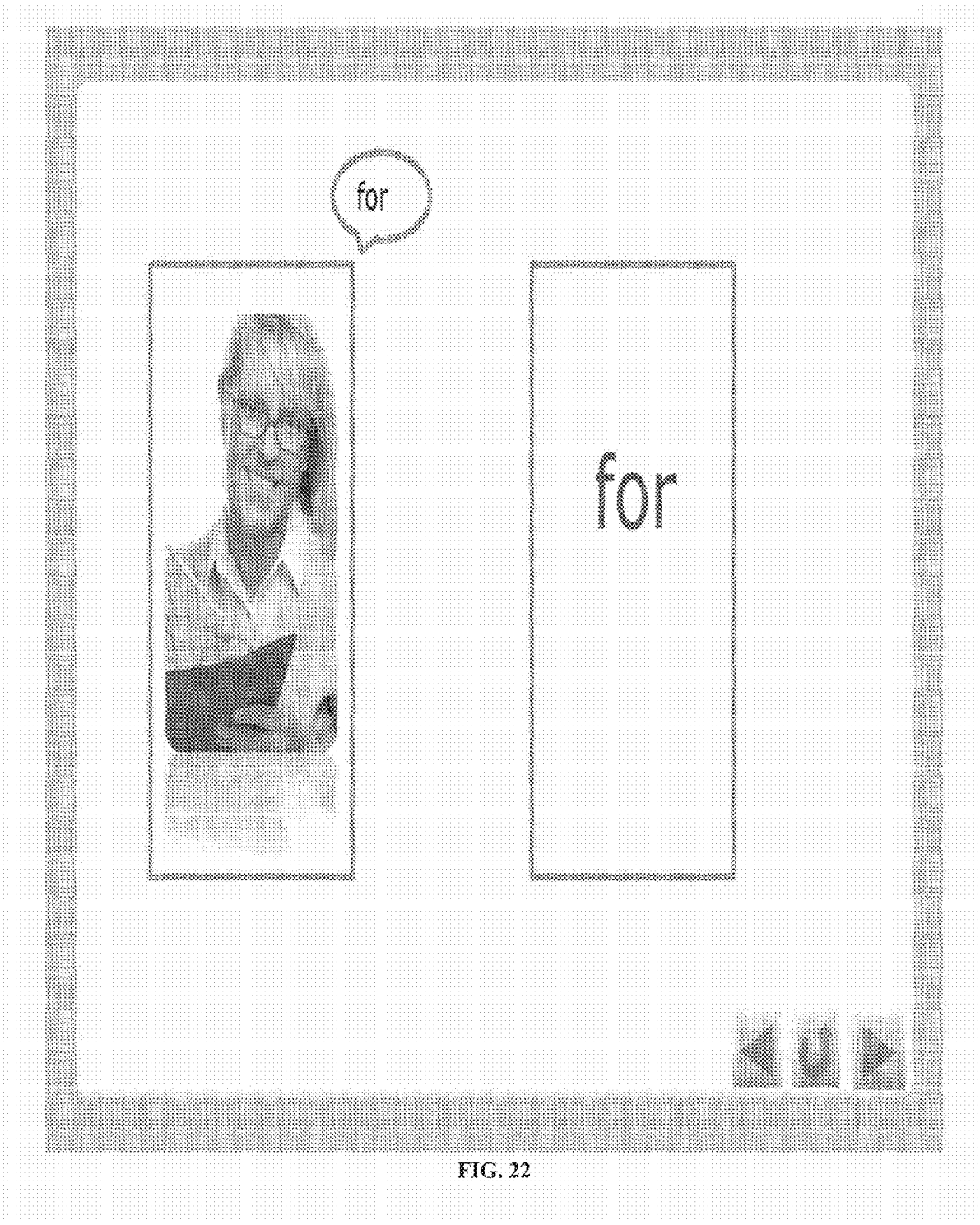
FIGS. 22-25 are exemplary screenshot of the phonics component displaying sigh words (one word per each screen) for the student to memorize in accordance with an exemplary embodiment of the claimed invention.
Figure 23:
Figure 24:
Figure 25:

In accordance with an exemplary embodiment of the claimed invention, the phonics component 400 teaches the student "sight words." Sight words are common words that should not be sounded out, but memorized. The student needs to learn to read these sight words just by looking at them. These sight words allow the student to make sentences. The phonics component 400 displays a series of words to memorize on the computer screen 220, as exemplary shown in FIGS. 22-23. The phonics component 400 reads the word/phrase/sentence for the student to hear on the speaker 280, as exemplary shown in FIGS. 22 and 24, and then prompts the student to read the word/phrase/sentence by herself, as exemplary shown in FIGS. 23 and 25.

In accordance with an exemplary embodiment of the claimed invention, the phonics component 400, reads a "controlled reader" which is a real or nonsense story that is composed of very simple sentences, usually ten sentences. The sentences are made up of simple words that should be easy for the students to read and to understand. The words are made up of a blending of the sounds that the student has just learned or has already learned. In addition to these words, the controlled reader contains "sight words" which connect words to make sentences and gives meaning of the sentence to the reader. The sight words need to be memorized. Preferably, the phonics component 400 reads the controlled reader comprising approximately nine screens of sentences (real and/or nonsense sentences), one screen at a time, to the student to hear on the speaker 280 and then prompts the student to read the words by himself. That is, the phonics component 400 reads the words on the student's computer screen 220 "Nat had a pan. Pat had a pan," as exemplary shown in FIG. 24. The phonics component 400 then displays the same image on the student's computer screen 220, as exemplary shown in FIG. 25, and prompts the student to read the words by himself "Now you read it." The client processor 210 records the student pronouncing the words on the computer screen 220, such as those words exemplary shown in FIG. 25, using the microphone 270 and transmits the recorded pronunciation to the server 100 for processing. The server processor 110 stores the student's recorded pronunciation in the database 130 and analyzes the student's recorded pronunciation using the speech recognition engine 150. The server processor 110 assigns a score from 0% to 100% based on the comparison of the student's reading of the words to the correct pronunciation of the words by the speech recognition engine 150 and stores the score in the database 130. For example, for the phrase "Nat had a pan", if the student pronounces the words as more similar to "fan has pen", then the server processor 110 will assign a lower score to the student.

Upon completion of the last letter in the group and completion of the various drills described herein, the phonics component 400 conducts a letter group assessment of the student's ability to recognize beginning sounds, middle sounds and ending sounds. This four part assessment is not repeated and is taken only once by the student. In accordance with an exemplary embodiment of the claimed invention, the phonics component 400 conducts four part assessment. For the first part of assessment or Assessment A, the phonics component 400 provides a sound of each letter of the letter group "pfnta" (i.e., the consonant beginning sound) completed by the student to hear on the speaker 280 and prompts the student to choose a word that begins with that sound from a list of three words, as exemplary shown in FIG. 26. The server processor 110 calculates the score based on the number questions answered correctly by the student. The calculated score is store in the database 130.

For the second part of the assessment or Assessment B, the phonics component 400 provides a sound of each letter of the letter group "pfnta" (i.e., the consonant ending sound) completed by the student to hear on the speaker 280 and prompts the student to choose a word that ends with that sound from a list of three words, as exemplary shown in FIG. 27. The server processor 110 calculates the score based on the number questions answered correctly by the student. The calculated score is store in the database 130.

Figure 28:
FIG. 28 is an exemplary screenshot of the phonics component providing a sound of each letter of the completed letter group "pfnta," and prompting the student to listen and choose a word that have that sound in the middle from a list of three words as part of the end of the letter group assessment in accordance with an exemplary embodiment of the claimed invention.

For the third part of the assessment or Assessment C, the phonics component 400 provides medial or vowel sounds of the letter group "pfnta," if any, completed by the student to hear on the speaker 280 and prompts the student to choose a word that contains that sound from a list of three words, as exemplary shown in FIG. 28. It is appreciated that the phonics component 400 can perform this assessment only after enough vowels have been introduced to the student. The server processor 110 calculates the score based on the number questions answered correctly by the student. The calculated score is store in the database 130.

Figure 29:
FIG. 29 is an exemplary screenshot of the phonics component displaying at least twenty-one words to be read by the student as part of the end of the letter group assessment in accordance with an exemplary embodiment of the claimed invention.

For the fourth assessment or Assessment D, the phonics component 400 provides another word per minute timing drill and determines three scores, as exemplary shown in FIG. 29. The first score is the total number of words read accurately, the second score is the number of real words read accurately, and third score is the number of nonsense words read accurately. When the student is ready for the one-minute reading drill (reading predetermined number of words, preferably at least twenty-one words on the computer screen 220), the student clicks the stopwatch on the computer screen 220 to start the one-minute timer. The phonics component 400 instructs the client processor 210 to record the words read by the student in one minute. That is, the phonics component 400 instructs the client processor 210 to initiate the one-minute countdown timer and begin recording when the student clicks on the stopwatch. The client processor 210 terminates the recording when the one-minute countdown timer expires and transmits the recording of the words read in one minute by the student to the server 100 for processing. Utilizing the speech recognition engine 150, the server processor 110 analyzes the recording of the words read by the student to determine three scores of Assessment D. The server processor 110 stores the results of Assessment D in the database 130. After the completion of the four part assessment, the phonics component 400 displays the results of all of the assessments to the student on computer screen 220.

To determine whether the student can advance to next letter group, the phonics component 400 compares the student's aggregate score for the first three assessments (or Assessment A-C) and word per minute assessment (Assessment D) to a predetermined threshold, preferably 70%. This predetermined threshold can be based on the available performance metrics of the projected student's grade level. If the student's score for either the first three assessments or word per minute assessment for the current letter group (e.g., the letter group "pfnta") is less than the predetermined threshold, then the student must repeat the process for the current letter group. If the student's scores for both the first three assessments and word per minute assessment are greater than equal to the predetermined threshold, then the phonics component 400 advances the student to the next letter group, e.g., the letter group "srcke."

Once the student has advanced to the next letter group (e.g., the letter group "srcke"), in accordance with an exemplary embodiment of the claimed invention, the phonics component 400 reviews all the letters and sounds previously learned with the student before permitting the student to begin the new letter group, e.g., "srcke". That is, the phonics component 400 conducts a pre-assessment before beginning a new letter group using at least one of methods discussed herein to assess the student's ability to pronounce the letters, identify the images and pronounce the sounds of the letters make for the letters and sounds previously learned. If the student's score on the pre-assessment is greater than or equal to a predetermined threshold, preferably 70%, then the phonics component 400 permits the student to start on the new letter group (the letter group "srcke"). Otherwise, the phonics component 400 returns the student to the previous letter group (the letter group "pfnta"). That is, if the student's score on the pre-assessment is less than the predetermined threshold, then the student repeats the previous letter group (the letter group "pfnta").

This process or sequence is repeated until all the letters of the alphabet (all five letter groups) have been completed. Upon completion of the last letter group of the current phonics module, e.g., the CVC module, and completion of the various drills similar to the drills performed at end of a letter group, the phonics component 400 conducts a module assessment of the student's understanding of the CVC letter category. In accordance with an exemplary embodiment of the claimed invention, as with the four part letter group assessment, the four part module assessment is not repeated and is taken only once by the student. Similar to the letter group assessment, the phonics component 400 conducts four part assessment. The server processor 110 calculates the score based on the number questions answered correctly by the student. The calculated score is store in the database 130.

After the completion of the four part module assessment, the phonics component 400 displays the results of all of the assessments to the student on computer screen 220.

To determine whether the student can advance to next module, the phonics component 400 compares the student's aggregate score for the first three assessments (or Module Assessment A-C) and word per minute assessment (Module Assessment D) to a predetermined threshold, preferably 70%. This predetermined threshold can be based on the available performance metrics of the projected student's grade level. If the student's score for either the first three assessments or word per minute assessment for the current module (e.g., the CVC module) is less than the predetermined threshold, then the student must repeat the process for the current module, e.g, repeats the CVC module. If the student's scores for both the first three assessments and word per minute assessment are greater than equal to the predetermined threshold, then the phonics component 400 advances the student to the next module, e.g., the blends module.

It is appreciated that although the phonics component 400 is described herein as teaching the student the alphabetic code of the English language using the five consonant-short vowel-consonant (CVC) letter category, the phonics component 400 can teach the student the alphabetic code of the English language using other letter category, as exemplary shown herein. Since the phonics component 400 utilizes a similar process as detailed herein with respect to the five CVC letter category (i.e., the CVC module), the process for other letter categories will not be repeated herein. The phonics component also comprises the following exemplary letter categories:

Module 1: CVC with 5 groups or exercises: i) pfnta; ii) srcke; iii) bfmli; iv) dvjho; and v) qwxyzu (already discussed herein)

Module 2: Blends with 5 groups or exercise: i) bl, cl, fl, gl, pl, sl, a; ii) br, cr, dr, fr, gr, pr, tr, e; iii) sk, sw, st, tw, i; iv) sc, sm, sn, sp, o; v) thr, scr, str, spr, spl, u Module 3: Consonant Digraphs with 2 groups or exercises: i) Beginning sounds: sh, th, wh, ch, ph, qu, thr; and ii) Ending sounds: ck, nk, ng, sh, ch, tch Module 4: Long Vowels with 1 group or exercise: a-e, e-e, i-e, o-e, u-e Module 5: Hard and Soft C, Hard and Soft G with 2 groups or exercises: i) c, c; and ii) g, g Module 6: Chinese Syllables with 4 groups or exercises: i) all, alk, ild, ind; ii) old, old, oll, olt; iii) ing, ang, ong, ung; and iv) ink, onk, unk, ank Module 7: Open Syllables with 1 group or exercise: a, e, I, o, u Module 8: r-controlled vowels with 1 group or exercise: or, ar, er, ir, ur Module 9: Double vowels and diphthongs with 5 groups or exercises: i) oa, oe, ee, ai, ay; ii) oi, oy, oo, oo, ow, ow; iii) ie, ie, ou, ou, au, aw; iv) ea, ea, ea, ey, ue, ue; and v) ew, ei, ei, igh, eigh Module 10: C (consonant)-le with 2 groups or exercises: i)—ble, -dle, -tle, -gle, -ple; and ii)—fle, -zle, -kle, -cle Module 11: Endings with 4 groups or exercises: i) ing, ness, est; ii) ed, ed, ed, ful; iii) y, y, y; and iv) tion, sion, sion Module 12: Consonant/consonant with 4 groups or exercises Module 13: Long vowel/consonant with 4 groups or exercises Module 14: Doubling rule/silent e rule with 2 groups or exercises Module 15: Morphology (prefixes, suffixes, and roots).

In accordance with an exemplary embodiment of the claimed invention, the phonics component 400 generates a report comprising graphs, preferably bar graphs, of student's average performance on each area tested by the phonics component (e.g., naming the letter, identifying the image associated with letter, pronouncing the sound the letter makes, writing the letter, saying the directions for writing the letter, identifying the images starting with the letter, typing the letter that a word starts with, blending two or three sounds into a word, reading two or three letter words on flash cards, wpm timings, reading sight words, reading controlled reader, identifying sounds that start with a letter, identifying sounds that end in a letter, identifying sounds that are in the middle).

In accordance with an exemplary embodiment of the claimed invention, the phonics component 400 allows underperforming student (student receiving a low score on the assessment test) to repeat a letter group or sequence (e.g., pfnta) from the first letter of the sequence, e.g., the letter p. Preferably, the phonics component 400 permits the student to repeat any letter group up to six time. However, if the student fails six consecutive times, the phonics component 400 alerts the observer via email or text message that student needs one-on-one sessions with the observer. The phonics component 400 may suggest that the student perform the phonics sessions together with an observer and/or provide a report outlining student's area of weaknesses so a suitable remediation or intervention program can be established to meet the specific, individual needs of the student.

Turning now to the reading comprehension component, in accordance with an exemplary embodiment of the claimed invention, the reading comprehension component 500 utilizes the students' senses of sight, speech, hearing and touch to virtually replicate the one-on-one session between a teacher and a student. This enables each student to progress at his or her own pace. The reading comprehension component 500 interactively teaches the student how to improve his or her reading comprehension skills by using research-based methods called "highlighting" and "summarizing."

The reading comprehension component 500 teaches the student how to highlight correctly, using electronic highlighters. The claimed system and method alerts the brain to pay attention to certain stimuli then moving the information to the centers of executive function and working memory. The more times the student repeats this action, the more the same neurons of the brain respond.

The reading comprehension component 500 provides students of all levels and abilities, from kindergarten through high school with a multitude of passages, called books and chapters. These books start with very basic pictures and advance through materials that should be read and understand by elementary school students, middle school students, and high school students. The passages are grouped by levels, which correspond to grade levels. The grade levels are assigned by either readability index scores or Lexile® scores.

Once the student logs in using a valid username/password combination and selects a particular component/application of the claimed system, such as the reading comprehension component 550 (or MaxReading, the name of the component established by the assignee of this claimed invention). The reading comprehension component 500 takes the returning student to the point where she left off during her last session. If the reading comprehension component 500 was selected for the first time by the student, then the reading comprehension component 500 instructs the server processor 110 to retrieve a pre-test questionnaire appropriate for the student's current grade level from the database 130 for a pre-test assessment to determine suitable placement, as exemplary shown in FIGS. 30-31 for sixth grade. In accordance with an aspect of the claimed invention, each pre-test contains four passages for the student read. The reading comprehension component 500 prompts the student answer five to twelve questions about each passage. These questions can cover following five to twelve areas depending on the grade: main idea, important details, compare and contrast, cause and effect, vocabulary, sequence, predictions, conclusions/inferences, fact vs. opinion, author's purpose, figurative language, summarization and the like. The server processor 110 calculates the overall score and individual scores for each passage based on the number of questions answered correctly. Although the reading comprehension component 500 places no time restriction on the student during the pre-test assessment, the system operator (e.g., school, tutoring center, parents, grandparents, etc.) can override and place a time restriction.

If the student's overall score is 80% or greater, the student starts at her grade level. If the overall score is 60% to 79%, then the student starts one level below her grade level. If the overall score is 40% to 59%, then the student starts two levels below her grade level. If the overall score is less than 40%, then the student starts three levels below her grade level. If reading comprehension component 500 determines that the appropriate grade level for the student is below $1^{st}$ grade, then the reading comprehension component 500 assigns the student to pre-K level or recommends that the student start with the phonics component 400 first. It is appreciated that that these threshold are for illustrative purposes only and other appropriate thresholds can be established by the service provider, school or teacher. The reading comprehension component 500 generates report of the reading comprehension assessment results to the student and the observer on the computer screen 220. Observers can be any person that works with the student, e.g., a teacher, aide, paraprofessional, volunteer, tutor, parent, grandparent, etc. The reading comprehension component 500 provides an option for the student to view all the correct answers of the pre-test questions and brief explanation of the correct answers on the computer screen 220. After placement of the student at the appropriate grade level based on the pre-test assessment (i.e., the assigned grade level), the student is provided with a tutorial as to how to use the reading comprehension component 500.

After the student logs in and selects the reading comprehension component 500, the server processor 110 executes the reading comprehension application/component 500 to teach and improve the student's reading comprehension. The reading comprehension component 500 presents one chapter at a time to improve the student's reading comprehension and prompts the student to 1) read a chapter of the book first; 2) electronically highlight topic in blue, main idea in green, and details in yellow; 3) summarize in writing what has been read and highlighted; 4) answer the questions about the chapter; 5) receive feedback of results; 6) review what should have been highlighted in the chapter; 7) proceed to next chapter of the book; 8) receive a score based upon the words correctly highlighted, the words incorrectly highlighted, the total time spent on the chapter, and the questions answered correctly the first time; 9) steps 1-8 are repeated for each chapter of the book. At the end of the each level, the reading comprehension component 500 tests the student for fluency assessment.

Figure 32:
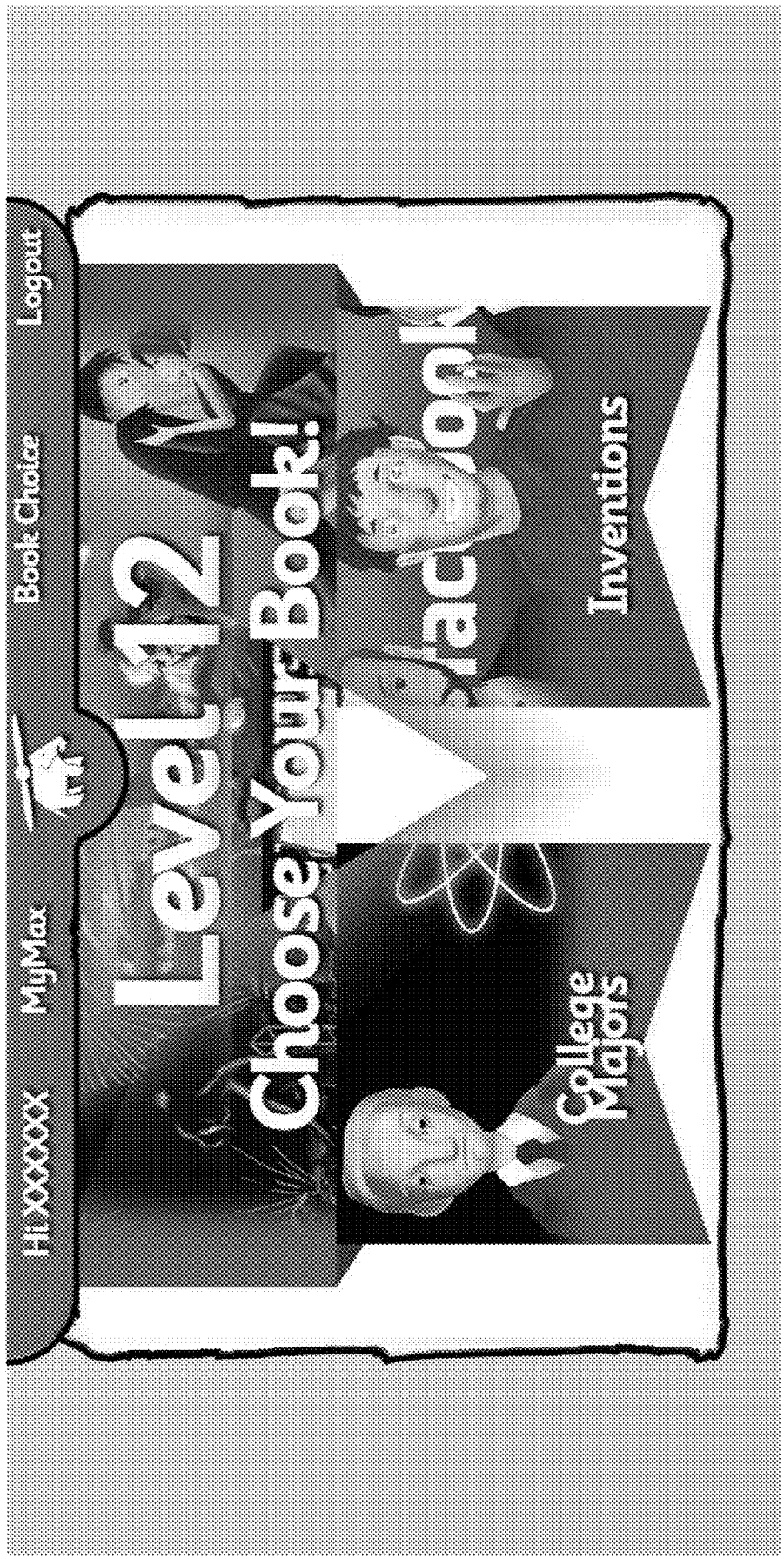
FIG. 32 is an exemplary screenshot of the reading comprehension component displaying available book topics to be selected by the student in accordance with an exemplary embodiment of the claimed invention.

In accordance with an exemplary embodiment of the claimed invention, the reading comprehension component 500 selects and retrieves a book from a plurality of books that is appropriate for the student's assigned grade level from the database 130. Alternatively, the reading comprehension component 500 can provide the student with a choice of books, as exemplary shown in FIG. 32, the level 10 student can choose from books from the following topics: "living legends," "psychology" or "women". It is appreciated that book selections and topics will vary with the student's grade level. That is, the reading comprehension component 500 can provide books from the following exemplary topics for level 1 student: "fantasy creatures", "picnics in the park", "Hobbies" or "places around town."

Figure 33:
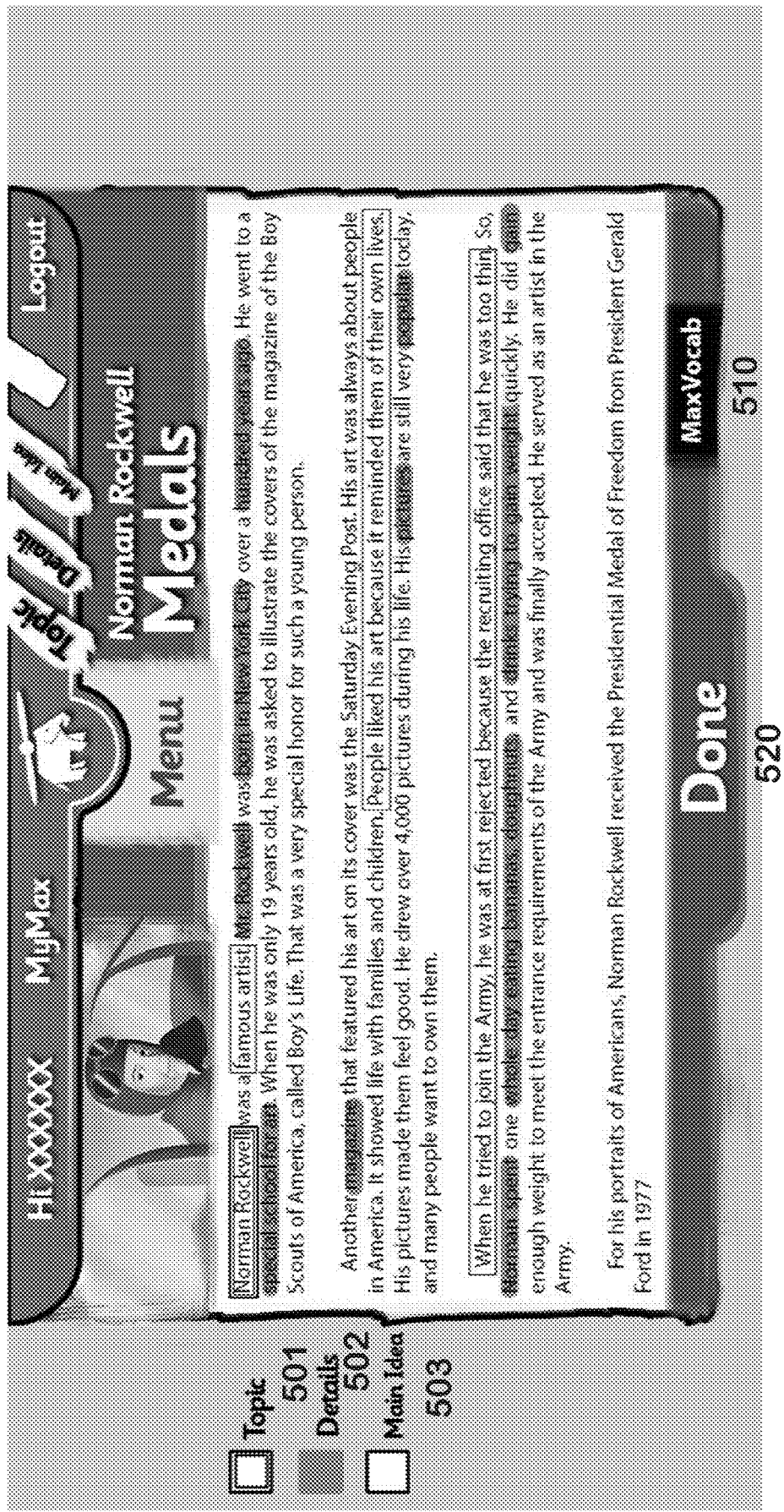
FIG. 33 is an exemplary passage to be highlighted by the student in accordance with an exemplary embodiment of the claimed invention.
Figure 34:
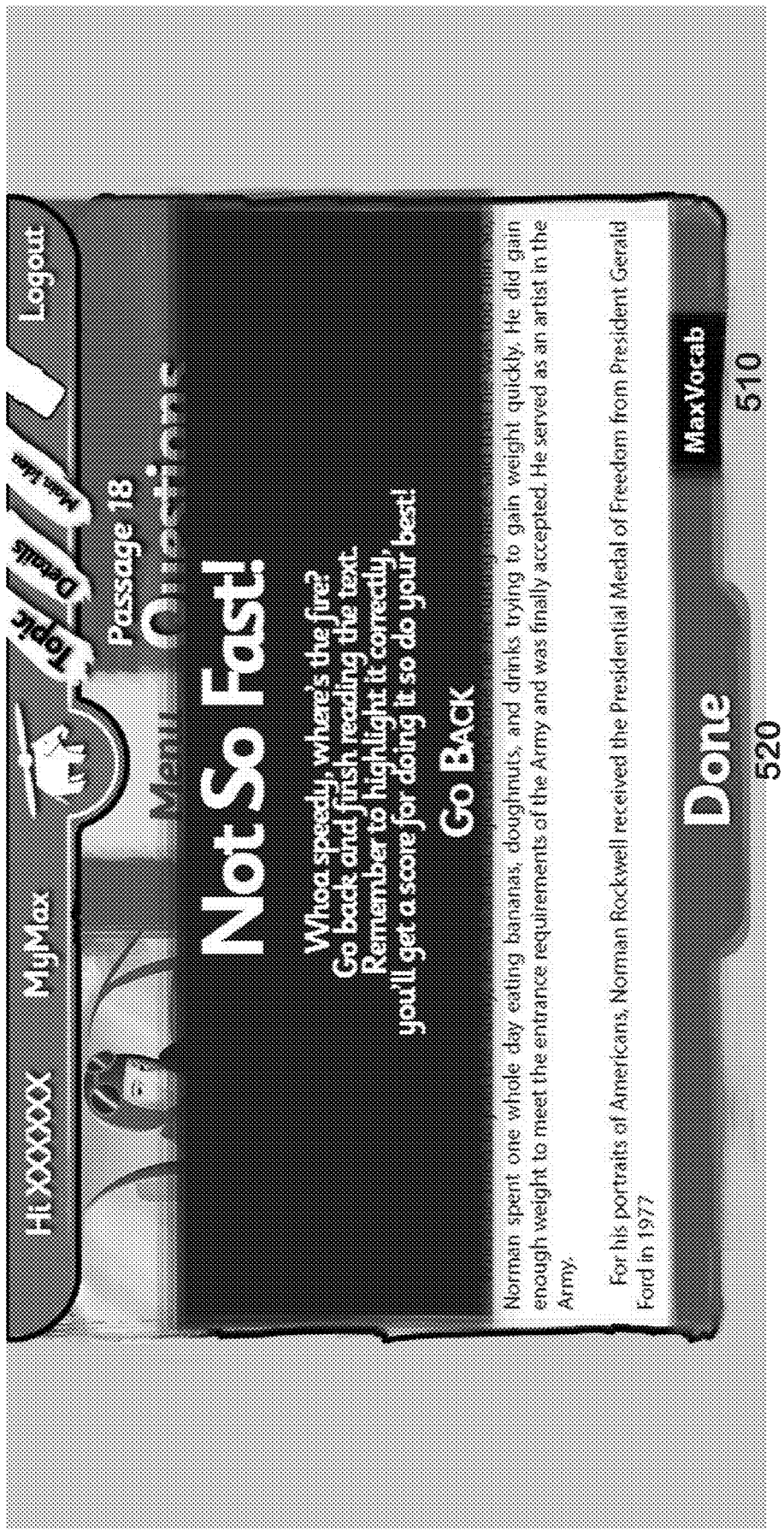
FIG. 34 is an exemplary screenshot of the reading comprehension component displaying a message to student to go back re-read, re-highlight the chapter and answer different comprehension questions in accordance with an exemplary embodiment of the claimed invention.

The reading comprehension component 500 displays a chapter from the selected book on the computer screen 220 to be read and highlighted by the student. In accordance with an exemplary embodiment of the claimed invention, the reading comprehension component 500 displays a chapter of the selected book on the student's computer screen 220 and prompts the student to read and electronically highlight the words displayed on the computer screen 220 using various colored electronic highlighters 501-503, e.g., topic in blue, detail in yellow and main idea in green. Also, the reading comprehension component 500 provides an electronic eraser to un-highlight any mistakenly highlighted words. The electronically highlighted chapter of the selected book is exemplary shown in FIG. 33, for illustrative purpose, the words highlighted in blue relating to the topic are shown inside a double line box, the words highlighted in yellow relating to the details are shown in the shaded regions, and the words highlighted in green relating to the main idea are shown inside the single line boxes. Once the student completes the highlighting of the chapter, the student can click on the done button/tab 520. Preferably, the students are given a predetermined minimum time, such as sixty seconds, to read and highlighted the passage. As exemplary shown in FIG. 34, the reading comprehension component 500 requests the student to go back, and re-read and/or re-highlight the text if the student does not fully utilized the allotted minimum time (e.g., 60 seconds).

Figure 35:
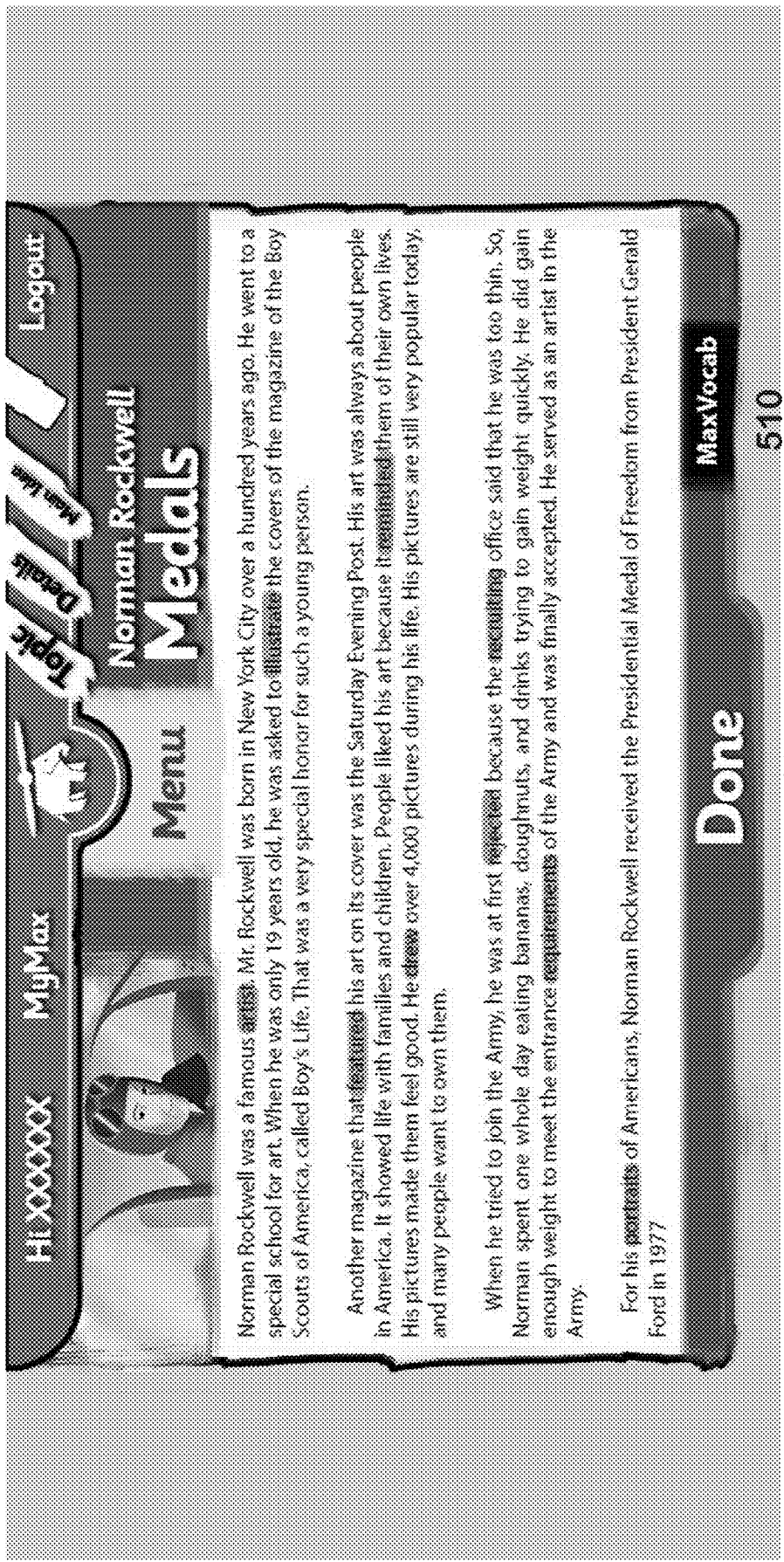
FIG. 35 is an exemplary screenshot of the highlight words in the passage for which definitions are available from the vocabulary component in accordance with an exemplary embodiment of the claimed invention.
Figure 36:
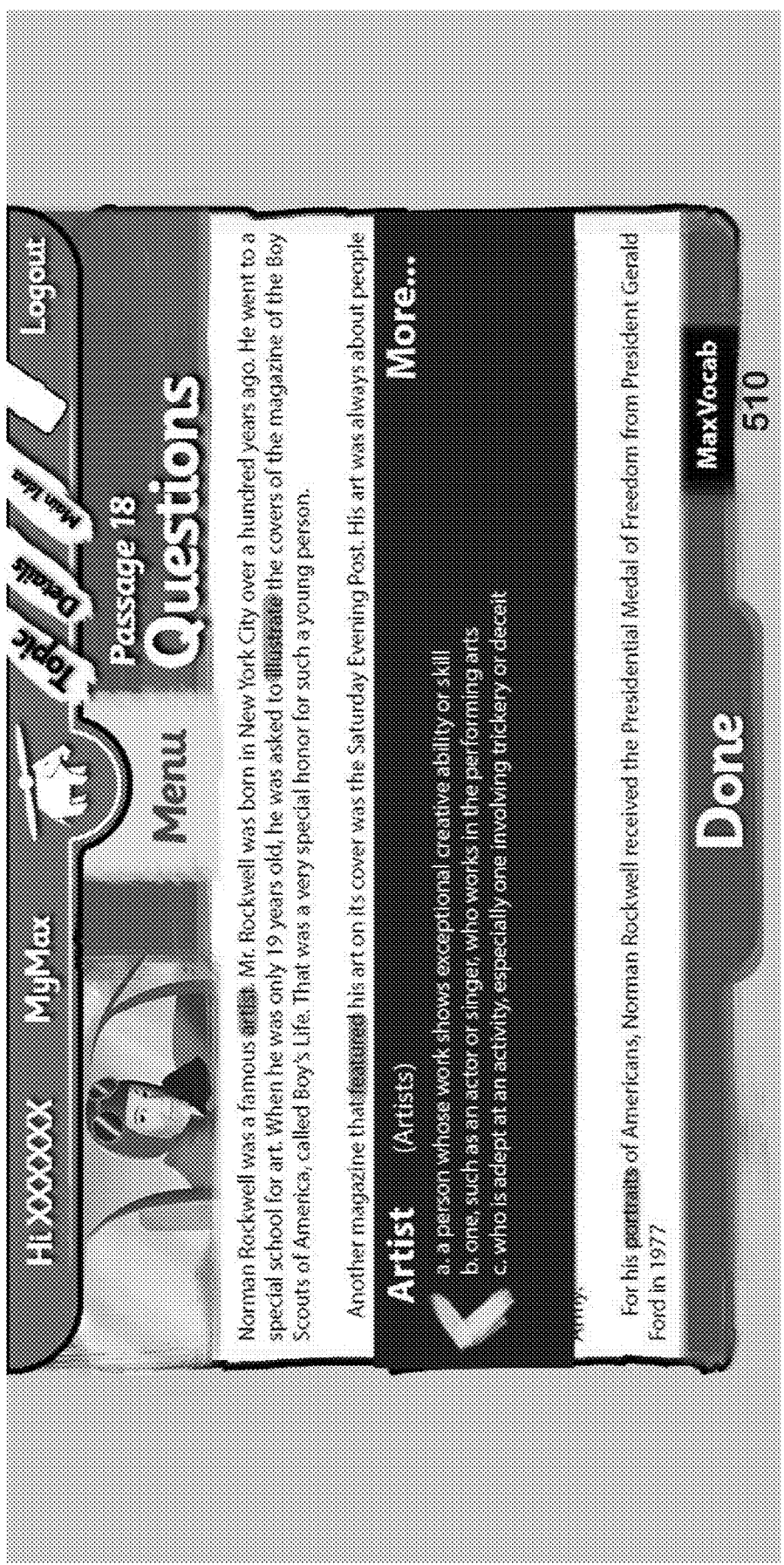
FIG. 36 is an exemplary screenshot of the vocabulary component displaying the definition of one of the highlighted words in FIG. 35 in accordance with an exemplary embodiment of the claimed invention.
Figure 37:
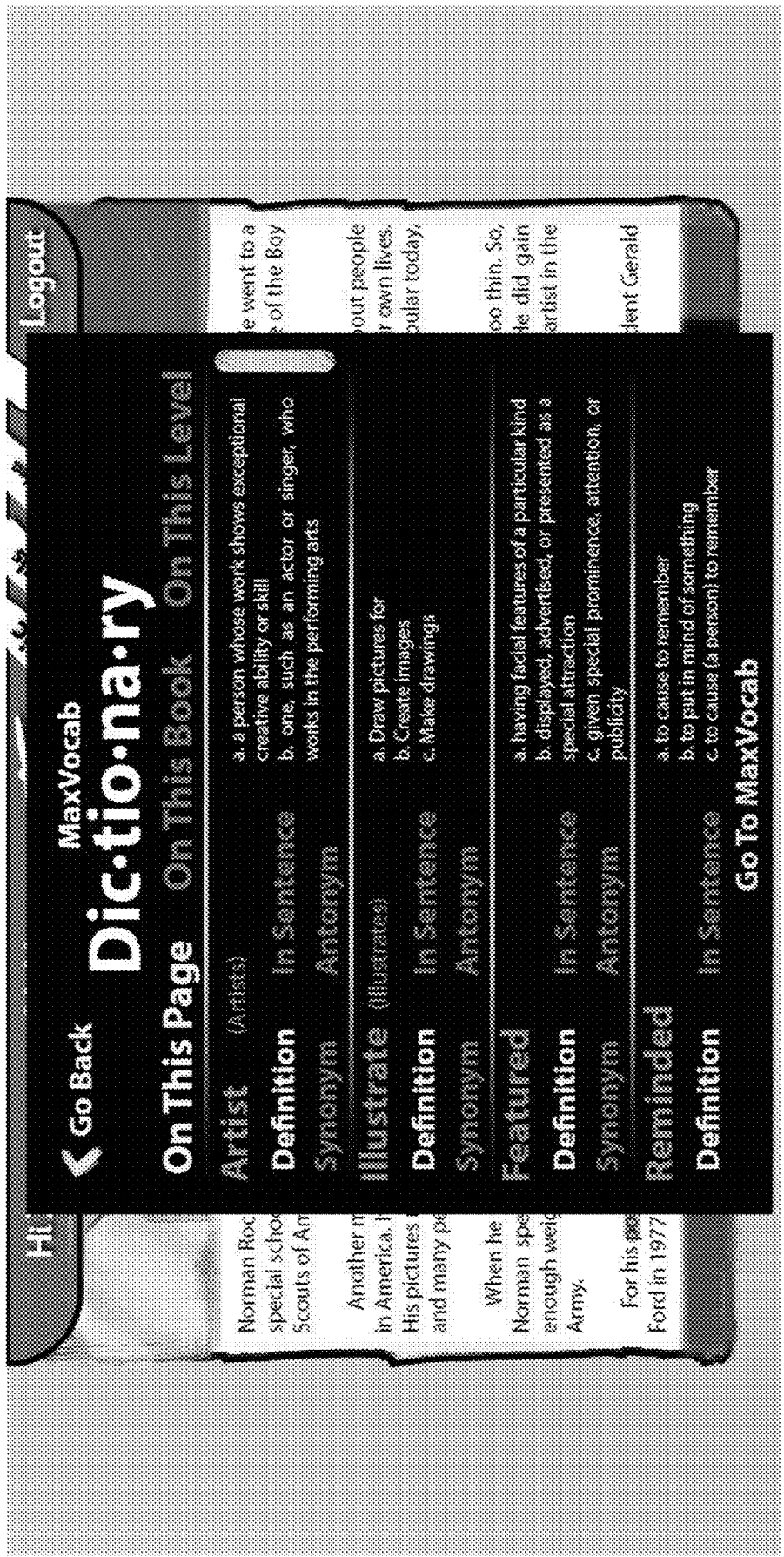
FIG. 37 is an exemplary screenshot of the vocabulary component displaying additional definitions as well as synonyms, antonyms, and word use in a sentence for other highlighted words in FIG. 35 in accordance with an exemplary embodiment of the claimed invention.

In accordance with an exemplary embodiment of the claimed invention, at any point while the student is reading or highlighting a chapter during the reading comprehension session, the student can click on the MaxVocab button/tab 510 to activate the vocabulary component 600 of the claimed system. When the MaxVocab button/tab 510 is clicked by the student, the reading comprehension 500 highlights the words in the chapter for which definitions as well as synonyms, antonyms and word usage in a sentence are available from the vocabulary component 600, as exemplary shown in FIG. 35 and the vocabulary component 600 retrieves from the database 130 and provides the definition for the first highlighted word, e.g., artist, as exemplary shown in FIG. 36. Preferably, the vocabulary component 600 overlays the definition screen on top of the reading comprehension screen. If the student clicks on the MaxVocab button/tab 510 again, the definition screen disappears, thereby returning the student to the reading comprehension screen to read and highlight the displayed chapter. If the student clicks on the "More . . . " button/tab on the computer screen 220, the vocabulary component 600 retrieves and displays additional definitions for other highlighted words on the computer screen from the database 130, as exemplary shown in FIG. 37.

Figure 38:
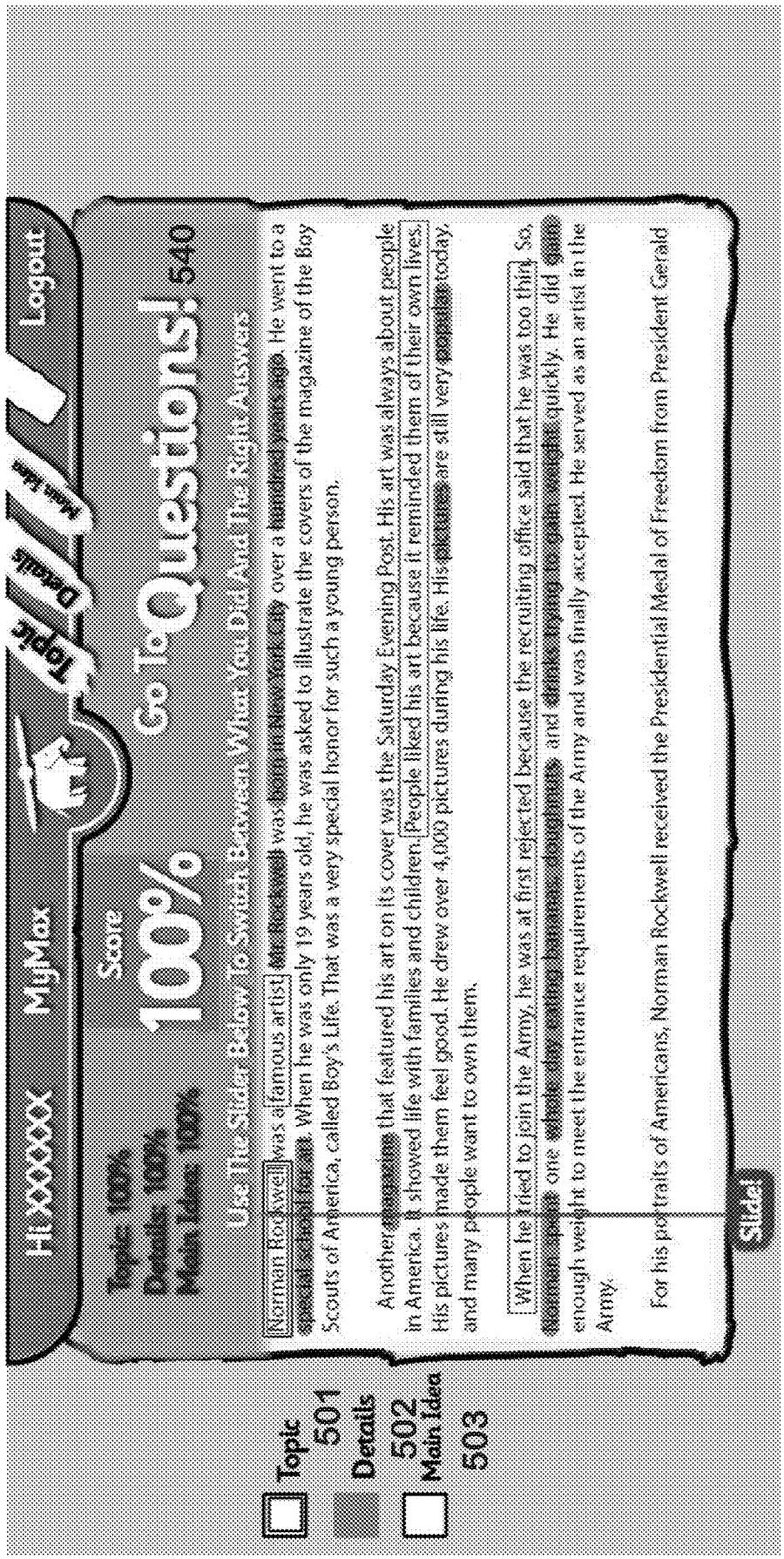
FIG. 38 is an exemplary screenshot of the reading comprehension component displaying a slider to view what was highlighted correctly and what was highlighted incorrectly by the student in accordance with an exemplary embodiment of the claimed invention.

Once the student completes the highlight of the chapter, the student can click on the done button/tab 520. The reading comprehension component 500 stores the student's highlighted chapter in the database 130 and the server processor 110 processes the student's highlighted chapter for accuracy and completeness. In accordance with an exemplary embodiment of the claimed invention, the server processor 110 generates and displays the student's chapter score based upon the words correctly highlighted, the words incorrectly highlighted, and the total time spent on the chapter, as exemplary shown in FIG. 38. The server processor 110 can compare the student's highlighted chapter to a stored template of the chapter with the proper highlighting to generate the score. In accordance with an exemplary embodiment of the claimed invention, the reading comprehension component 500 comprises a slider button/tab 530, as exemplary shown in FIG. 38. The student can click on the slider button/tab 530 to view what was highlighted correctly in the chapter (blue, green and yellow) and what was highlighted incorrectly in red. Alternatively, the reading comprehension component 500 can display the results to the student after he completes the questions to assess his reading comprehension of the chapter.

In accordance with an exemplary embodiment of the claimed invention, after analyzing and scoring the student's highlighted chapter, the reading comprehension component 500 prompts the student to summarize the chapter of the book that he highlighted. Instead of each chapter, the reading comprehension component 500 can prompt the student to write the summary after each predetermined number of chapters, e.g., after each five chapters. The student can write his chapter summary in a composition book or use the keyboard 220 to type their summary for storage in the database 130 depending on the student's typing and/or computer skills. It is appreciated that the typing option may not be feasible for a younger student. The student's written chapter summary stored in the database 130 can be retrieved and reviewed by the student's teacher, parent and/or other authorized user with permission to access the student's work. Preferably, the reading comprehension component 500 can comprise a textual recognition engine to analyze the student's summary for grammar, fluency and/or accuracy.

Figure 39:
FIG. 39 is an exemplary screenshot of the reading comprehension component displaying an illustration to be viewed by kindergarten or pre-K student in accordance with an exemplary embodiment of the claimed invention.
Figure 40:
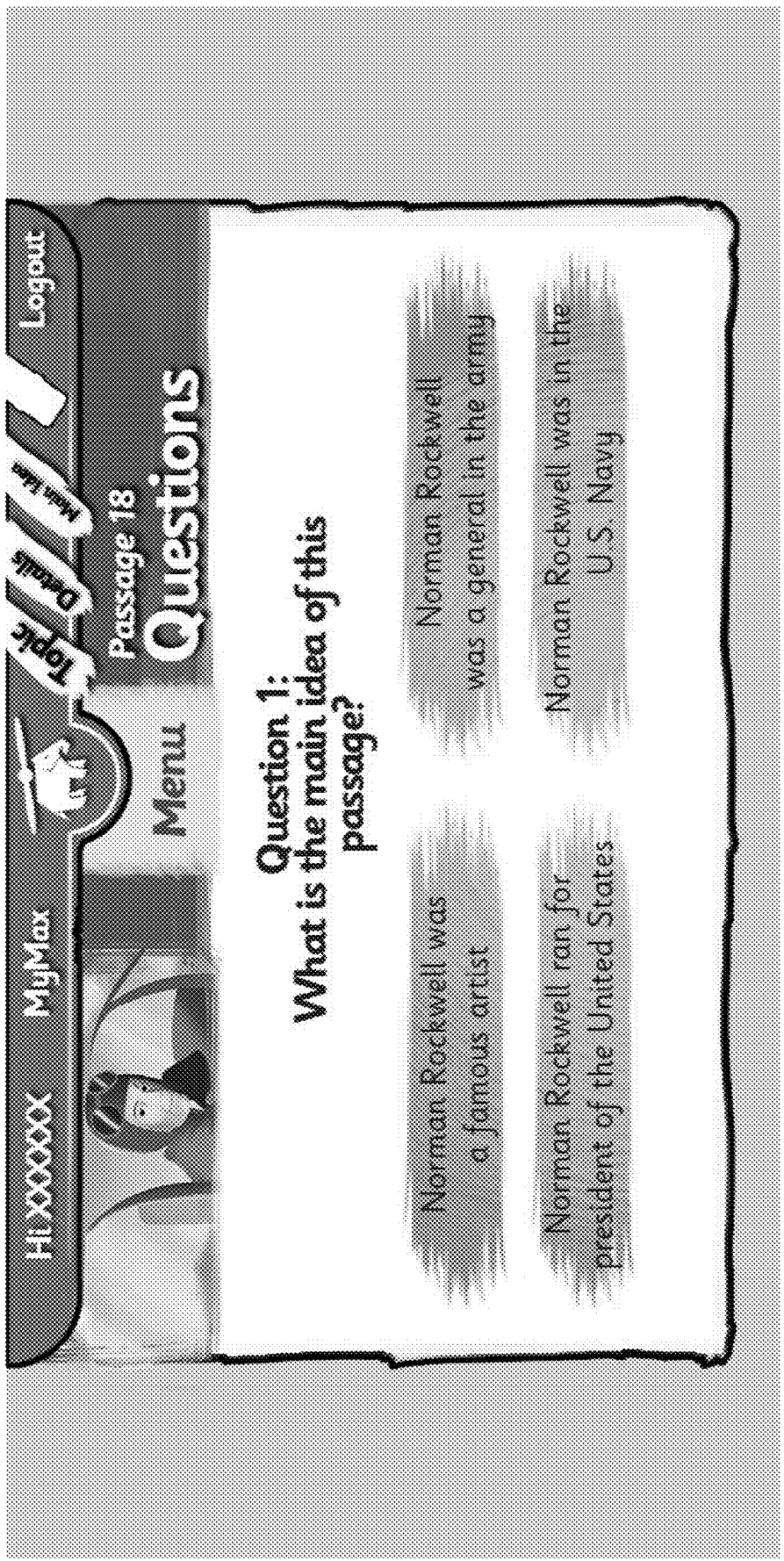
FIG. 40 is an exemplary screen shot of the reading comprehension component displaying a question to assess the student's reading comprehension of the completed passage/chapter in accordance with an exemplary embodiment of the claimed invention.
Figure 41:
FIG. 41 is an exemplary screenshot of the reading comprehension component displaying the results of the student's reading comprehension of the chapter in accordance with an exemplary embodiment of the claimed invention.

After chapter highlighting results and/or written summary of the chapter have been reviewed, the student can click on the "Go To Questions!" button/tab 540, which directs the reading comprehension component 500 to present a predetermined number of questions, preferably five multiple choice questions, to assess the student's reading fluency of the just completed chapter. For kindergarten or pre-K students, the reading comprehension component 500 can display illustrations or images rather than a textual passage, as exemplary shown in FIG. 39, and provide questions relating to the image rather than the textual passage of the chapter. The reading comprehension component 500 presents one question at a time on the student's computer screen 220, one of the exemplary multiple-choice question is shown in FIG. 40. When the student has answered all five questions, the reading comprehension component 500 stores the student's answer in the database 130 and processes the student's answer. The reading comprehension component 500 displays three scores: a total score (or percentage) and individual scores for highlighting and questions, as exemplary shown in FIG. 41. The score can be presented as a number out of 10 (e.g., 8.2) or a percentage out of 100%, e.g., 84%. It is appreciated that the reading comprehension 500 will display only one score for the kindergarten students. The student can click on the "See The Answers to the Questions" button/tab 550 to view the correct answers to the questions.

Upon completion of a chapter, the reading comprehension component 500 presents the next chapter on the student's computer screen 220 to repeat the sequence of reading, highlighting and answering questions about the next chapter to assess the student's reading skills. The reading comprehension component 500 repeats this process until the student completes all of the chapters of each book in the student's current level, which can range from 2-5 books. The student may be required to read multiple number books to advance to the next level. Moreover, it is appreciated that the student may not complete all of these steps or interactions in one session.

The student can exit the reading comprehension component 500 and logoff the client device 200 at any time, preferably at the conclusion of a particular interaction. The server processor 110 stores all of the interactions between the student and the reading comprehension component 500 during the session. When the student logs back into the server 100 to start another session, the reading comprehension component 500 returns the student to the point where she left off during her last session.

In accordance with an exemplary embodiment of the claimed invention, after each five chapters of the book, the reading comprehension component 500 prompts the student to write a summary of the last chapter. The student can write his chapter summary in a notebook, a composition book or use the keyboard 220 to type his summary for storage in the database 130 depending on the student's typing and/or computer skills. It is appreciated that the typing option may not be feasible for a younger student. The student's written chapter summary stored in the database 130 can be retrieved and reviewed by the student's teacher, parent and/or other authorized user with permission to access the student's work. Preferably, the textual recognition engine of the reading comprehension component 500 processes the student's summary for grammar, fluency and/or accuracy. Preferably, the student's written summary should contain at least one main idea, three sentences containing details about the chapter and one concluding sentence.

Figure 42:
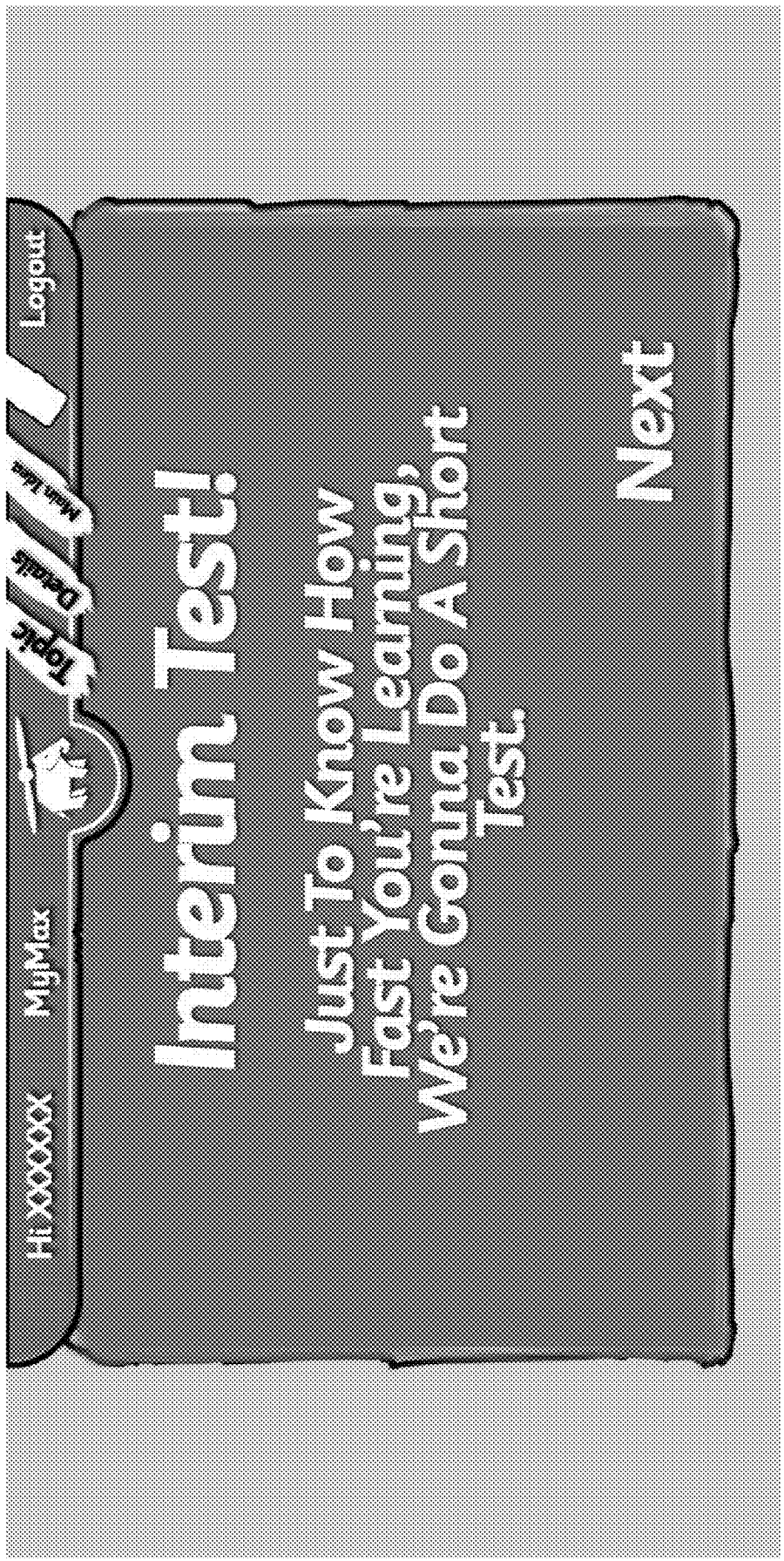
FIG. 42 is an exemplary embodiment of the reading comprehension component prompting the student to take the Interim Progress Assessment test in accordance with an exemplary embodiment of the claimed invention.

At the midpoint of the level and when student scores an outlier score, in accordance with an exemplary embodiment of the claimed invention, the reading comprehension component 500 prompts the student to take an Interim Progress Assessment (IPA) to assess his reading fluency, as exemplary shown in FIG. 42. The outlier score is when the student scores greater than 90% or less than 40% on four consecutive chapters. It is appreciated that some levels may have four books, some levels have three books and some may have two books. Also, the system operator may add more books to conform to any changes in the state standards or the Common Core State Standards or to expand the topical choices for the students. Preferably, the reading comprehension component 500 prevents the student from proceeding to the next book until the IPA is completed.

Figure 43:
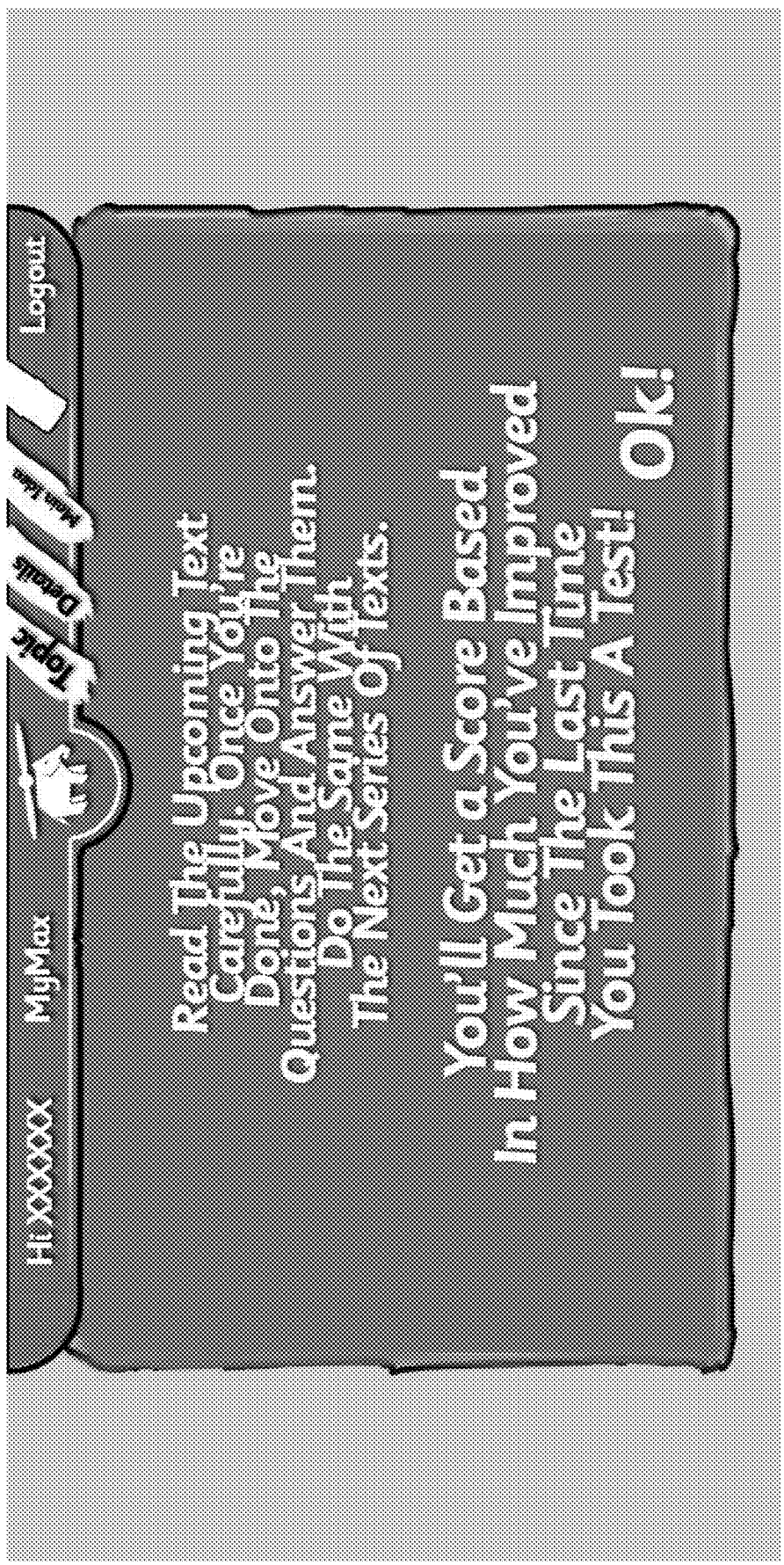
FIG. 43 is an exemplary screenshot of the reading comprehension component displaying instructions for the Interim Progress Assessment test and post-test assessment in accordance with an exemplary embodiment of the claimed invention.
Figure 44:
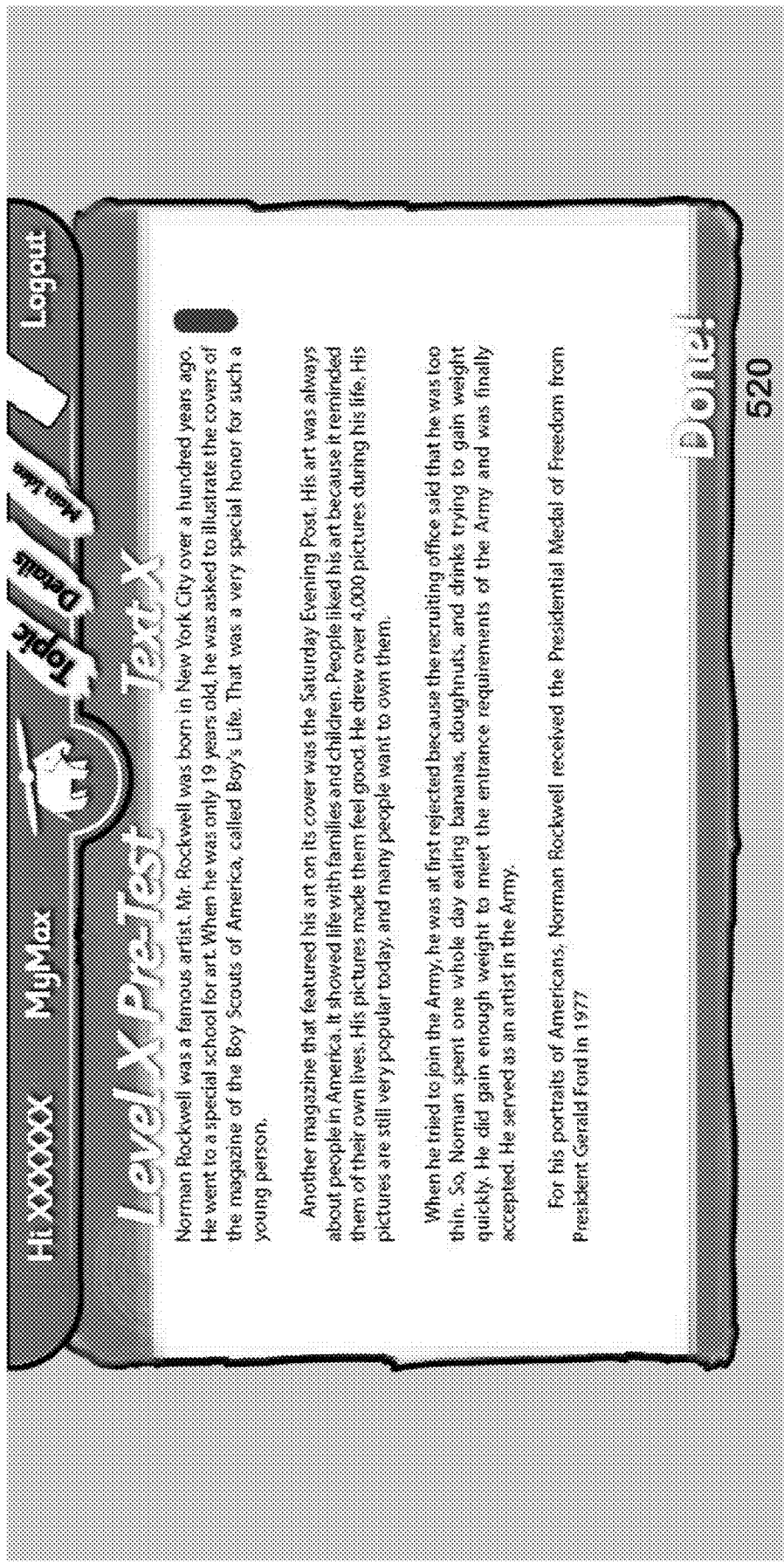
FIG. 44 is an exemplary screenshot of the reading comprehension component displaying a passage to be highlighted by the student as part of the Interim Progress Assessment in accordance with an exemplary embodiment of the claimed invention.

In accordance with an exemplary embodiment of the claimed invention, as exemplary shown in FIG. 43, the reading comprehension component 500 provides instructions for completing the IPA. When the student is ready, the reading comprehension component 500 retrieves and presents a predetermined number of passages, preferably two passages, one at a time from the database 130 on the student's computer screen 220. The student will be given an unlimited time or a predetermined time to complete each passage, preferably, 25 minutes for each passage. As before, the reading comprehension component 500 presents the first passage for the student to read and highlight on the student's computer screen 220, as exemplary shown in FIG. 44. When the student clicks the "Done!" button 520, the reading comprehension component 500 stores the student's highlighted first passage in the database 130 and presents a predetermined number of questions relating to the first passage, preferably five multiple choice questions, to assess the student's reading fluency.

Figure 45:
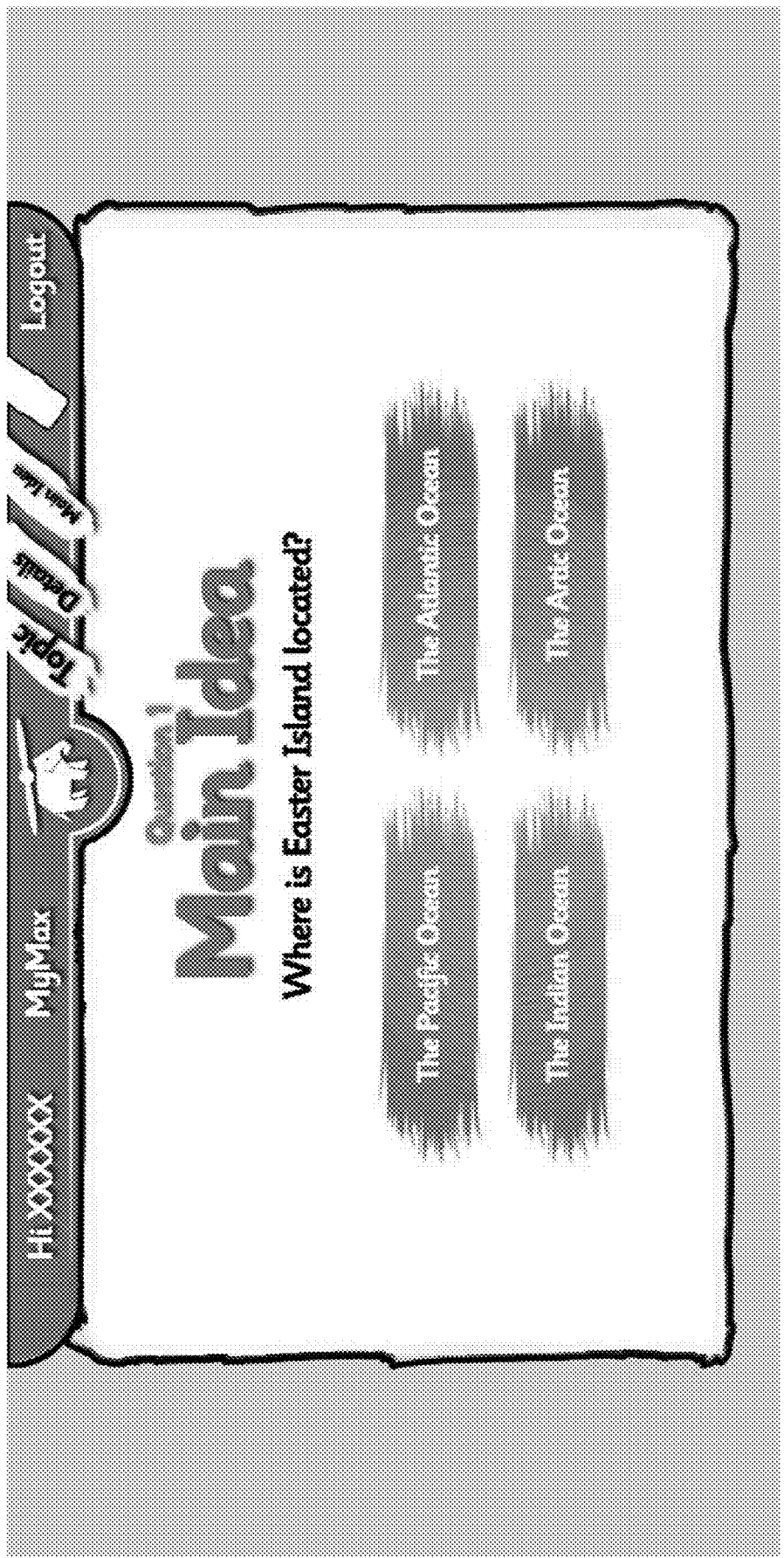
Figure 46:
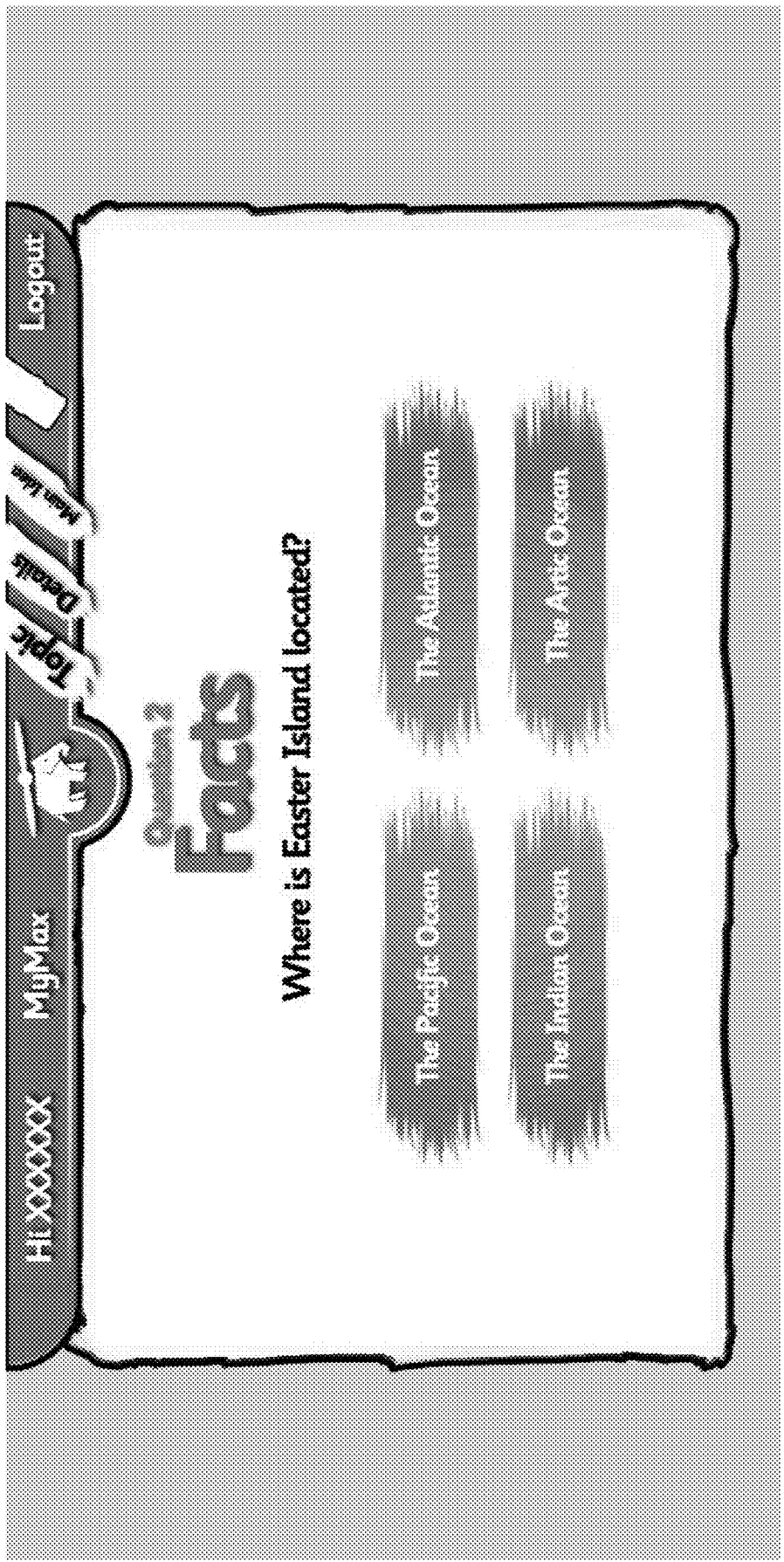
Figure 47:
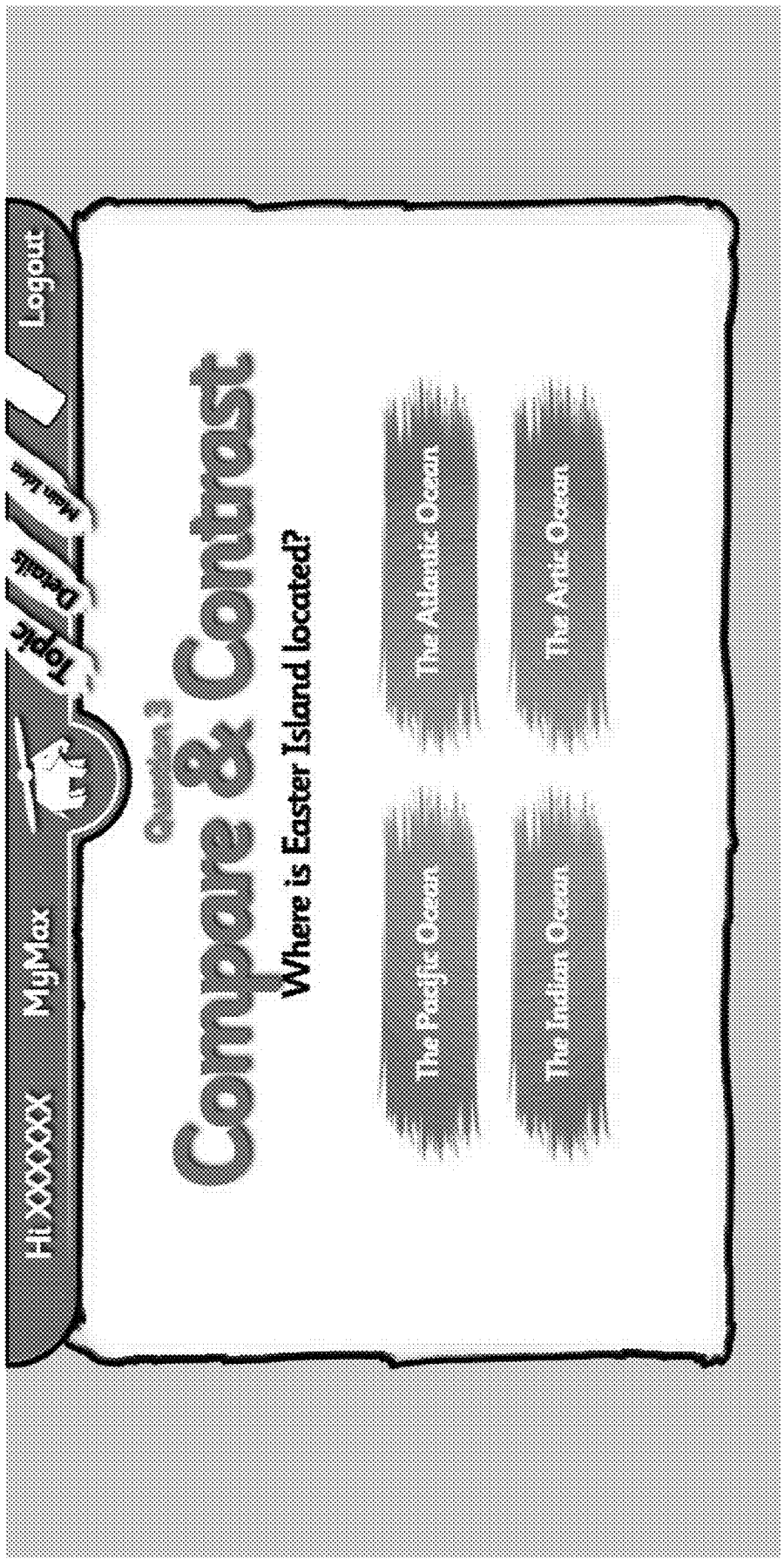
Figure 48:
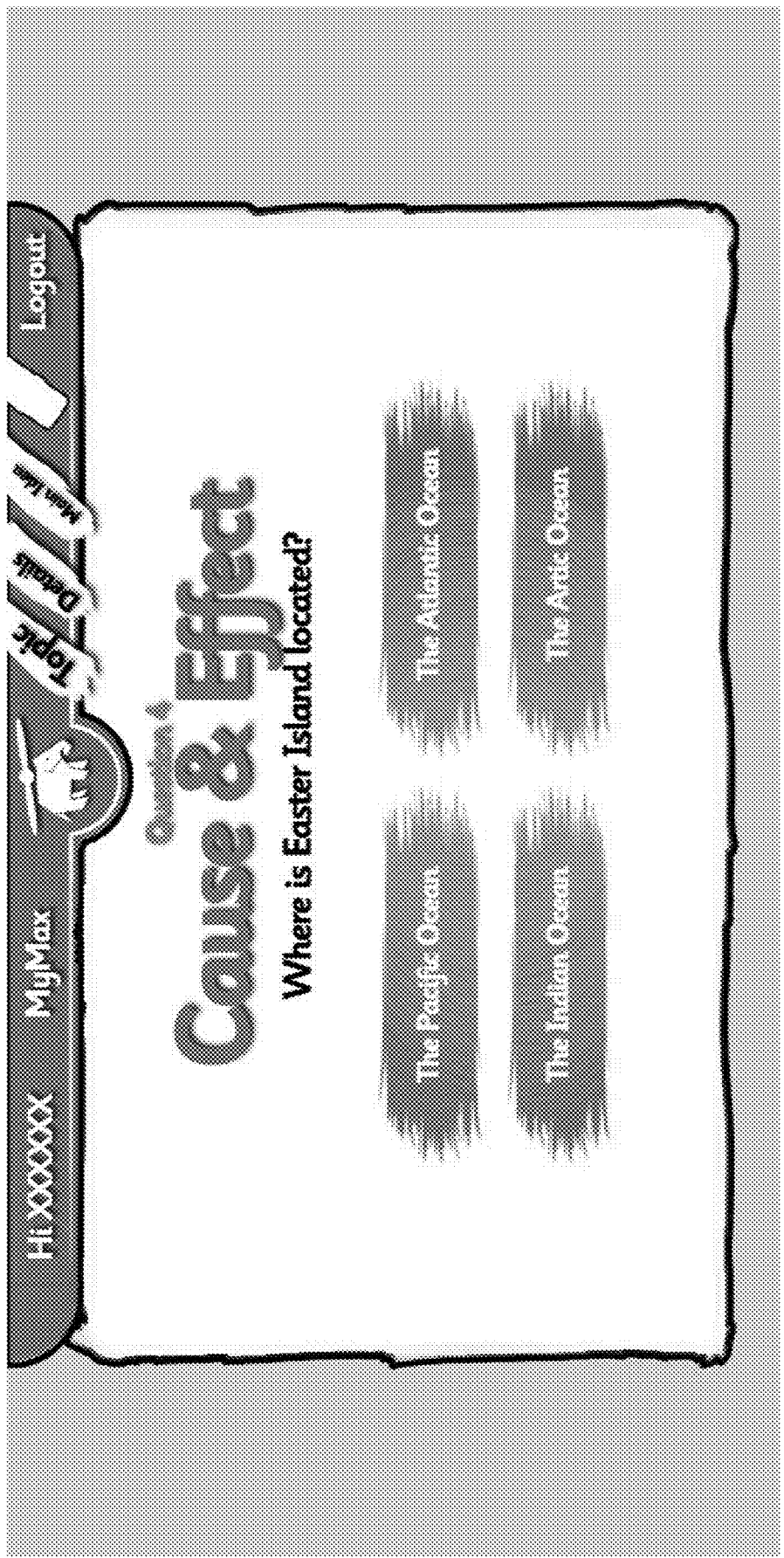
Figure 49:
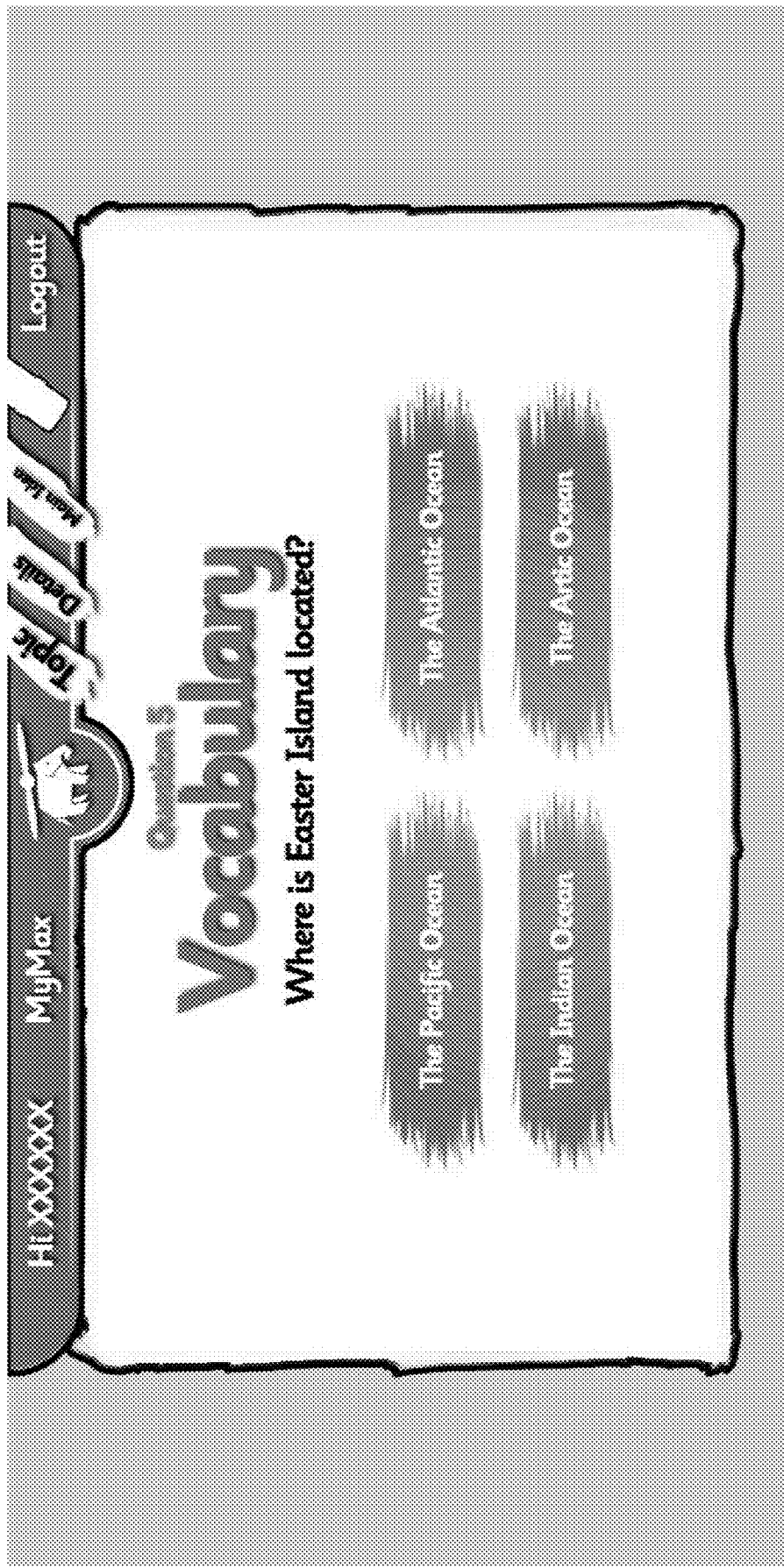

The reading comprehension component 500 presents one question at a time on the student's computer screen 220, each question dealing with different subject matter: one main idea question, as exemplary shown in FIG. 45; one fact based question, as exemplary shown in FIG. 46; one compare and contrast question, as exemplary shown in FIG. 47; one cause and effect question, as exemplary shown in FIG. 48; and one vocabulary question, as exemplary shown in FIG. 49. When the student has answered all five questions relating the first passage, the reading comprehension component 500 stores the student's answer in the database 130 and presents the second passage for the student to read and highlight. As with the first passage, when the student has completed the task of highlighting the second passage, the reading comprehension component 500 stores the student's highlighted second passage in the database 130 and presents a predetermined number of questions relating to the second passage, preferably five multiple choice questions, to assess the student's reading fluency.

When the student has answered all five questions relating to the second passage, the reading comprehension component 500 stores the student's answer in the database 130 and the server processor 110 processes the student's answers and scores for highlighted passages for reading fluency using similar the scoring methodology as with the chapters. The reading comprehension 500 generates and displays a total score and an individual score for each passage. Optionally, the reading comprehension 500 can further provide breakdown the scores for each passage: scores for highlighting and questions. In accordance with an exemplary embodiment of the claimed invention, the server processor 110 generates and displays the student's score based 50% from correct highlighting and 50% from correctly answering the questions. In accordance with an exemplary aspect of the claimed invention, the server processor 110 process the highlighted passages by assigning a maximum score of 5% for correctly highlighting the topic, a maximum score of 7.5% for correctly highlighting the main idea, and a maximum score of 37.5% for correctly highlighting the details. It is appreciated that the system operator can assign different maximum scores to these three highlighted texts. Although, the reading comprehension component 500 saves all of the student's work and scores, if the student exceeds the predetermined allotted time (e.g., 25 minutes) for any passage, the server processor 110 adjusts the total passage score based on student's work within the predetermined allotted time of 25 minutes. The reading comprehension component 500 uses the adjusted scores to determine whether the student advances to the next level, continues at the same level or goes back one level down.

In accordance with an exemplary embodiment of the claimed invention, the reading comprehension component 500 readjusts the student's current level based on his overall IPA score. The reading comprehension component 500 advances the student to the next level if the student's overall IPA score is greater than or equal to a predetermined high threshold (e.g., 70%). The reading comprehension component 500 demotes the student to the previous level, if the student's overall IPA score is less than a predetermined low threshold (e.g., 50%). The reading comprehension component 500 keeps the student at the current level if the student's overall IPA score is between the low and high predetermined threshold (e.g., 50%-69%). That is, if the student moves to a new level (either up or down), the reading comprehension component 500 displays a chapter of a book from the student's newly assigned level to read, highlight and answer questions, as described herein. Otherwise, the reading comprehension component 500 displays a chapter from another book from the student's current level to read, highlight and answer questions, as described herein.

Figure 50:
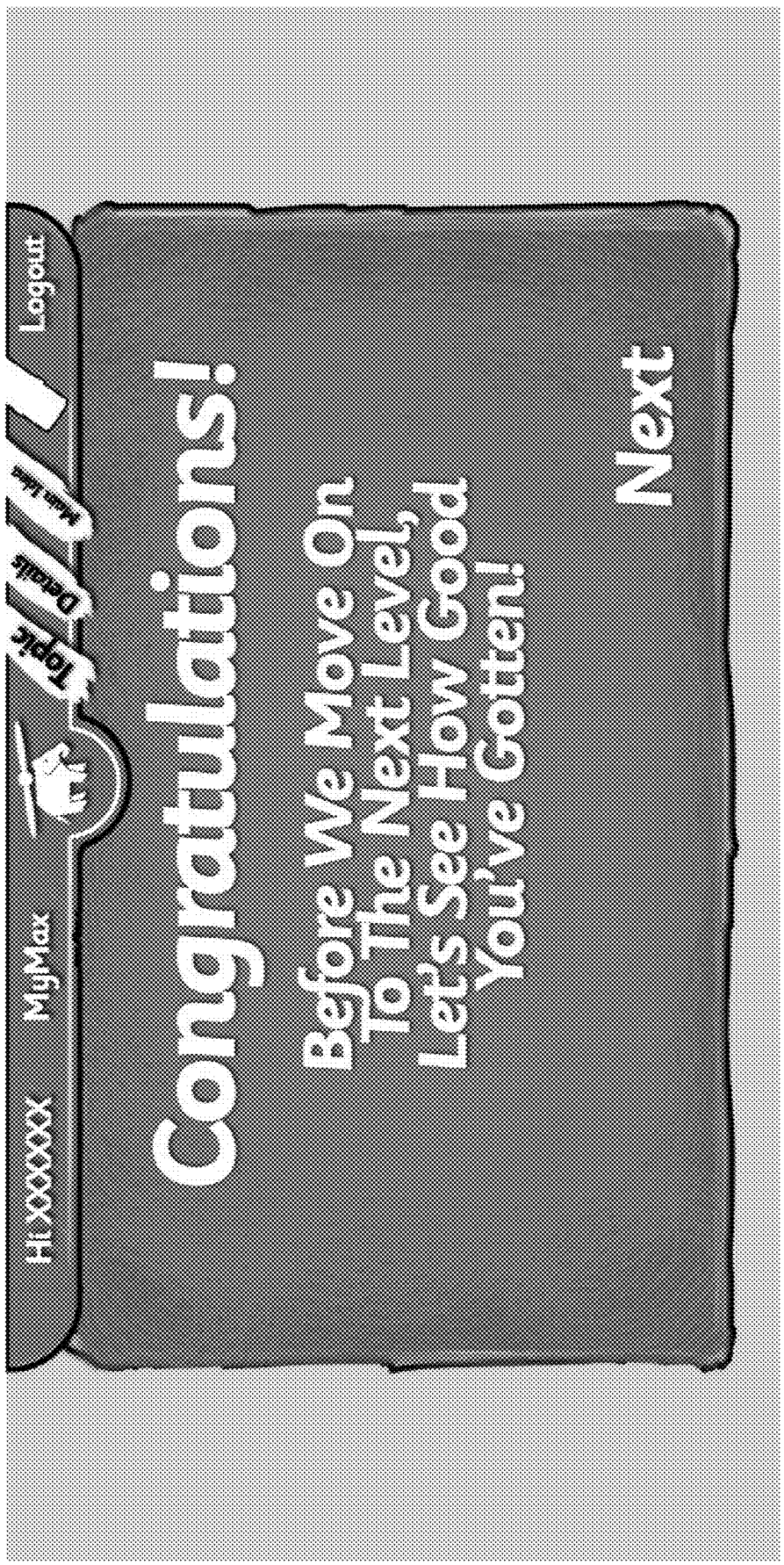
FIG. 50 is an exemplary embodiment of the reading comprehension component prompting the student to take the post-test assessment test in accordance with an exemplary embodiment of the claimed invention.

At the end of each level, in accordance with an exemplary embodiment of the claimed invention, the reading comprehension component 500 prompts the student to take a post-test assessment to assess her reading fluency, as exemplary shown in FIG. 50. The post-test assessment is similar to the IPA, but has more passages for the student to read, highlight and answer questions. For example, the IPA has two passages and the post-test assessment has four passages. Preferably, the reading comprehension component 500 prevents the student from proceeding to the next level until the post-test assessment is completed. The reading comprehension component 500 scores the post-test assessment same as the IPA.

In accordance with an exemplary embodiment of the claimed invention, the reading comprehension component 500 readjusts the student's current level based on his overall post-test assessment score. The reading comprehension component 500 advances the student to the next level if the student's overall post-test assessment score is greater than or equal to a predetermined high threshold (e.g., 70%). The reading comprehension component 500 demotes the student the previous level, if the student's overall post-test assessment score is less than a predetermined low threshold (e.g., 50%). The reading comprehension component 500 keeps the student at the current level if the student's overall IPA score is between the low and high predetermined threshold (e.g., 50%-69%). That is, if the student moves to a new level (either up or down), the reading comprehension component 500 displays a chapter of a book from the student's newly assigned level to read, highlight and answer questions, as described herein. Otherwise, the reading comprehension component 500 displays a chapter from same or another book from the student's current level to read, highlight and answer questions, as described herein.

In accordance with an exemplary embodiment of the claimed invention, the reading comprehension component 500 performs reading comprehension assessment before the student begins a new level. The reading comprehension component 500 prompts the student to read a passage, as exemplary shown in FIG. 30, 33 or 44, for a predetermined time, e.g., sixty seconds. In accordance with an exemplary embodiment of the claimed invention, the client processor 210 records the student's reading of the passage using the microphone 270. The client processor 210 transmits the recording of the student's reading of the passage the server processor 110. The server processor stores the recording of the student's reading of the passage in the database 130 and analyzes the recording to calculate a score. The server processor 110 calculates the score using the speech recognition engine 150 to determine how many words in the passage was read correctly by the student. The speech recognition engine 150 comprises a library of correct word sounds and compares the student's reading of the words in the passage to the correct word sounds in the library.

In accordance with an exemplary embodiment of the claimed invention, the reading comprehension component 500 allows underperforming student (student receiving a low score on the Interim Progress Assessment or Post-test assessment) to repeat a level or go down a level. However, if the student continues to obtain a score that does not allow her to advance for three consecutive times, the reading comprehension component 500 alerts the observer via email or text message that student needs more intensive work. The reading comprehension component 500 may suggest that the student perform the reading comprehension sessions together with an observer and/or provide a report outlining student's area of weaknesses so a suitable remediation or intervention program can be established to meet the specific, individual needs of the student.

In accordance with an exemplary embodiment of the claimed invention, the reporting component 630 can generate a progress report on student's overall performance or student's performance with a particular component, e.g., the student's reading comprehension progress report, at the request of the observer (e.g., a teacher, a reading coach, a parent, a principal of a school and the like). If the observer is responsible many students, e.g., a teacher, then the reporting component 630 can generates a progress report for each student requested by the observer. In accordance with an exemplary embodiment of the claimed invention, the reporting component 630 generates a student's reading comprehension progress report containing one or more of the following information regarding: a. login time; b. logged out time; c. time spent on the reading comprehension component during each session and cumulatively; d. chapters and books completed; e. pre-test score, preferably in graphical format; f. IPA scores, preferably in graphical format; g. correct percentage for all questions answered for pre-test, IPA, and post-test; h. total chapters completed for pre-test, IPA, and post-test; i. total time spent on each assessment for pre-test, IPA and post-test; j. time spent per type of question for pre-test, IPA, and post-test; k. correct percentage for highlighting for IPA and post-test assessment; l. correct percentage per type of questions for pre-test, IPA, and post-test; m. total questions completed for pre-test, IPA, and post-test; n. fluency test scores for each level; o. correlation between score on highlighting and score on answers to questions for each level.

While the present invention has been particularly described with respect to the illustrated embodiment, it will be appreciated that various alterations, modifications and adaptations may be made based on the present disclosure, and are intended to be within the scope of the present invention. It is intended that the appended claims be interpreted as including the embodiment discussed above, those various alternatives which have been described and all equivalents thereto.

What is claimed:

1. A computer based interactive, multi-sensory method for teaching students to read words and comprehend passages, comprising the steps of:

(a) presenting a menu of teaching components on a screen of a processor based client device associated with a student by a processor based server over a communications network, the server comprising at least a phonics component for teaching students to read through voice and handwriting recognition, the phonics component comprises a plurality of phonics modules for teaching the student an alphabetic code of the English language, each phonics module comprises a different letter category of the alphabetic code and a plurality of exercises for teaching the student the letter category of said each module with a series of multi-sensory interactions with the student;

(b) determining and executing a current phonics module associated with the student by phonics component, the letter category of the current phonics module comprises a plurality of letter groups, each letter group comprises at least one of the following letter symbol: a letter, a consonant, a vowel or a syllable;

(c) determining, by the phonics component, a current letter group of the current phonics module and a current letter symbol of the current letter group associated with the student;

(d) retrieving an exercise for the current letter symbol of the current letter group associated with the student from a database by the phonics component, the exercise comprising at least a visual and auditory drill of the current letter symbol, a writing drill of the current letter symbol and a phonological processing drill;

(e) presenting the exercise for the current letter symbol of the current letter group associated with the student on the student's client device by the phonics component to create multi-sensory interactions with the student for the current letter symbol;
(f) receiving the student's responses to the multi-sensory interactions of the exercise from the client device by the phonics component over the communications network;
(g) processing and scoring the student's responses to the multi-sensory interactions by the phonics component to determine whether the student advances to the next letter symbol of the current letter group or repeats the current letter symbol of the current letter group;
(h) storing the student's responses to the multi-sensory interactions and the student's score on the current letter symbol in the database by the phonics component;
(i) advancing the student to the next letter symbol of the current letter group by the phonics component if the student's score is greater than or equal to a predetermined threshold and repeating the steps (d)-(h) for the next letter symbol of the current letter group;
(j) retrieving another exercise for the current letter symbol of the current letter group by the phonics component and repeating the steps (e)-(h) if the student's score is less than the predetermined threshold;
(k) presenting a letter group assessment test of the current letter group on the student's client device by the phonics component upon completion of a last letter symbol of the current letter group, the letter group assessment test comprising at least four parts and further comprising the steps of:
  performing a first part of the letter group assessment test by the phonics component by performing the following steps:
    presenting a first set of lists on the student's client device, one list at a time, each list being associated with one different letter symbol of the current letter group and comprising at least two words;
    for each list on the first set, providing an audio sound of the letter symbol associated with the list on the student's client device and prompting the student to select a word on the list that begins with the audio sound;
    receiving the student's selections for the first set from the student's client device over the communications network;
    processing the student's selections for the first set to determine a first assessment score;
    storing the student's selections from the first set and student's first letter group assessment score in the database;
  performing a second part of the letter group assessment test by the phonics component by performing the following steps:
    presenting a second set of lists on the student's client device, one list at a time, each list being associated with one different letter symbol of the current letter group and comprising at least two words;
    for each list on the second set, providing an audio sound of the letter symbol associated with the list on the student's client device and prompting the student to select a word on the list that ends with the audio sound;
    receiving the student's selections for the second set from the student's client device over the communications network;
    processing the student's selections for the second set to determine a second assessment score;
    storing the student's selections for the second set of lists and student's second letter group assessment score in the database;
  performing a third part of the letter group assessment test by the phonics component by performing the following steps:
    presenting a third set of lists on the student's client device, one list at a time, each list being associated with one different letter symbol of the current letter group and comprising at least two words;
    for each list on the third set, providing an audio sound of the letter symbol associated with the list on the student's client device and prompting the student to select a word on the list that contains the audio sound;
    receiving the student's selections for the third set from the student's client device over the communications network;
    processing the student's selections for the third set of lists to determine a third assessment score;
    storing the student's selections for the third set of lists and student's third letter group assessment score in the database;
  performing a word per minute timing drill as a fourth part of the letter group assessment test by the phonics component by performing the following steps:
    presenting a predetermined set of a predetermined number of words on the student's client device, each word being a real or nonsense word comprising at least two letter symbols of the current letter group;
    for each set, prompting the student to read the words displayed on the student's screen for a predetermined time, preferably one minute;
    receiving a recording of the words read by the student from the client device over the communications network;
    analyzing the recording to determine a fourth assessment score comprising three scores, a first score being a total number of words read accurately by the student, a second score being a total number of real words read accurately by the student, and a third score being the total number of nonsense words read accurately, each score of the fourth assessment is determined by comparing the student's pronunciation of the words to correct sounds of the words by a speech recognition engine of the server, the speech recognition engine comprising a library of correct sounds;
    storing the recording of the words read by the student and the student's fourth assessment score comprising the three scores in the database;
(l) processing and scoring the student's responses to the letter group assessment test by the phonics component to determine whether the student advances to the next letter group of the current phonics module or repeats the current letter group of the current phonics module;
(m) advancing the student to the next letter group of the current phonics module if the student's letter group assessment score is greater than or equal to a predetermined threshold and repeating the steps (c)-(l) for the next letter group of the current phonics module; and
(n) repeating the steps (c)-(l) for the current letter group of the current phonics module if the student's letter group assessment score is less than the predetermined threshold.

2. The method of claim 1, further comprising the steps of:
(o) presenting a module assessment test of the current phonics module on the student's client device by the phonics component upon completion of a last letter group of the current module;
(p) processing and scoring the student's responses to the module assessment test by the phonics component to determine a module assessment score;
(q) storing the student's responses to the module assessment test and the student's module assessment score in the database;
advancing the student to the next phonics module if the student's module assessment score is greater than or equal to a predetermined module threshold and repeating the steps (c)-(q) for the next phonics module; and
repeating the steps (c)-(q) for the current phonics module if the student's module assessment score is less than the predetermined module threshold.

3. The method of claim 1, further comprising the step of performing the visual and auditory drill of the current letter symbol on the student's client device by the phonics component by performing the following steps:
presenting on the student's client device a video or animation of a speaker or character at least pronouncing a name of the current letter symbol or a grapheme drill, pronouncing a name of a picture which is associated with the sound of the current letter symbol or a picture association drill, and pronouncing the sound the current letter symbol makes or a phoneme drill;
prompting the student to perform the grapheme drill, the picture association drill and the phoneme drill as on the video, one at a time, by pronouncing the name of the current letter symbol, pronouncing the name of the picture associated with the current letter symbol and pronouncing the sound the current letter symbol makes;
receiving a recording of the student's pronunciations during the grapheme drill, the picture association drill and the phoneme drill from the student's client device over the communications network;
analyzing the recording to determine a visual/auditory score; and
storing the recording of the student's pronunciations and the student's visual/auditory score in the database.

4. The method of claim 3, wherein the step of analyzing the recording comprise the step of calculating the visual/auditory score by comparing the sounds spoken by the student to correct sounds by a speech recognition engine of the server, the speech recognition engine comprising a library of correct sounds.

5. The method of claim 1, further comprising the step of performing the writing drill of the current letter symbol on the student's client device by the phonics component by performing the following steps:
presenting on the student's client device an animation of how the current letter symbol is formed and an audio instruction of how to write the current letter symbol;
prompting the student to trace the current letter symbol on the student's computer screen with a mouse or using the student's finger on the student's touch screen;
receiving the student's writing of the current letter symbol from the student's client device over the communications network;
analyzing the student's writing to determine a writing score by comparing the student's writing of the current letter symbol to a correctly written current letter symbol as a template or silhouette; and
storing the student's writing of the current letter symbol and the student's writing score in the database.

6. The method of claim 1, further comprising the step of performing the phonological processing drill of the current letter symbol on the student's client device by the phonics component by performing the following steps:
presenting on the student's client device at least two sets of pictures, one at a time, each set comprising at least two pictures with one picture that starts with the sound of the current letter symbol;
providing an audio of the sound that the current letter symbol makes on the student's client device;
for each set of pictures, prompting the student to select or identify a picture from the set that starts with the sound the current letter symbol makes;
receiving the student's selection of the picture from each set of picture from the student's client device over the communications network;
processing the student's picture selections to determine a phonological score; and
storing the student's picture selections and student's phonological score in the database.

7. The method of claim 1, further comprising the step performing an auditory sound drill of the current letter group on the student's client device upon completion of a last letter symbol of the current letter group by the phonics component by performing the following steps:
providing a predetermined number of sounds of the letter symbols of the current letter group, one at a time, on the student's client device;
after providing each sound, prompting the student to enter the letter symbol associated with the sound;
receiving the student's responses to the predetermined number of sounds from the student's client device over the communications network;
processing the student's responses to determine an auditory drill score; and
storing the student's response and the student's auditory drill score in the database.

8. The method of claim 1, further comprising the step performing a decoding drill of the current letter group on the student's client device upon completion of a last letter symbol of the current letter group by the phonic component by performing the following steps:
presenting a predetermined number of slides on the student's client device, one at a time, each slide containing at least two letter symbols of the current letter group;
for each slide, prompting the student to say the sound of each letter symbol on the slide and to blend the sounds together to form a word which can be a real or nonsense word;
receiving a recording of the student's pronunciation of the words formed from blending the sounds of said at least two letter symbols from the client device over the communications network;
analyzing the recording to determine a decoding score by comparing the sounds spoken by the student to correct sounds by a speech recognition engine of the server, the speech recognition engine comprising a library of correct sounds; and
storing the recording and the student's decoding score in the database.

9. The method of claim 1, further comprising the step performing a pronunciation drill of the current letter group on the student's client device upon completion of a last letter symbol of the current letter group by the phonic component by performing the following steps:

presenting a predetermined number of electronic flash cards on the student's client device, one at a time, each flash card containing a real or nonsense word comprising at least two letter symbols of the current letter group;

for each flash card, prompting the student to read the word on said each flash card;

receiving a recording of the student's pronunciation of the words on the flash cards from the client device over the communications network;

analyzing the recording to determine a pronunciation score by comparing the student's pronunciation of the words to correct sounds of the words on the flash cards by a speech recognition engine of the server, the speech recognition engine comprising a library of correct sounds; and storing the recording of the student's pronunciations and the student's pronunciation score in the database.

10. The method of claim 1, further comprising the step performing a word per minute timing drill of the current letter group on the student's client device upon completion of a last letter symbol of the current letter group by the phonic component by performing the following steps:

presenting a predetermined set of a predetermined number of words on the student's client device, each word being a real or nonsense word comprising at least two letter symbols of the current letter group;

for each set, prompting the student to read the words displayed on the student's screen for a predetermined time, preferably one minute;

receiving a recording of the words read by the student from the client device over the communications network;

analyzing the recording to determine a word per minute score based on a number of words in each set read correctly by student by comparing the student's pronunciation of the words to correct sounds of the words by a speech recognition engine of the server, the speech recognition engine comprising a library of correct sounds; and storing the recording of the words read by the student and the student's wpm score in the database.

11. The method of claim 1, further comprising the step performing a controlled reading assessment of the student by the phonics component using a controlled reader upon completion of a last letter symbol of the current letter group, the controlled reader is a real or nonsense story comprising a predetermined number sentences composed of words consisting of at two letter symbols of the current letter group, and the phonics component performing the following steps:

presenting a predetermined number of sight words on the student's client device to be memorized by the student;

for each sight word, providing an audio of the sound of said each sight word on the student's client device and prompting the student to read said each sight word;

transmitting and presenting the controlled reader on the student client device as a series of slides, each slide displaying one or two sentences and images associated with one or more words of the displayed slide;

for each slide, providing an audio sound of a speaker reading the displayed sentences and prompting the student to read the sentences displayed on the student's screen;

receiving a recording of the sentences read by the student from the client device over the communications network;

analyzing the recording to determine a controlled reader score based on a number of sentences read correctly by student by comparing the student's pronunciation of the words in each sentence to correct sounds of the words by a speech recognition engine of the server, the speech recognition engine comprising a library of correct sounds; and storing the recording of the sentences read by the student and the student's controlled reader score in the database.

12. A computer based interactive, multi-sensory method for teaching students to read words and comprehend passages, comprising the steps of:

(a) presenting a menu of teaching components on a screen of a processor based client device associated with a student by a processor based server over a communications network, the server comprising at least a reading comprehension component for teaching students to improve their reading comprehension skills through highlighting and summarizing passages;

(b) performing a pre-test to determine the student's current reading level by the reading comprehension component by performing the following steps:

retrieving the pre-test based on the student's current grade level from the database and presenting the pre-test on the student's client device, the pre-test comprises a predetermined number of passages for the student read;

after each passage, prompting the student to answer a predetermined number of questions about the passage, each question relating to one of the following about the passage: main idea, important detail, compare and contrast, cause and effect, vocabulary, sequence, predictions, conclusions, inferences, fact vs. opinion, author's purpose, figurative language or summarization;

receiving the student's answers to the questions from the student's client device over the communications network;

processing the student's answers to the question to determine an overall pre-test score and individual passage scores;

assigning the student's current reading level to a reading level associated with the student's current grade level if the student's overall pre-test score is greater than a predetermined high threshold;

assigning the student's current reading level to a reading level associated with two grade levels below the student's current grade level if the student's overall pre-test score is less than a predetermined low threshold;

assigning the student's current reading level to a reading level associated with one grade level below the student's current grade level if the student's overall pre-test score is between the predetermined low and high thresholds;

storing the student's answers to the questions, the student's overall pre-test score and the student's current reading level in the database;

(c) retrieving a current book from a database comprising a plurality of books at each reading comprehension level, the current book being selected from the student's current reading level;

(d) presenting a current chapter of the current book on the student's client device by the reading comprehension component;

(e) prompting the student to read and highlight the current chapter with colored electronic highlighters, a first color for main idea, a second color for topic and a third color for detail;

(f) receiving the student's highlighted chapter from the client device by the reading comprehension component over the communications network;

(g) processing the student's highlighted chapter to determine a chapter highlighting score based at least on the words correctly highlighted in the current chapter, the words incorrectly highlighted in the current chapter and a total time spent on the current chapter by the student;
(h) presenting a predetermined number of questions about the current chapter, one a time, on the student's client device by the reading comprehension component;
(i) receiving the student's answers to the questions from the student's client device by the reading comprehension component over the communications network;
(j) processing the student's answers to determine a chapter question score and an overall chapter score based on the student's chapter highlighting score and the student's chapter question score;
(k) storing the student's highlighted chapter, the student's chapter highlighting score, the student's question score and the student's overall chapter score in the database by the reading comprehension component;
(l) presenting a next chapter of the current book on the student's client device by the reading comprehension component and repeating the steps (e)-(k) for the next chapter;
(m) retrieving a next book in the student's current reading level from the database by the reading comprehension component upon completion of the current book and repeating the steps (d)-(l) for the next book; and
(n) repeating the steps (d)-(m) until a predetermined number of books from the student's current reading level is completed.

13. The method of claim 12, further comprising the step of highlighting the words in the current chapter for which definitions are available from a vocabulary component of the server by the reading comprehension component.

14. The method of claim 12, further comprising the step of displaying the student's highlighted chapter and the student's highlighting score on the student's client device by the reading comprehension component; and wherein the student's correctly highlighted words relating to the main idea are displayed in the first color, the student's correctly highlighted words relating to the topic are displayed in the second color, the student's correctly highlighted words relating to the detail are displayed in the third color, and the student's incorrectly highlighted words are displayed in a fourth color.

15. The method of claim 12, further comprising the steps of:
prompting the student to write a summary of the current chapter by the reading comprehension component after completing a predetermined number of chapters of the current book;
receiving the student's summary of the current chapter from the student's client device by the reading comprehension component over the communications network;
analyzing the student's summary to determine whether the summary contains at least one main idea, at least three sentences relating to details of the current chapter and at least one concluding sentence, and determining a summary score based on the determination; and
storing the student's summary and the student's summary score in the database.

16. A computer based interactive, multi-sensory method for teaching students to read words and comprehend passages, comprising the steps of:
(a) presenting a menu of teaching components on a screen of a processor based client device associated with a student by a processor based server over a communications network, the server comprising at least a reading comprehension component for teaching students to improve their reading comprehension skills through highlighting and summarizing passages;
(b) retrieving a current book from a database comprising a plurality of books at each reading comprehension level, the current book being selected from the student's current reading level;
(c) presenting a current chapter of the current book on the student's client device by the reading comprehension component;
(d) prompting the student to read and highlight the current chapter with colored electronic highlighters, a first color for main idea, a second color for topic and a third color for detail;
(e) receiving the student's highlighted chapter from the client device by the reading comprehension component over the communications network;
(f) processing the student's highlighted chapter to determine a chapter highlighting score based at least on the words correctly highlighted in the current chapter, the words incorrectly highlighted in the current chapter and a total time spent on the current chapter by the student;
(g) presenting a predetermined number of questions about the current chapter, one a time, on the student's client device by the reading comprehension component;
(h) receiving the student's answers to the questions from the student's client device by the reading comprehension component over the communications network;
(i) processing the student's answers to determine a chapter question score and an overall chapter score based on the student's chapter highlighting score and the student's chapter question score;
(j) storing the student's highlighted chapter, the student's chapter highlighting score, the student's question score and the student's overall chapter score in the database by the reading comprehension component;
(k) presenting a next chapter of the current book on the student's client device by the reading comprehension component and repeating the steps (d)-(j) for the next chapter.
(l) retrieving a next book in the student's current reading level from the database by the reading comprehension component upon completion of the current book and repeating the steps (c)-(k) for the next book;
(m) performing an interim progress assessment (IPA) at a predetermined time before the completion of the current reading level by the reading comprehension component to assess the student's reading fluency, the reading comprehension component performs the following steps:
retrieving a predetermined number of passages based on the student's current reading level from the database;
presenting the predetermined passages, one at a time, on the student's client device passages;
for each passage, prompting the student to read and highlight said each passage with colored electronic highlighters, the first color for main idea, the second color for topic and the third color for detail;
for each passage, receiving the student's highlighted passage from the client device by the reading comprehension component over the communications network;
after each passage, prompting the student to answer a predetermined number of questions about the passage, each question relating to one of the following about the passage: main idea, important detail, compare and contrast, cause and effect, vocabulary, sequence, predictions, conclusions, inferences, fact vs. opinion, author's purpose, figurative language or summarization;

after each passage, receiving the student's answers to the questions from the student's client device over the communications network;

processing the student's highlighted passages to determine an IPA highlighting score based at least on correctly highlighted topic, correctly highlighted main idea, and correctly highlighted details in the passage;

processing the student's answers to the questions to determine an IPA question score and an overall IPA score based on the student's IPA highlighting score and the student's IPA question score;

advancing the student to a next reading level if the overall IPA score is greater than a predetermined high threshold;

demoting the student to a previous reading level if the overall IPA score is less than a predetermined low threshold;

maintaining the student at the student's current reading level if the overall IPA score is between the predetermined low and high thresholds;

storing the student's IPA highlighting score, the student's IPA question score and the student's overall IPA score in the database by the reading comprehension component; and (n) repeating the steps (c)-(l) until a predetermined number of books from the student's current reading level is completed.

17. A computer based interactive, multi-sensory method for teaching students to read words and comprehend passages, comprising the steps of:

(a) presenting a menu of teaching components on a screen of a processor based client device associated with a student by a processor based server over a communications network, the server comprising at least a reading comprehension component for teaching students to improve their reading comprehension skills through highlighting and summarizing passages;

(b) retrieving a current book from a database comprising a plurality of books at each reading comprehension level, the current book being selected from the student's current reading level;

(c) presenting a current chapter of the current book on the student's client device by the reading comprehension component;

(d) prompting the student to read and highlight the current chapter with colored electronic highlighters, a first color for main idea, a second color for topic and a third color for detail;

(e) receiving the student's highlighted chapter from the client device by the reading comprehension component over the communications network;

(f) processing the student's highlighted chapter to determine a chapter highlighting score based at least on the words correctly highlighted in the current chapter, the words incorrectly highlighted in the current chapter and a total time spent on the current chapter by the student;

(g) presenting a predetermined number of questions about the current chapter, one a time, on the student's client device by the reading comprehension component;

(h) receiving the student's answers to the questions from the student's client device by the reading comprehension component over the communications network;

(i) processing the student's answers to determine a chapter question score and an overall chapter score based on the student's chapter highlighting score and the student's chapter question score;

(j) storing the student's highlighted chapter, the student's chapter highlighting score, the student's question score and the student's overall chapter score in the database by the reading comprehension component;

(k) presenting a next chapter of the current book on the student's client device by the reading comprehension component and repeating the steps (d)-(j) for the next chapter.

(l) retrieving a next book in the student's current reading level from the database by the reading comprehension component upon completion of the current book and repeating the steps (c)-(k) for the next book;

(m) repeating the steps (c)-(l) until a predetermined number of books from the student's current reading level is completed;

(n) performing a post-test assessment by the reading comprehension component to assess the student's reading fluency upon completion of the current reading level, the reading comprehension component performs the following steps:

retrieving a predetermined passages based on the student's current reading level from the database;

presenting the predetermined passages, one at a time, on the student's client device passages;

for each passage, prompting the student to read and highlight said each passage with colored electronic highlighters, the first color for main idea, the second color for topic and the third color for detail;

for each passage, receiving the student's highlighted passage from the client device by the reading comprehension component over the communications network;

after each passage, prompting the student to answer a predetermined number of questions about the passage, each question relating to one of the following about the passage: main idea, important detail, compare and contrast, cause and effect, vocabulary, sequence, predictions, conclusions, inferences, fact vs. opinion, author's purpose, figurative language or summarization;

after each passage, receiving the student's answers to the questions from the student's client device over the communications network;

processing the student's highlighted passages to determine a post-test highlighting score based at least on correctly highlighted topic, correctly highlighted main idea, and correctly highlighted details in the passage;

processing the student's answers to the questions to determine a post-test question score and an overall post-test score based on the student's post-test highlighting score and the student's post-test question score;

advancing the student to a next reading level if the overall post-test score is greater than a predetermined high threshold;

demoting the student a previous reading level if the overall post-test score is less than a predetermined low threshold;

maintaining the student at the student's current reading level if the overall post-test score is between the predetermined low and high thresholds; and storing the student's post-test highlighting score, the student's post-test question score and the student's overall post-test score in the database by the reading comprehension component.

18. A non-transitory computer readable medium comprising computer executable code for interactive, multi-sensory method for teaching students to read words and comprehend passages, the code comprising instructions for:

presenting a menu of teaching components on a screen of a processor based client device associated with a student by a processor based server over a communications network, the server comprising at least a phonics component for teaching students to read through voice and handwriting recognition and a reading comprehension component for teaching students to improve their reading comprehension skills through highlighting and summarizing passages, the phonics component comprises a plurality of phonics modules for teaching the student an alphabetic code of the English language, each phonics module comprises a different letter category of the alphabetic code and a plurality of exercises for teaching the student the letter category of said each module with a series of multi-sensory interactions with the student;

receiving the student's selection of the teaching component from the student's client device by the server over the communications network;

executing the phonics component by the server if the phonics component is selected by the student and further comprising instructions for the phonics component to:

(a) determine and execute a current phonics module associated with the student by phonics component, the letter category of the current phonics module comprises a plurality of letter groups, each letter group comprises at least one of the following letter symbol: a letter, a consonant, a vowel or a syllable;

(b) determine a current letter group of the current phonics module and a current letter symbol of the current letter group associated with the student;

(c) retrieve an exercise for the current letter symbol of the current letter group associated with the student from a database by the phonics component, the exercise comprising at least a visual and auditory drill of the current letter symbol, a handwriting drill of the current letter symbol and a phonological processing drill;

(d) present the exercise for the current letter symbol of the current letter group associated with the student on the student's client device by the phonics component to create multi-sensory interactions with the student for the current letter symbol;

(e) receive the student's responses to the multi-sensory interactions of the exercise from the client device by the phonics component over the communications network;

(f) process and score the student's responses to the multi-sensory interactions by the phonics component to determine whether the student advances to the next letter symbol of the current letter group or repeats the current letter symbol of the current letter group;

(g) store the student's responses to the multi-sensory interactions and the student's score of the current letter symbol in the database by the phonics component;

(h) advance the student to the next letter symbol of the current letter group by the phonics component if the student's score is greater than or equal to a predetermined threshold and repeat the instructions (c)-(g) for the next letter symbol of the current letter group; and (i) retrieve another exercise for the current letter symbol of the current letter group by the phonics component and repeat the instructions (d)-(g) if the student's score is less than the predetermined threshold; executing the reading comprehension component by the server if the reading comprehension component is selected by the student and further comprising instructions for the reading comprehension component to:

(j) retrieve a current book from a database comprising a plurality of books at each reading comprehension level, the current book is from the student's current reading level;

(k) present a current chapter of the current book on the student's client device;

(l) prompt the student to read and highlight the current chapter with colored electronic highlighters, a first color for main idea, a second color for topic and a third color for detail;

(m) receive the student's highlighted chapter from the client device by the reading comprehension component over the communications network;

(n) process the student's highlighted chapter to determine a chapter highlighting score based at least on the words correctly highlighted in the current chapter, the words incorrectly highlighted in the current chapter and a total time spent on the current chapter by the student;

(o) present a predetermined number of questions about the current chapter, one a time, on the student's client device;

(p) receive the student's answers to the questions from the student's client device over the communications network;

(q) process the student's answers to determine a chapter question score and an overall chapter score based on the student's chapter highlighting score and the student's chapter question score;

(r) store the student's highlighted chapter, the student's chapter highlighting score, the student's question score and the student's overall chapter score in the database;

(s) present a next chapter of the current book on the student's client device and repeat the instructions (l)-(r) for the next chapter;

(t) retrieve a next book in the student's current reading level from the database upon completion of the current book and repeat the instructions (k)-(s) for the next book; and (u) repeat the instructions (j)-(t) until a predetermined number of books from the student's current reading level is completed.

* * * * *